US011902372B1

(12) United States Patent
Horowitz et al.

(10) Patent No.: US 11,902,372 B1
(45) Date of Patent: Feb. 13, 2024

(54) SESSION SHARING WITH REMOTE DIRECT MEMORY ACCESS CONNECTIONS

(71) Applicant: MELLANOX TECHNOLOGIES, LTD., Yokneam (IL)

(72) Inventors: Adi Merav Horowitz, Tel Aviv (IL); Rabia Loulou, Nazareth (IL); Omri Kahalon, Tel Aviv (IL); Gal Shalom, Givat-Avni (IL); Aviad Yehezkel, Yokneam Ilit (IL); Asaf Schwartz, Tel Aviv (IL); Liran Liss, Atzmon-Segev (IL)

(73) Assignee: MELLANOX TECHNOLOGIES, LTD., Yokneam (IL)

(*) Notice: Subject to any disclaimer, the term of this patent is extended or adjusted under 35 U.S.C. 154(b) by 0 days.

(21) Appl. No.: 18/314,327

(22) Filed: May 9, 2023

(51) Int. Cl.
*G06F 15/167* (2006.01)
*H04L 67/1097* (2022.01)
*H04L 67/146* (2022.01)

(52) U.S. Cl.
CPC ........ *H04L 67/1097* (2013.01); *H04L 67/146* (2013.01)

(58) Field of Classification Search
CPC .......................... H04L 67/1097; H04L 67/146
USPC ................. 709/212, 220, 227, 228
See application file for complete search history.

(56) References Cited

U.S. PATENT DOCUMENTS

| 8,233,380 B2* | 7/2012 | Subramanian | H04L 49/90 370/215 |
| 8,527,661 B1* | 9/2013 | Lee | H04L 67/568 709/217 |
| 8,539,109 B1* | 9/2013 | Lee | H04L 67/1097 709/217 |
| 2005/0120141 A1* | 6/2005 | Zur | H04L 45/66 709/236 |
| 2006/0262789 A1* | 11/2006 | Peleg | H04L 47/31 370/389 |
| 2008/0109526 A1* | 5/2008 | Subramanian | H04L 69/40 709/212 |
| 2015/0269116 A1* | 9/2015 | Raikin | B01J 35/04 709/212 |

* cited by examiner

*Primary Examiner* — Liang Che A Wang
(74) *Attorney, Agent, or Firm* — Hogan Lovells US LLP

(57) ABSTRACT

Systems and methods enable session sharing for session-based remote direct memory access (RDMA). Multiple queue pairs (QPs) can be added to a single session and/or session group where each of the QPs has a common remote. Systems and methods may query a session ID for an existing session group and then use the session ID with an add QP request to join additional QPs to an existing session. Newly added QPs may share one or more features with existing QPs of the session group, such as encryption parameters. Additionally, newly added QPs may be configured with different performance or quality of service requirements, thereby isolating performance, and permitting true scaling for high performance computing applications.

13 Claims, 30 Drawing Sheets

SESSION SHARING WITH REMOTE DIRECT MEMORY ACCESS CONNECTIONS

BACKGROUND

When establishing network connections, a client may send a request to a server and wait to receive a reply regarding whether or not the connection is permitted. After the connection is formed, information may be transmitted between two endpoints. In the case of a session-based directed memory access connection, a session group may be established for a connection and each session group may be associated with a single endpoint. As a result, attempts to scale with multiple endpoints lead to increased overhead and costs. Furthermore, management of individual endpoints may be difficult and also increase operational costs.

BRIEF DESCRIPTION OF THE DRAWINGS

Various embodiments in accordance with the present disclosure will be described with reference to the drawings, in which.

DETAILED DESCRIPTION

Figure 1:
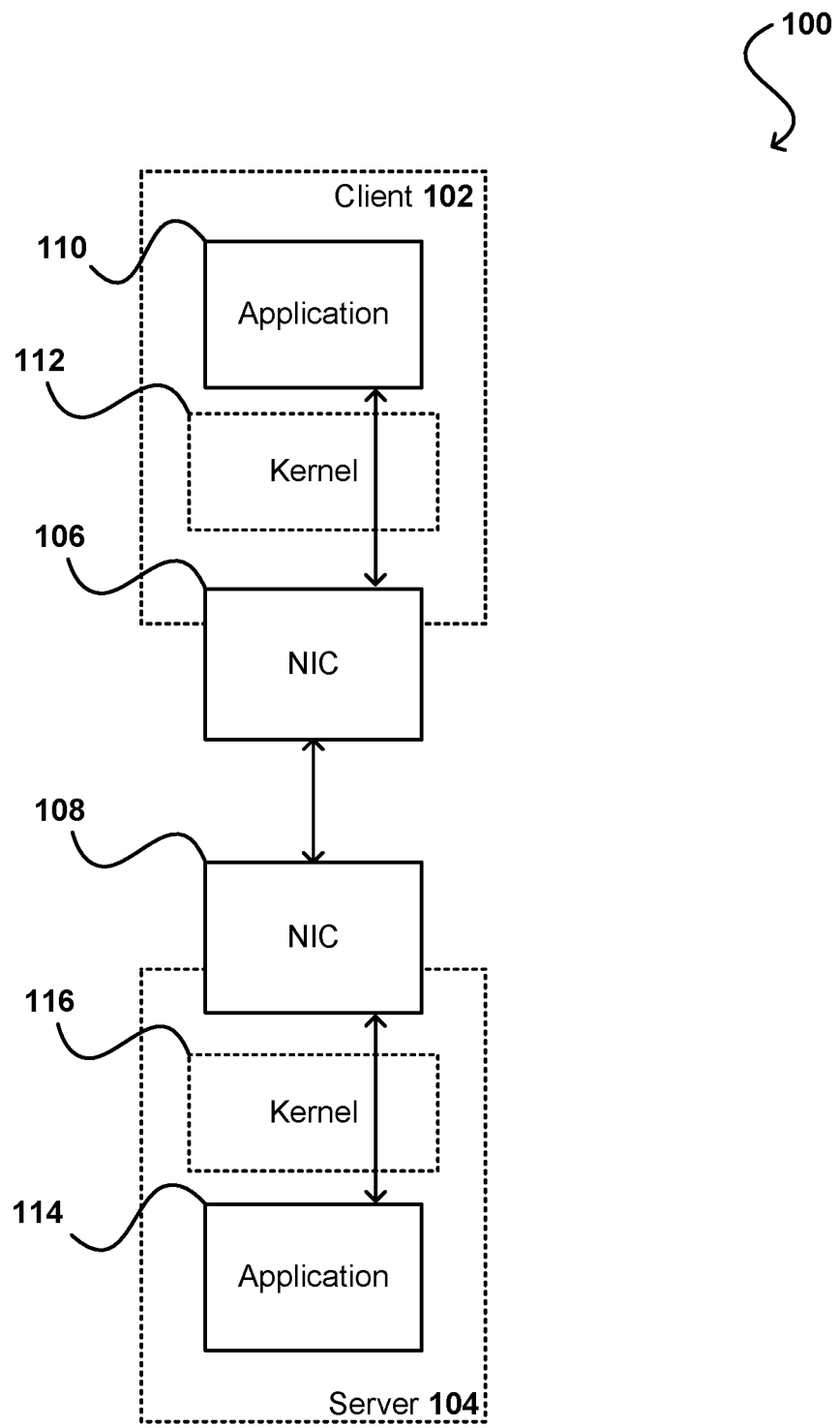
FIG. 1 illustrates an example computing system in which a direct memory connection between a client and a server can be established, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various illustrative embodiments provide for session-sharing for session-based remote direct memory access (SRDMA) where multiple queue pairs (QPs) can be added to a single session and/or session group. Traditional SRDMA connections are configured such that individual sessions are associated with a single QP, and as a result, attempts to scale lead to additional administrative overhead due to the 1:1 mapping. Systems and methods are used to query a session identifier (ID) and then use that session ID with an add QP request in order to join additional QPs to an existing session. As a result, multiple QPs can be associated with a single session that allows for reduced administrative burdens. By way of example, session sharing may enable using the same parameters for the new QP as for the existing session. Furthermore, systems and methods provide further benefits of resource sharing, reduced overhead, and the like. Various embodiments can also be used to provide additional functionality within the existing session, such as by establishing new QPs with different performance or quality of service requirements, isolating performance, and permitting true scaling for high performance computing (HPC) applications.

Various embodiments may be directed toward session sharing with SRDMA connections. Session sharing enables a single session group to be shared between multiple QPs. This configuration may be advantageous in situations where all QPs are connected to the same remote (e.g., same destination internet protocol (IP), same destination user datagram protocol (UDP) port) and are opened by the same application. In at least one embodiment, session sharing is implemented in software and in hardware. In operation, session sharing may use a new handshake protocol to add a QP (e.g., an "add QP" command) over an existing SRDMA session group. As a result of the handshake, the QP will be associated with the existing SRDMA session group in the same manner that the first QP was. In other words, the new QP can leverage information from the original QP, such as QP validation, encryption and encapsulation, etc. Various embodiments provide a new application-level application programming interface (API) to enable commands to add QPs to existing sessions and/or session groups. Before attaching the additional QP to the existing session group, the additional QP may be validated to determine that the additional QP is connected to the same remote as the other QPs attached to a given session group. Additionally, validation may also verify that the QP is attached to the same device as the session group. Systems and methods address the problems with existing configurations through session sharing to reduce overhead in terms of hardware and software memory resources, simplify secured and non-secured connection establishment, and provide easier monitoring of a connection state. Furthermore, session sharing allows traffic that is sent over multiple QPs to appear in a network as belonging to the same application. In operation, network policies (such as firewalls, etc.) that are applied per-application are usually applied on the session 5-tuple. Session sharing enables sharing the policies for the whole traffic that is sent over the multiple QPs.

Embodiments of the present disclosure may also extend the concept of session sharing to other types of protocols, such as those that incorporate network address translation (NAT) to map IP addresses spaces. In at least one embodiment, with NAT connections, session sharing may enable a client application to open multiple queues with a remote server, such as in scenarios where destination network address translation (DNAT) and/or source network address translation (SNAT) is used. With IP address translation, mapping between a private source IP address and a public source IP address may be one-to-one, however, with IP and source port translation, the mapping may be many-to-one. Similarly, DNAT performs the translation on the destination IP and potentially to the destination UDP port. The translations are often performed in a randomized fashion, and as a result, each QP may be translated to a different remote server. Systems and methods overcome this problem through session sharing so that the QPs are associated with the same session group and the same session.

Variations of this and other such functionality can be used as well within the scope of the various embodiments as would be apparent to one of ordinary skill in the art in light of the teachings and suggestions contained herein.

FIG. 1 illustrates an example environment 100 that can be used to transmit messages between different computing devices, in accordance with at least one embodiment. The illustrated environment includes a client 102 and a server 104. The client 102 and the server 104 may include one or more computing devices that include processors, memories, input/output (I/O) devices, and the like. For example, in at least one embodiment, the client 102 and the server 104 may form a portion of a compute node, such as a node associated with a data center. The compute node may be a networked cluster of one or more computing devices that can send and receive information across a network, such as the Internet, and may be networked to one or more additional computing devices. Furthermore, the client 102 and/or the server 104 may be connected within a common cluster. For example, each of the client 102 and the server 104 may be on a common rack within a data center. However, in various embodiments, the client 102 and the server 104 may be on different racks, within different clusters, associated with different nodes, and/or combinations thereof. Additional systems may also be included, such as network switches.

In at least one embodiment, the client 102 may submit a request to establish a connection to the server 104. The connection may be a direct access connection, such as a remote direct memory access (RDMA) connection. RDMA enables two networked computers to exchange data in main memory without relying on the processor, cache, or operating system of either computer. RDMA may improve throughput and performance by freeing up resources, resulting in faster data transfer rates and lower latency between RDMA-enabled systems. RDMA systems provide a variety of advantages, including at least kernel bypass, zero-copy operations, and no central processing unit (CPU) involvement through the use of one or more RDMA-enabled systems, such as a network interface card (NIC). Accordingly, RDMA helps increase throughput and decrease latency. RDMA may be particularly useful for applications that need either low latency (e.g., HPC) or high bandwidth (e.g., cloud computing, HPC, etc.).

To establish an RDMA connection, each of the client device 102 and the server 104 may include a NIC 106, 108 having RDMA properties and/or capabilities. The NICs 106, 108 may implement respective RDMA engines to create a channel to application memory of the associated devices. For example, the NIC 106 may establish a connection to an application 110 that bypasses a kernel 112. Similarly, the NIC 108 may establish a connection to an application 114 that bypasses a kernel 116. Accordingly, latency may be decreased by skipping various steps through the respective kernels 112, 116, which may require execution of one or more instructions on processors, which decreases the available resources for compute tasks. In at least one embodiment, the hardware associated with forming these connections is embedded within the NIC. In this manner, the client 102 may be used to directly read data from main memory of the server 104 and write that data directly to the main memory of the client 102. Such applications may be suited for HPC applications, such as data centers providing processing capabilities for various applications, such as artificial intelligence, storage, and the like.

In operation, performing data transfer with RDMA includes a process that may be referred to as registering memory. This process pins memory to inform the kernel (e.g., the OS) that certain memory is for RDMA communications with a given application. Pinning the memory may prevent the OS from swapping the memory. The NIC may then store the address. Various embodiments may also set permissions for different memory regions and establish different keys. A channel is formed from the NIC to the application, as shown by the arrows extending between NIC 106 and application 110, the arrows extending between NIC 108 and the application 114, and the arrows extending between the respective NICs 106, 108.

A variety of protocols may be implemented to support RDMA, such as InfiniBand, RDMA over Converted Ethernet (RoCE), and Internet Wide Area RDMA Protocol (iWARP), among others. Each of these protocols may have different physical and link layers, but still provide the direct communication between memory locations (e.g., the applications) using a connection formed via the NICs 106, 108. However, session-based RDMA is an RDMA over ethernet protocol whose packet differs from RoCE packets, such as an RoCE version 2 packet. For example, the RoCE version 2 packet includes a UDP destination port field that may remain constant, but with SRDMA, the UDP port number can be any valid number within a UDP port range. In SRDMA, an RDMA session is associated with a UDP 5-tuple, which as noted herein includes a source IP address, a source UDP port, a destination IP address, a destination UDP port, and the transport protocol (UDP in this case). When being attached to a session group, the packets that are sent over a QP will contain the UDP 5-tuple that is associated with one of the RDMA sessions in the session group. The RDMA application is responsible for establishing the RDMA sessions, grouping them together in session groups, and attaching a QP to a session group. RDMA QPs can be attached to session groups that include one or more of the RDMA sessions. When being attached to a session group, the packets that are sent over the QP will be directed over one of the sessions of the session group in accordance with the UDP 5-tuple that is associated with one of the RDMA sessions in the group.

Embodiments of the present disclosure may be directed toward configurations in which applications open multiple QPs with the same remote (e.g., destination). These configurations may be used in a variety of situations, such as those where maximized throughput is desired while trying to overcome hardware limitations associated with a single QP. However, traditional SRDMA has problems that arise from standard configurations in which there is a 1:1 mapping between an RDMA session group and a QP. In other words, when a QP is established with traditional RDMA, that QP is associated with its own session group, which may then have its own session, and so forth. Accordingly, if the application opens multiple QPs with the same remote, the application then also opens multiple RDMA sessions groups, where the session groups may have their own sessions, and the like. As a result, the number of RDMA session groups grows linearly with the number of QPs. Moreover, a single RDMA session cannot be contained in more than one session group due to validation requirements. Therefore, the application opens multiple session groups and also establishes a unique set of RDMA sessions for the session groups, as noted herein. The traditional SRDMA configuration leads to scalability issues, both in terms of bring-up time (e.g., session/encryption handshakes, verifications, etc.) and hardware and software memory resources (e.g., RDMA session and encryption objects). Furthermore, implementation and monitoring becomes complex with the growing numbers of QPs, session groups, and sessions. Systems and methods address these drawbacks, and others, by enabling multiple QPs to be associated with a single session group.

The connection between the client 102 and the server 104 may be formed over one or more networks, which may also be referred to as a communication fabric or an Ethernet fabric. The transmission media to create the communication link may include both physical components (e.g., cables, switches, NICs, etc.) and/or virtual components (e.g., firmware, adapters, etc.).

RDMA connections may be established between endpoints, which may be referred to as a QP. For example, a first endpoint may be associated with the client 102, and a second endpoint may be associated with the server 104 at the end of a channel between the client 102 and the server 104. Each QP includes a sent queue and a receive queue and posts operations to these queues using one or more APIs, which may be referred to as a verb or verbs API. Additionally, embodiments may also include a completion queue (CQ) and/or a work queue (WQ) to track completed requests and/or prepare future instructions. For example, the WQ may schedule work to be done via the send and receive queues. Various embodiments and communications may be used with RDMA that do not incorporate each of the queues for each communication. For example, some requests may not receive a response. Additionally, some operations may be completed without generating an entity for the CQ. In at least one embodiment, an application may issue a job using a work request, which may include a pointer to a buffer. For example, the pointer may be for a message to be sent in the send queue and may show where an incoming message should be placed in the receive queue.

Moreover, RDMA transports may also be categorized as being reliable, unreliable, connected, or unconnected. A reliable transport refers to the use of acknowledgements to guarantee in-order delivery of messages, while an unreliable transport does not provide such a guarantee. A connected transport is one that has a one-to-one connection between QPs, but an unconnected transport refers to a QP that can communicate with multiple QPs. Systems and methods of the present disclosure may be used with one or more of these connection types.

Figure 2:
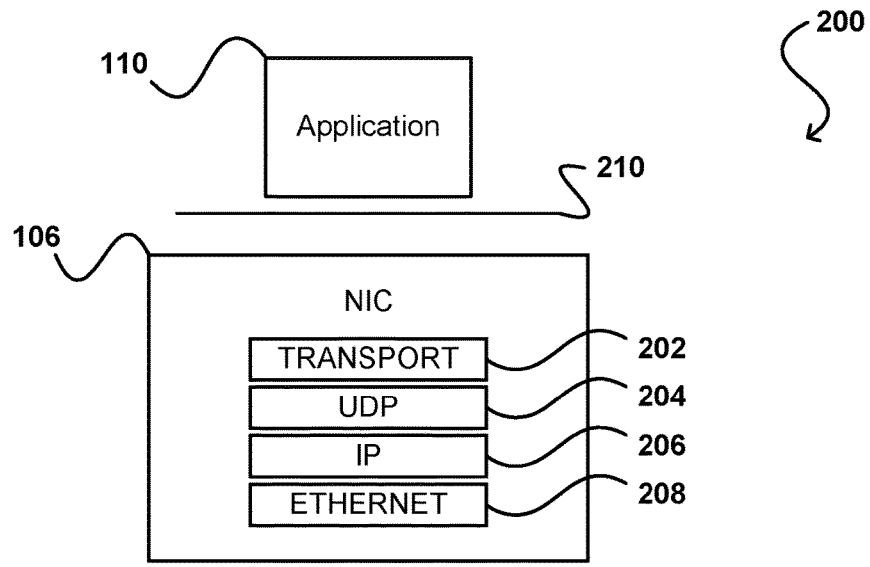
FIG. 2 illustrates example network stack for a remote direct memory access (RDMA) connection, in accordance with various embodiments.

FIG. 2 illustrates a stack 200 for RDMA connections, which in this example uses version 2 of the RoCE protocol. As noted herein, SRDMA may be directed toward an RDMA over Ethernet protocol that shares certain similarities with version 2 of the RoCE protocol. However, SRDMA may be different from RoCE version 2 at least due to the UDP destination port field. In this example, the stack may also be referred to as a protocol or network stack and is used to implement a computer networking protocol suite. The application 110 may be one or more applications or operations executing on a processor, such as a processor of a computing device, and may further be associated with one or more memory locations. The application 110 is used to post work requests, which may be in the form of a message, to a queue (e.g., the send queue). The application 110 may be associated with the NIC 106, which may include hardware implementations of different layers, among other options. For example, one or more adapters, drivers, or software implementations may be used to maintain different queues, manage overhead, and/or the like.

There may also be one or more software layers (not pictured). The software layers may be used to define the methods and mechanisms that an application needs to use the RDMA message transport service. For example, the software layer may describe methods that applications use to establish a channel between them, and may include various APIs, libraries, and the like.

In this example, one or more network protocols are supported by the stack 200, including a transport layer 202, a UDP layer 204, an IP layer 206, and an ethernet layer 208. The transport layer 202 may also be referred to as an InfiniBand transport protocol. Further included is the UDP layer 204, which may be used to send messages (such as packets) over IP. The UDP layer 204 may enable rapid communications with limited overhead due to the reduction of error checking and correction associated with the protocol. The ethernet link layer 208 may be a protocol layer for delivery of information across a physical layer of a connection, such as wires or the like. The different layers may be used to packetize different messages, implement RDMA protocol, and assure reliable delivery. In at least one embodiment, each of these layers is used as a hardware implementation within the NIC 106, and as a result certain operations may be removed from the processor of the computing device itself, thereby reducing overhead and providing more processing capabilities to complete the tasks directed to the computing device. The illustrated embodiment also includes a verbs interface 210, which may be used to allow the application 110 to send and/or receive requests.

As noted, different RDMA connections may include different protocols or specification details. For example, the RoCE standard replaces a Transmission Control Protocol/Internet Protocol (TCP/IP) network layer with the InfiniBand network layer over the Ethernet link layer. In RoCE, the link layer protocol header of the InfiniBand is removed. As noted, RoCE also depends on lossless Ethernet transmission, which may impose costs and management overhead. With RoCE connections, using a version 2 specification may extend RoCE functionality, such as by using layer 3 routing via the UDP headers. Accordingly, packets using version 2 may be routed and use the IP, as opposed to an ethernet layer for previous versions of RoCE.

Figure 3A:
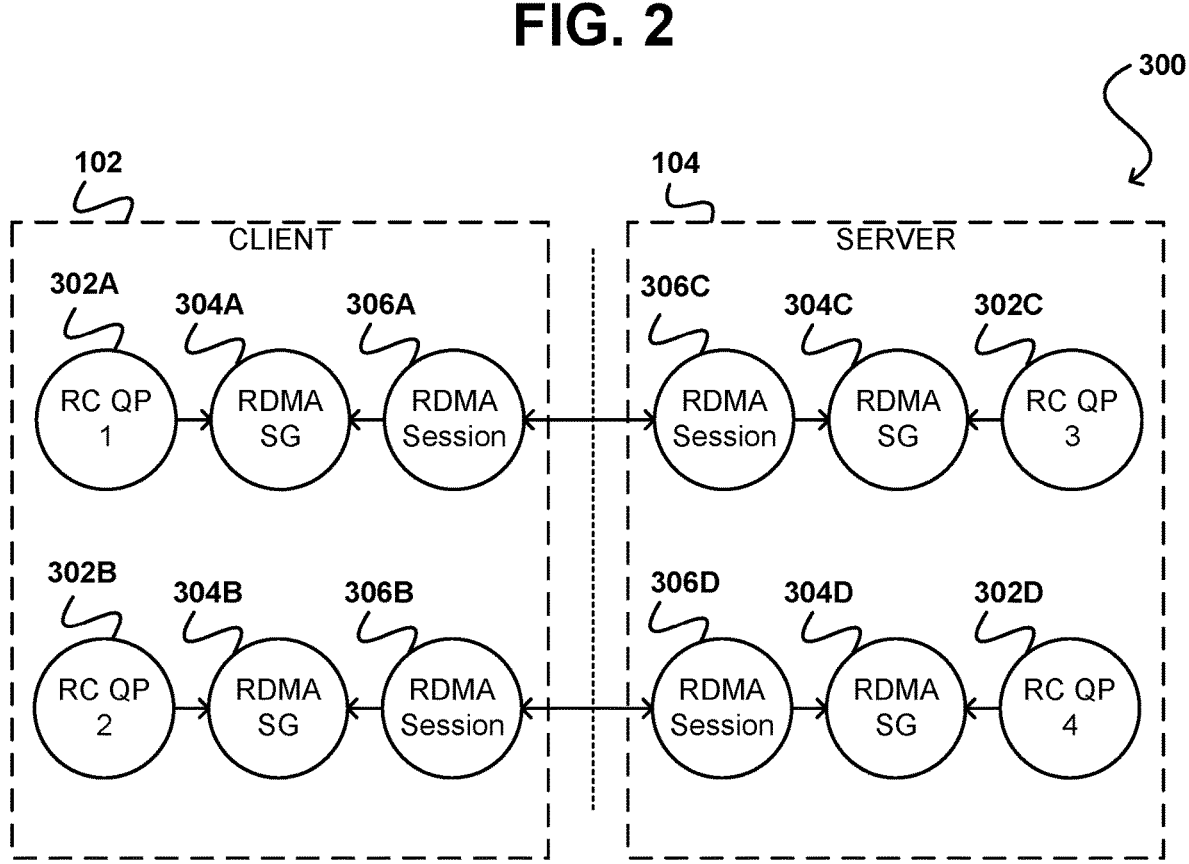
FIG. 3A illustrates an example session-based RDMA connection including a single queue pair (QP) for an RDMA session group, in accordance with various embodiments.

FIG. 3A illustrates a representation 300 of a connection diagram for a client-server SRDMA connection. The illustrated example includes a single connection (e.g., single RDMA session) within a session group between the client 102 and the server 104. That is, there is no session sharing implemented in FIG. 3A such that individual QPs are associated with individual session groups that have individual sessions for the QP. For example, the QPs 302A, 302B are established at the client 102 and QPs 302C, 302D are established at the server 104. The QPs may refer to endpoints associated with applications, where in this example QP 1 302A is associated with QP 3 302C and QP 2 302B is associated with QP 4 302D. Various QPs may be labeled as "RC QPs" to denote a reliable connection, but such a label is for illustrative purposes and not intended to limit the scope of the present disclosure.

As noted, individual QPs 302A-302D have individual session groups 304A-304D in the illustrated example, with a session group 304A being associated with QP 1 302A, a session group 304B being associated with QP 2 302B, a session group 304C being associated with QP 3 302C, and a session group 304D being associated with QP 4 302D. Similarly, each of the session groups 302A-302D also has an associated single RDMA session 306A-306D. In this example, session group 304A includes the session 306A, the session group 304B includes the session 306B, the session group 304C includes the session 306C, and the session group 304D includes the session 306D. The sessions 306A, 306B of the client 102 may be paired with other sessions 306C, 306D of the server 104 in order to form channels between the respective QPs to permit transfer of information.

As shown by the respective arrows, information can flow through individual portions of the connection, such as a message for the QP 302A that is directed through the session group 304A and transmitted to the server 104 along the RDMA session 306A. Similarly, the associated RDMA session 306C may then route the message through the session group 304C to the destination QP 3 302C.

In this example, there is only a single RDMA session 306A-306D formed for each QP 302A-302D, and therefore, for each session group 304A-304D. In other words, a single QP may only be associated with a single session. Therefore, as QPs increase, so do session groups and sessions, which may become unwieldly when attempting to grow at scale. The additional QPs, session groups, and sessions bring administrative overhead to the system, such as handshakes to negotiate connection settings, monitoring, tracking keys for encrypted communications, and the like. Systems and methods of the present disclosure provide one or more APIs to enable multiple QPs with the same destination IP to use a common session group, and therefore, a common session. In this manner, overhead may be reduced because QPs added to an existing session may share one or more parameters of the existing QPs within the session. Furthermore, the system provides independent and complete performance isolation such that, in certain embodiments, different QPs may include different performance or quality of service parameters.

Figure 3B:
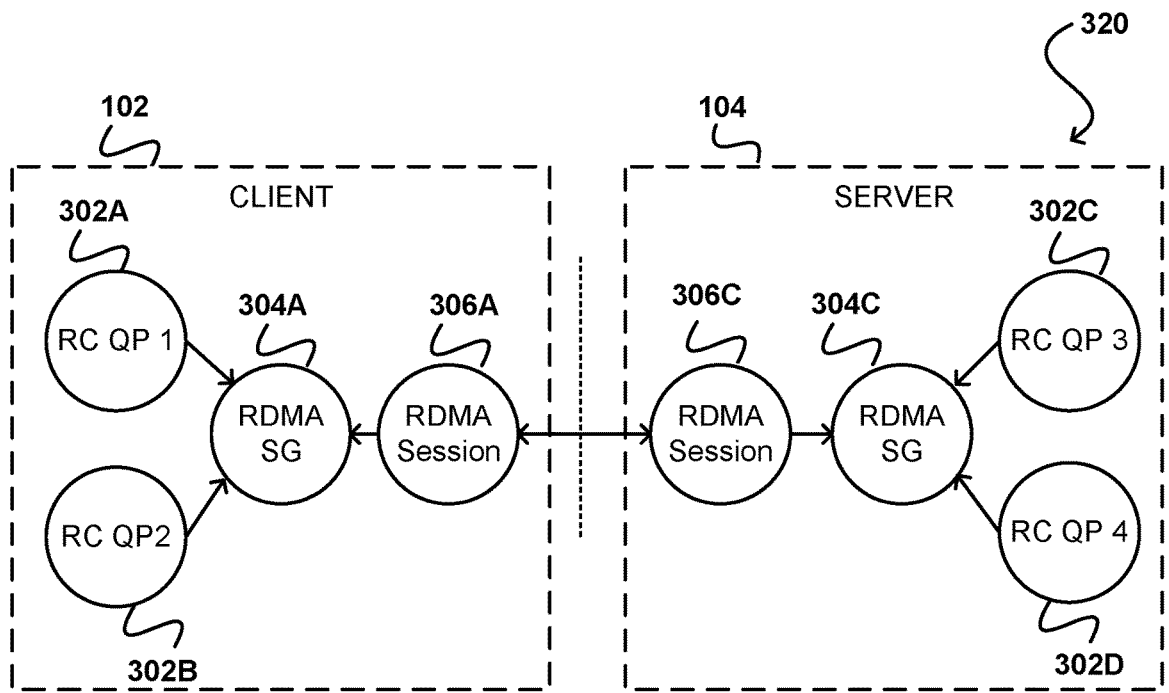
FIG. 3B illustrates an example session-based RDMA connection including multiple QPs for a single RDMA session group, in accordance with various embodiments.

FIG. 3B illustrates a representation 320 of a connection diagram for a client-server SRDMA connection in which session sharing is initialized. The illustrated example includes multiple QPs being associated with a common session group for transmission of data over a common shared session. In this manner, overhead may be reduced because management of the QPs may be limited to the common shared session.

In this example, each of the QPs 302A, 302B are associated with the RDMA session group 304A. When compared to the embodiment of FIG. 3A, the total number of session groups for the server 102 (as well as for the client 104) is reduced by half while maintaining the same number of QPs 302A, 302B. In other words, scaling is enabling at less than the 1:1 ratio of common SRDMA connections. The illustrated embodiment includes the QPs 302A, 302B, which in this non-limiting example are also reliable connection QPs, being associated with the session group 304A that includes the RDMA session 306A having a connection to the RDMA session 306C associated with the server 104. The RDMA session 306C is further associated with the RDMA session group 304C having the QPs 302C, 302D. As previously noted, the QPs may be associated with different endpoints for a connection, where QP 1 302A may be correlated to QP 3 302C and QP 2 302B may be correlated to QP 4 302D. Further, in at least one embodiment, the QPs 302 may have a common destination IP, and as a result, the direct correlation may not be rigid.

Various systems and methods provide for the QPs to be added after one or more RDMA sessions, and therefore RDMA session groups, have been established. For example, the RDMA session group 304A may be established upon addition of the RC QP 1 302A. Thereafter, there may be handshake that forms the connection with the RDMA session 306C and RDMA session group 304C for the server 104 based on the associated endpoint RC QP 3 302C. Later, it may be desirable to add additional QPs to the existing session and/or session group. For example, it may be desirable to increase throughput for a given application, but hardware restrictions may limit the data transmission for a single QP. Accordingly, systems and methods of the present disclosure may permit the addition of the RC QP 2 302B to the RDMA session group 304A. For example, the client 102 and/or one or more applications or users associated with the client 102, may access one or more APIs to submit a request to add a QP. The request may be evaluated to determine whether the new QP has a same destination IP as the existing RC QP 1 302A. For example, the APIs may query the session ID, determine the new QP has the same destination IP and destination UDP port, and then may provide the session ID, along with the add QP request, to permit inclusion of the new QP with the existing session and/or session group. However, if the destination IP and/or destination UDP port is not the same, then the determination may be made to generate a new session group with a new session. In at least one embodiment, the protection domain for the requested new QP may also be evaluated to determine whether the new QP has been created by the same application as one or more other QPs within the session group.

In at least one embodiment, adding a new QP to an existing session group may permit sharing or duplication of various parameters of the existing QP to the new QP. For example, keys may be shared for encrypted communications, connection parameters may be duplicated, and/or the like. However, in at least one embodiment, the new QP may have one or more different operating parameters. For example, the new QP may have a higher quality of service and/or may be used for specific types of transfer operations, and as a result, may use different parameters or accept different types of messages. The parameters of the QP may be provided along with the request to add the new QP.

Figure 3C:
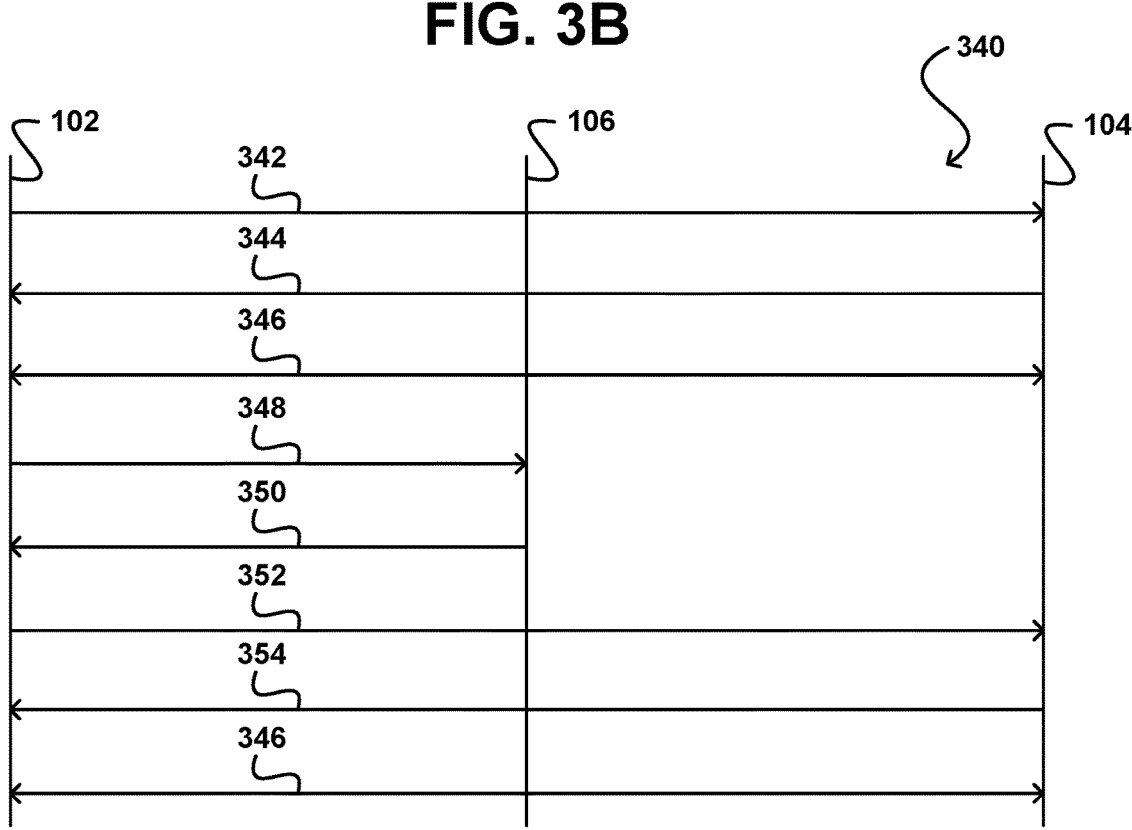
FIG. 3C illustrates an example communication sequence to establish a new QP for an existing RDMA session group, in accordance with various embodiments.

FIG. 3C illustrates a representation 340 of a communication sequence to add a QP to an existing session group. In at least one embodiment, an existing SRDMA connection may exist between a client and a server. For example, a QP may be added to a session after a handshake that establishes the initial connection. For SRDMA connections, the QP may be associated with a session group that has a session to create a channel between the QPs at the client and the server. Systems and methods may be directed toward adding a QP to the existing session group, thereby reducing overhead and administrative costs associated with adding new QPs that have a new, separate session group and/or sessions.

In this example, the client 102 may initialize a handshake with the server 104. For example, an add QP and/or add session request 342 and receive a reply 344. After the connection is established, such as by adding the QPs at the client 102 and the server 104 and establishing the channel, information may be transmitted across the channel 346. This connection may be referred to as an SRDMA connection because a session group may be associated with the SRDMA session between the client 102 and the server 104, and moreover, an SRDMA session group may be associated with the QPs at the client 102 and the server 104, as described herein.

In at least one embodiment, the client 102 and/or an administrator associated with the client 102, may determine another QP may be desirable for one or more operations. For example, hardware limitations may limit the amount of information flow with a single session. However, the desired new QP may have the same remote as the existing QP (e.g., same destination IP, same destination UDP port). With traditional SRDMA connections, a new handshake, session group, and session would be established for this new QP. Each of these steps has an associated administrative cost, which may be overwhelming in cases where multiple QPs are added and/or when attempting to execute various applications at scale. Systems and methods may be provided to address this concern by establishing a new QP with the existing session.

In this example, a session ID query 348 is transmitted to the NIC 106 to validate that the new QP has the same remote as the existing QP associated with the previously established connection. The session ID may then be provided as a reply 350 to the server 102 such that when an add QP request 352 is provided to the client 104, the session ID may be included within the add QP request 352. As a result, when the connection is established, at least in part, via the reply 354, one or more parameters for the existing connection may be used to add the new QP to the existing session group, such as reusing certain encryption and encapsulation parameters, among other options. As a result, information may be transmitted across the exiting channel 346.

Embodiments of the present disclosure may include one or more APIs or the like to query and initialize a new handshake protocol in order to add a new QP to an existing session group and/or session. In at least one embodiment, the new QP is associated with the same remote as the one or more existing QPs. For example, hardware limitations may restrict throughput for a single QP, but adding new QPs to the same session may be used to overcome these restrictions. While traditional methods using SRDMA require an application to open multiple RDMA session groups for multiple QPs, various embodiments address this problem by enabling session sharing for a single session group, thereby permitting a single session group to be shared between multiple QPs opened by the same application directed to the same remote. Various embodiments implement a new add QP handshake to associate the new QP with the existing RDMA session group, which may further include QP validations, encryption and encapsulation, and the like. Prior to attaching the new QP to the existing session group, the new QP may be validated to verify the new QP is connected to the same remote as the session group. By permitting session sharing, NIC overhead may be reduced in terms of memory usage while also simplifying connection establishment and monitoring, among other benefits described herein.

Figure 4:
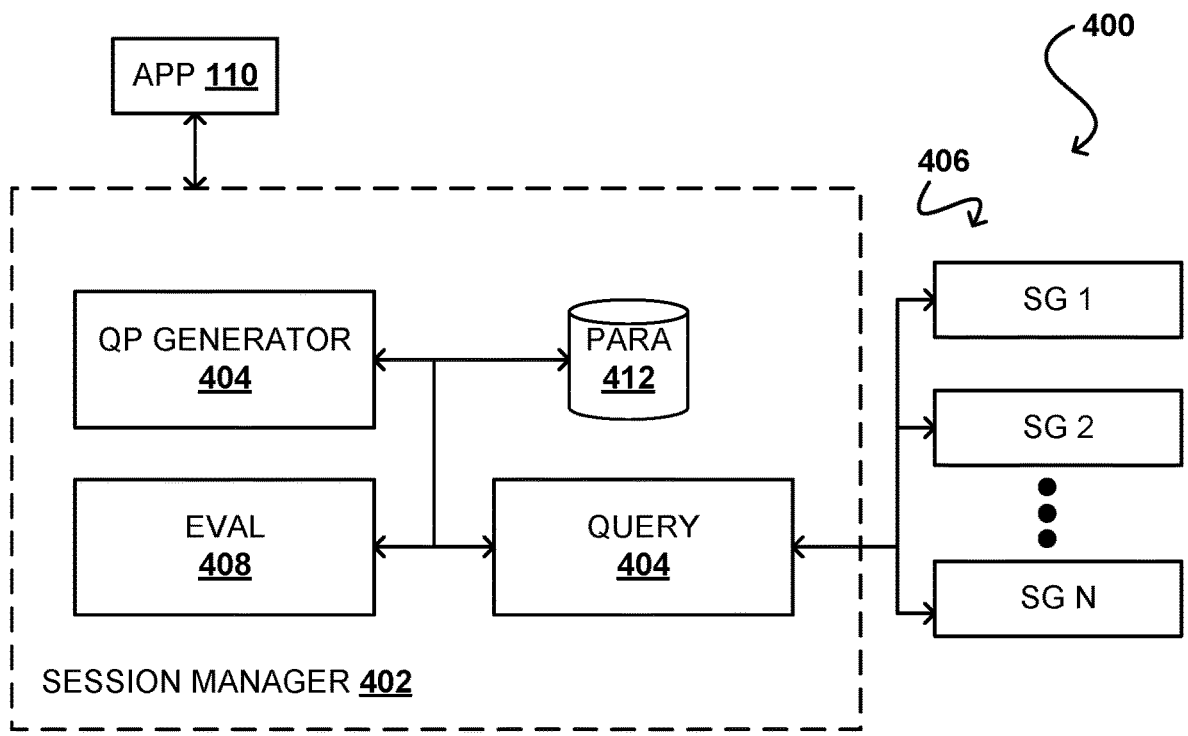
FIG. 4 illustrates an example environment for managing session-based RDMA connections, in accordance with various embodiments.

FIG. 4 illustrates an environment 400 that may be deployed to support one or more session sharing functions with SRDMA communications. In this example, a new QP may be added to an existing session group for a pre-established connection. Moreover, one or more embodiments may also be used to establish two or more QPs simultaneously or substantially simultaneously within a new or pre-existing session group. In various embodiments, the new QP may share one or more parameters of an existing QP associated with the existing session group. Moreover, in at least one embodiment, different parameters may be established for the new QP while still sharing the same existing session group and/or session of the existing QP. In this example, a session manager 402 may be used to receive requests, such as from the application 110, to add or remove sessions, session groups, and/or QPs. For example, in at least one embodiment, the application 110 may generate an add QP request such that the QP is associated with an existing session group. This new QP may be added if the QP has the same remote as the remote of the existing session group. In at least one embodiment, a session query system 404 may be used to query the add QP request and/or one or more existing session groups 406. For example, a session ID may be extracted for a given session associated with the session groups 406 in order to permit addition of the add QP request to the existing session group. The session ID may provide information and/or metadata related to the remote (e.g., destination IP, destination UDP port) of the session groups.

An evaluation system 408 may be used to evaluate and compare the new QP remote to the information extracted by the query system 404. For example, destination IPs and/or destination UDP ports may be compared, connection parameters may be compared, and/or the like. In at least one embodiment, the evaluation system 408 may determine whether a new QP may be added to an existing session group based, at least in part, on its destination IP and/or destination UDP port, where QPs with the same destination IP and/or destination UDP port may be added to a common session group. Further, evaluation of the protection domain for given QPs may provide information associated with whether or not QPs are created by the same application or process, which may provide an indication that the QPs may be added to the same session group. A QP generator 410 may then be used to establish the connection, which may include obtaining one or more parameters from a parameter data store 412. For example, the data store 412 may include various parameters and configurations for existing session groups 406 and may then use that information to establish the new QP, which may reduce administrative burdens associated with adding new QPs. In this manner, the session manager 402 may monitor and control different add QP requests.

Figure 5A:
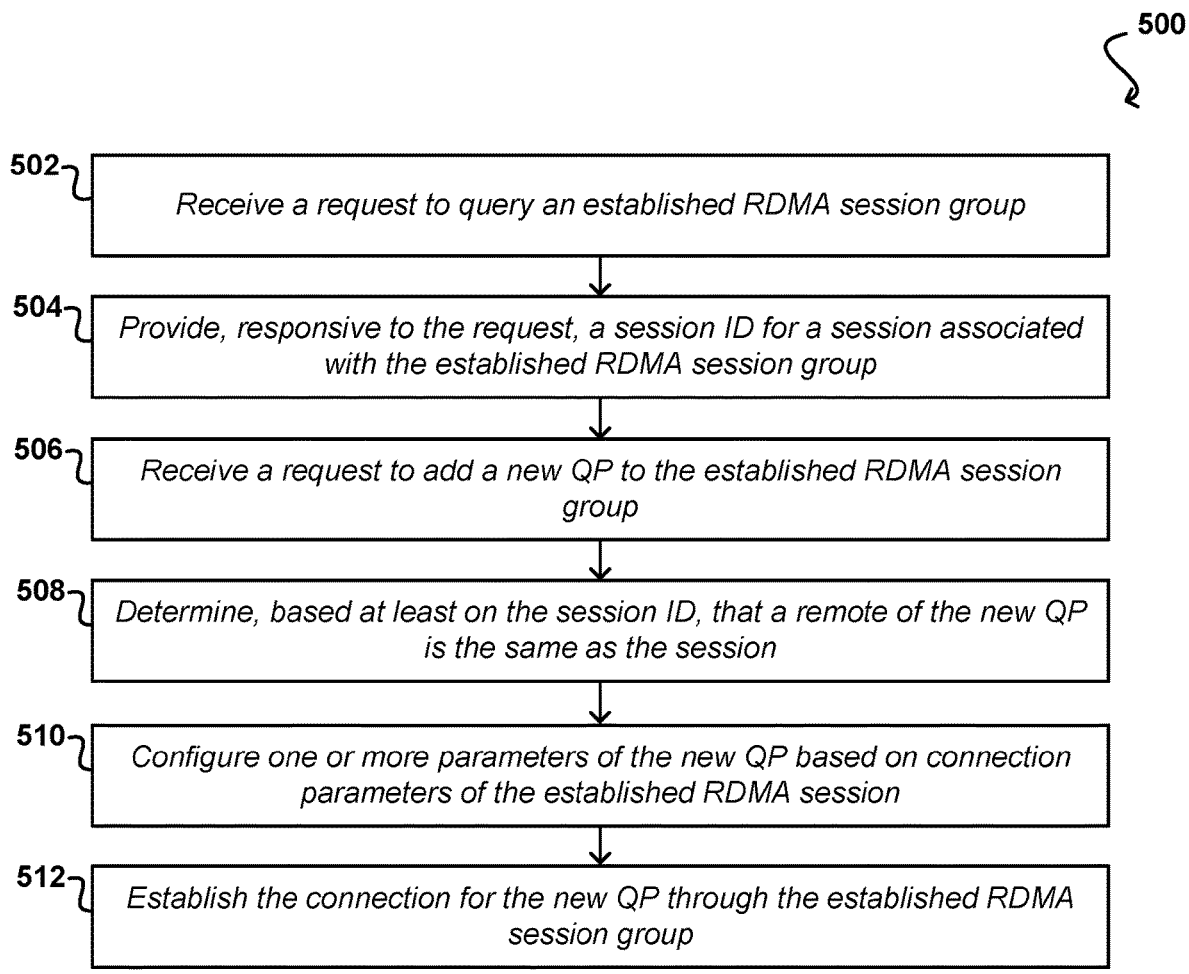
FIG. 5A illustrates an example process to establish a new QP with an existing RDMA session group, in accordance with various embodiments.

FIG. 5A illustrates an example process 500 for session sharing between QPs having a common destination IP and/or destination UDP port. It should be understood that for this and other processes presented herein that there may be additional, fewer, or alternative steps performed or similar or alternative orders, or at least partially in parallel, within the scope of the various embodiments unless otherwise specifically stated. In this example, a request is received to query an established RDMA session group 502. The query may include evaluation of one or more connection parameters for the established room, such as evaluating a session associated with the session group. In at least one embodiment, evaluations may determine the destination IP, the destination UDP port, configuration parameters, encryption information, and the like. A session ID may be provided responsive to the request 504. The session ID may provide information for an associated session with the session group and/or information for the connection, among other options. A request may also be received to add a new QP to the established RDMA session group 506. The request may be received before or after querying the established RDMA session group. The add QP request may include information, such as the destination IP, desired connection parameters, and the like.

In at least one embodiment, the add QP request may be evaluated to determine, based at least on the session IP, whether a remote of the QP is the same as the existing session for the session group 508. Because the new QP and the existing session (and associated existing QP) have a common destination IP and/or destination UDP port, the new QP may be permitted to share the session. As a result, configuration parameters may be established based, at least in part, on connection parameters for the established RDMA session group 510. Accordingly, the connection may be established for the new QP through the established RDMA group 512.

Figure 5B:
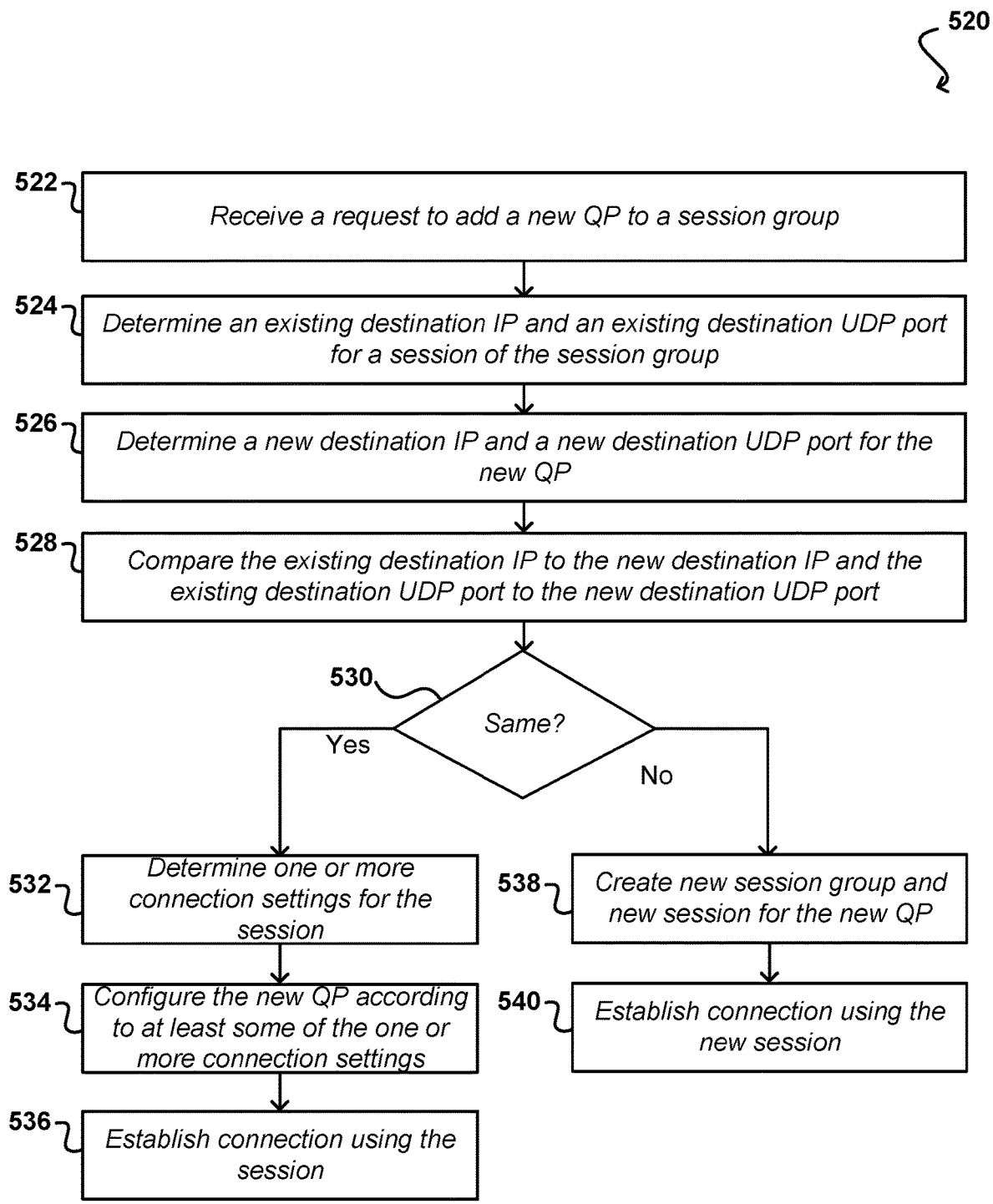
FIG. 5B illustrates an example process to establish a new QP with an existing RDMA session group, in accordance with various embodiments.

FIG. 5B illustrates an example process 520 for adding a new QP for an SRDMA session. In this example, a request is received to add a new QP to a session group 522. For example, an application may transmit a request to a session manager, which may be executed on the NIC, to add a QP. The request may further indicate that the QP is to be added to an existing session and/or to be associated with an existing session group. A destination IP and destination UDP port for a session of the existing session group may be determined 524, along with a new destination IP and new destination UDP port for the requested new QP 526. The respective destination IPs and UDP ports may be determined by querying properties of the session group, evaluating portions of the request, or combinations thereof. The existing destination IP, the existing destination UDP port, the new QP destination IP, and the new QP destination UDP port may be compared 528. Comparing the destination IPs and UDP ports enables the system to determine whether the two share a common remote. For example, in at least one embodiment, an active side may use the same UDP destination port for all sessions within a group, while the UDP source port may different between sessions in the group. Furthermore, various embodiments may also determine whether both QPs are associated with the same protection domain (PD), which would provide an indication that the two QPs were created by the same application and process.

A determination is made, based on the comparison, whether the existing destination IP is the same as the new QP destination IP and whether the existing destination UDP port is the same as the new destination UDP port 530. If so, then the new QP may be added to the existing session group. For example, one or more connection settings for the existing session may be determined 532 and the new QP may be configured using at least some of those connection settings 534. As a result, a new connection may be established to the existing session for the new QP 536. However, if the determination is made that the existing destination IP is not the same as the new QP destination IP and/or that the existing destination UDP port is not the same as the new destination UDP port, then a new session group may be created for the new QP 538, and a new connection may be established using a new session 540.

Figure 5C:
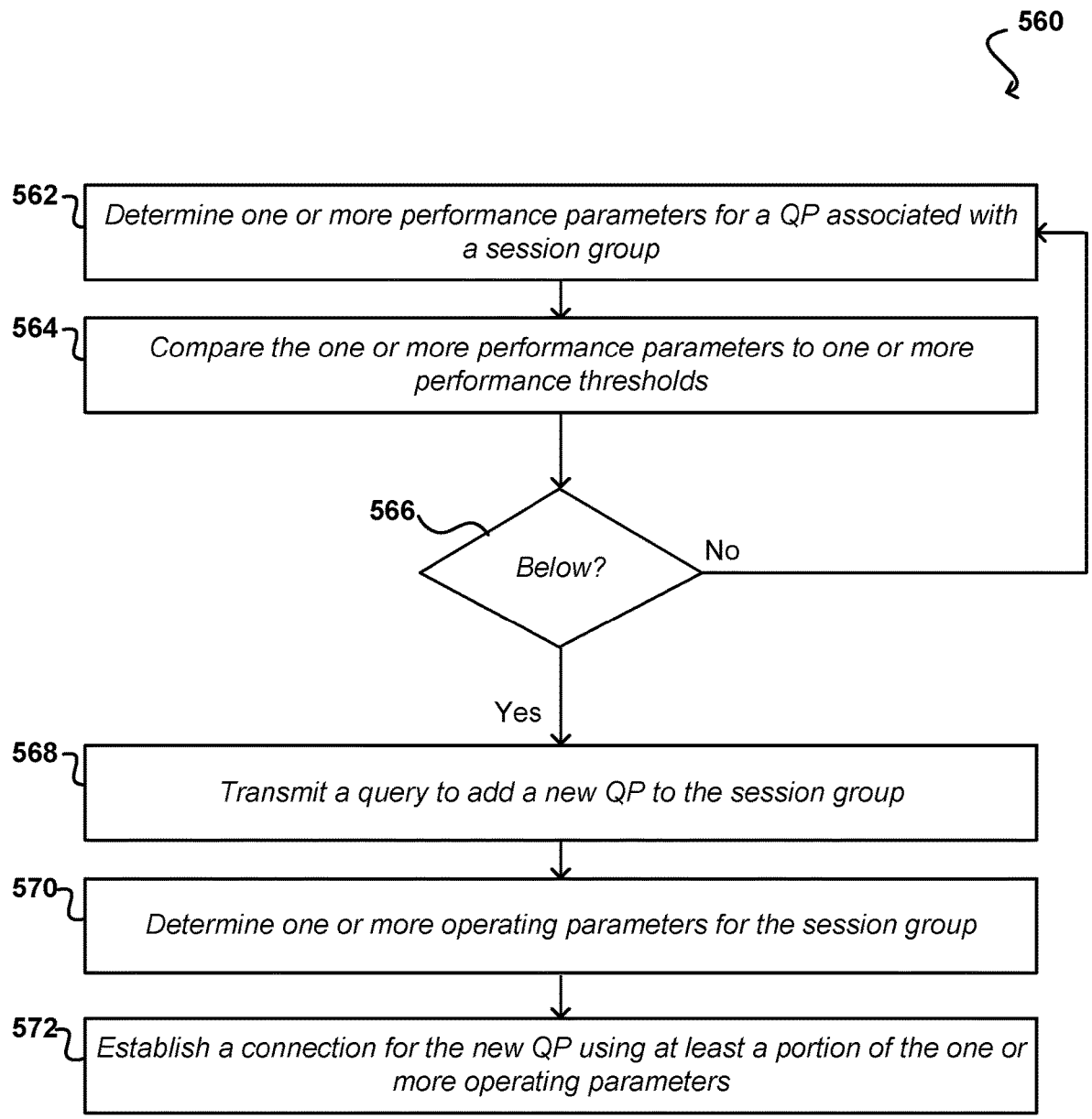
FIG. 5C illustrates an example process to establish a new QP with an existing RDMA session group, in accordance with various embodiments.

FIG. 5C illustrates an example process 560 for adding a new QP to an existing session group. In this example, performance parameters for a QP within an existing session group are monitored 562 and compared to one or more performance thresholds 564. For example, throughput may be monitored for the QP to determine whether desired performance is met. It may be determined whether or not the performance parameters are below a threshold 566. If no, monitoring of the connection may continue, where the monitoring may be continuous, over period of time, or upon request to examine the connection. If the performance is below the threshold, then a query to establish a new QP may be transmitted 568. One or more operating parameters may then be determined for the existing session group 570 and at least some of those one or more operating parameters may be used to establish a connection for the new QP using the existing session group 572.

As discussed, aspects of various approaches presented herein can be lightweight enough to execute on a device such as a client device, such as a personal computer or gaming console, in real time. Such processing can be performed on content (e.g., a rendered version of a unique asset) that is generated on, or received by, that client device or received from an external source, such as streaming data or other content received over at least one network. In some instances, the processing and/or determination of this content may be performed by one of these other devices, systems, or entities, then provided to the client device (or another such recipient) for presentation or another such use.

Figure 6:
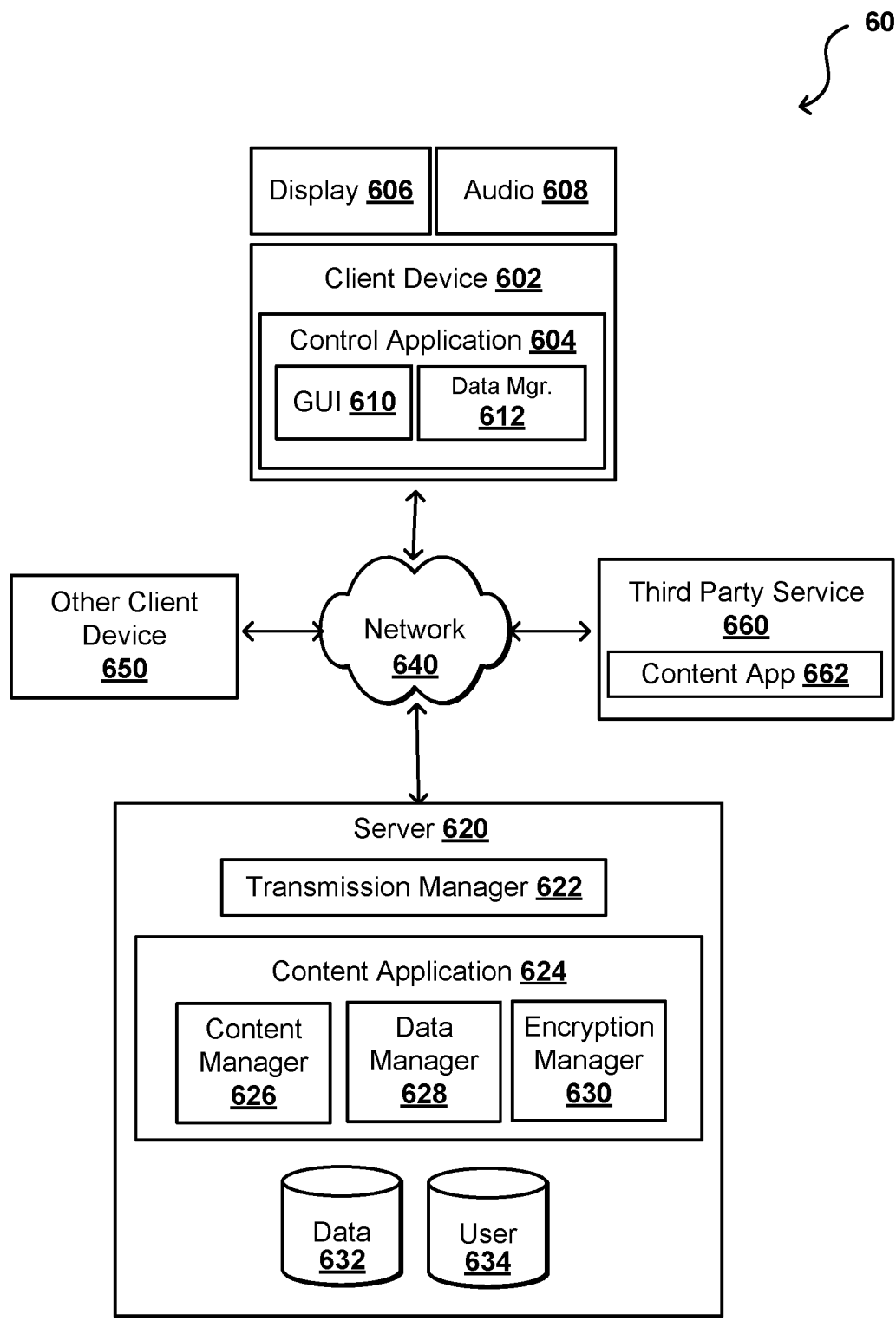
FIG. 6 illustrates an example network-based system in which aspects of at least one embodiment can be implemented.

As an example, FIG. 6 illustrates an example network configuration 600 that can be used to provide, generate, modify, encode, process, and/or transmit data or other such content. In this example, data can be encrypted for at least storage or transmission. In at least one embodiment, a client device 602 can generate or receive data for a session using components of a control application 604 on client device 602 and data stored locally on that client device. In at least one embodiment, a content application 624 executing on a server 620 (e.g., a cloud server or edge server) may initiate a session associated with at least client device 602, as may utilize a session manager and user data stored in a user database 634, and can cause data in a database 632 to be determined by a content manager 626. A content manager 626 may work with a data manager 628 to obtain or process (e.g., decrypt) data that is to be provided for presentation, or used in a process to generate content for presentation, via the client device 602. In at least one embodiment, this data manager 628 can work with an encryption manager 630 to manage various aspects of data encryption, such as to manage which data is to be encrypted, and which keys are to be used to encrypt that data (or at least how those keys are to be generated for a given type of key). At least a portion of the data or content may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding control application 604, which may also or alternatively include a graphical user interface 610 and data manager 612, for use in providing content for presentation via the client device 602. A decoder may also be used to decode data received over the network(s) 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 634, to client device 602. In at least one embodiment, at least a portion of this content can be obtained or streamed from another source, such as a third party service 660 or other client device 650, that may also include a content application 662 for generating or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Data Center

Figure 7:
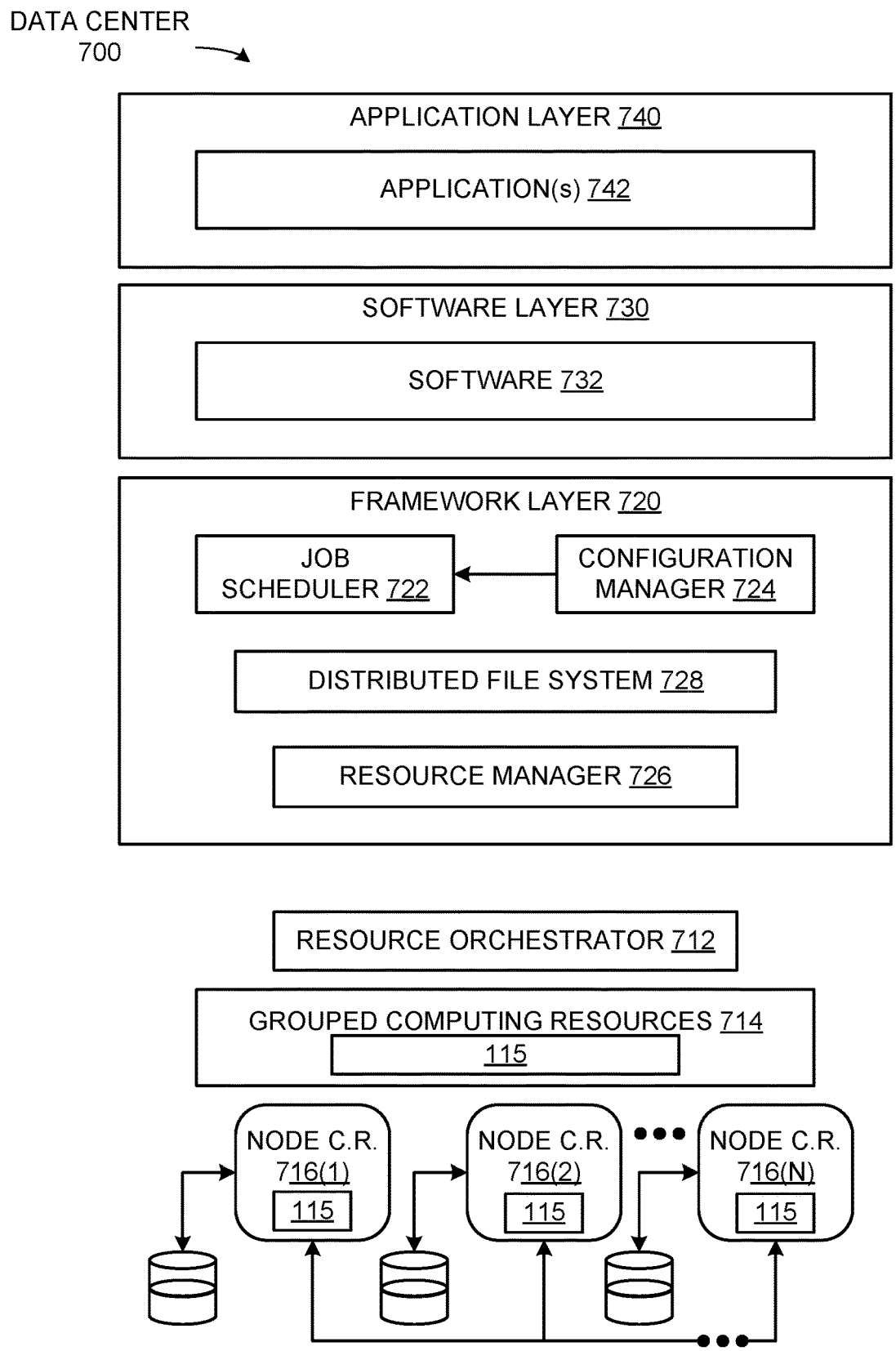
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730 and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents a positive integer (which may be a different integer "N" than used in other figures). In at least one embodiment, node C.R.s 716(1)-716(N) may include, but are not limited to, any number of central processing units ("CPUs") or other processors (including accelerators, field programmable gate arrays (FPGAs), graphics processors, etc.), memory storage devices 718(1)-718(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). In at least one embodiment, separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator @1@12 may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resources 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. In at least one embodiment, one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or perform inferencing of information, such as image recognition, speech recognition, or other artificial intelligence services.

Inference and/or training logic 115 are used to perform inferencing and/or training operations associated with one or more embodiments. In at least one embodiment, inference and/or training logic 115 may be used in system FIG. 7 for inferencing or predicting operations based, at least in part, on weight parameters calculated using neural network training operations, neural network functions and/or architectures, or neural network use cases described herein.

Embodiments presented herein can allow for a hardware-based rekeying process that does not require significant downtime or software modification.

Computer Systems

Figure 8:
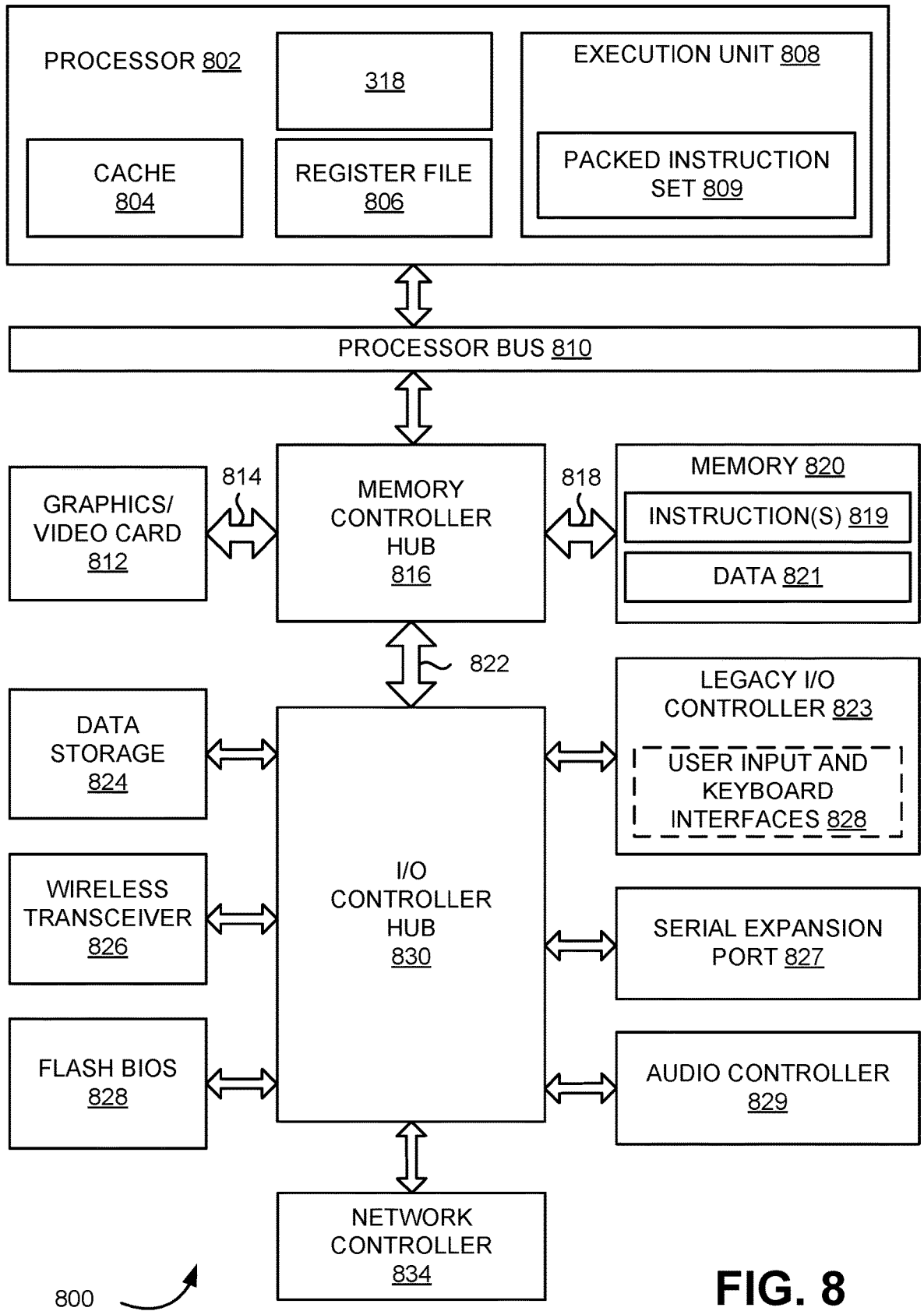
FIG. 8 is a block diagram illustrating a computer system, according to at least one embodiment.

FIG. 8 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™ Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment, computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, a register file 806 may store different types of data in various registers including, without limitation, integer registers, floating point registers, status registers, and an instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor, along with associated circuitry to execute instructions, operations used by many multimedia applications may be performed using packed data in processor 802. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be a Dynamic Random Access Memory ("DRAM") device, a Static Random Access Memory ("SRAM") device, a flash memory device, or another memory device. In at least one embodiment, memory 820 may store instruction(s) 819 and/or data 821 represented by data signals that may be executed by processor 802.

In at least one embodiment, a system logic chip may be coupled to processor bus 810 and memory 820. In at least one embodiment, a system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O interface 822. In at least one embodiment, a system logic chip may provide a graphics port for coupling to a graphics controller. In at least one embodiment, MCH 816 may be coupled to memory 820 through high bandwidth memory path 818 and a graphics/video card 812 may be coupled to MCH 816 through an Accelerated Graphics Port ("AGP") interconnect 814.

In at least one embodiment, computer system 800 may use system I/O interface 822 as a proprietary hub interface bus to couple MCH 816 to an I/O controller hub ("ICH") 830. In at least one embodiment, ICH 830 may provide direct connections to some I/O devices via a local I/O bus. In at least one embodiment, a local I/O bus may include, without limitation, a high-speed I/O bus for connecting peripherals to memory 820, a chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as a Universal Serial Bus ("USB") port, and a network controller 834. In at least one embodiment, data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary SoC. In at least one embodiment, devices illustrated in FIG. 8 may be interconnected with proprietary interconnects, standardized interconnects (e.g., PCIe) or some combination thereof. In at least one embodiment, one or more components of computer system 800 are interconnected using compute express link (CXL) interconnects.

Inference and/or training logic 115 are used to perform inferencing and/or training operations associated with one or more embodiments. In at least one embodiment, inference and/or training logic 115 may be used in system FIG. 8 for inferencing or predicting operations based, at least in part, on weight parameters calculated using neural network training operations, neural network functions and/or architectures, or neural network use cases described herein.

Embodiments presented herein can allow for a hardware-based rekeying process that does not require significant downtime or software modification.

Figure 9:
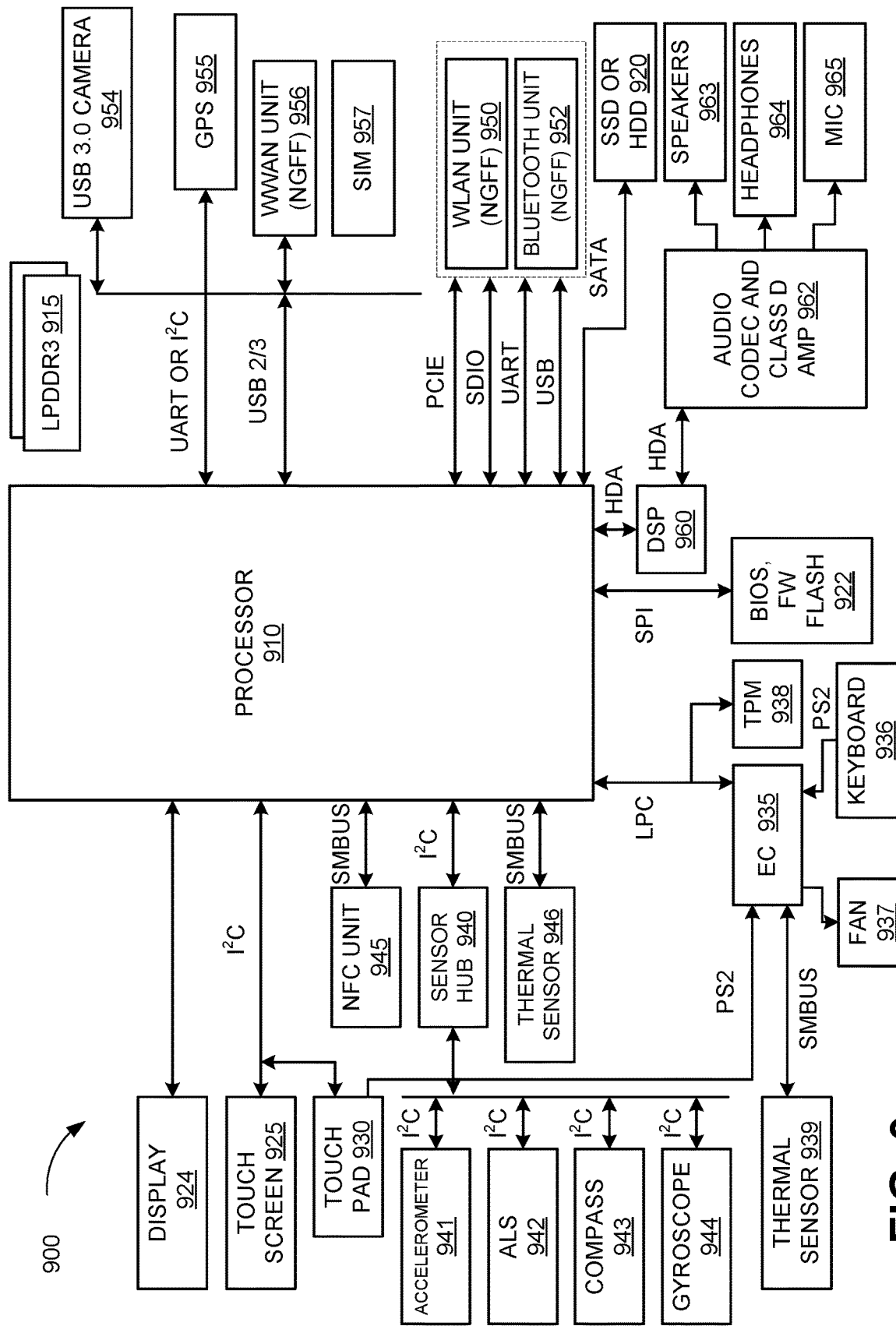
FIG. 9 is a block diagram illustrating a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 900 may include, without limitation, processor 910 communicatively coupled to any suitable number or kind of components, peripherals, modules, or devices. In at least one embodiment, processor 910 is coupled using a bus or interface, such as a I$^2$C bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary SoC. In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive

920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) unit 955, a camera ("USB 3.0 camera") 954 such as a USB 3.0 camera, and/or a Low Power Double Data Rate ("LPDDR") memory unit ("LPDDR3") 915 implemented in, for example, an LPDDR3 standard. These components may each be implemented in any suitable manner.

In at least one embodiment, other components may be communicatively coupled to processor 910 through components described herein. In at least one embodiment, an accelerometer 941, an ambient light sensor ("ALS") 942, a compass 943, and a gyroscope 944 may be communicatively coupled to sensor hub 940. In at least one embodiment, a thermal sensor 939, a fan 937, a keyboard 936, and touch pad 930 may be communicatively coupled to EC 935. In at least one embodiment, speakers 963, headphones 964, and a microphone ("mic") 965 may be communicatively coupled to an audio unit ("audio codec and class D amp") 962, which may in turn be communicatively coupled to DSP 960. In at least one embodiment, audio unit 962 may include, for example and without limitation, an audio coder/decoder ("codec") and a class D amplifier. In at least one embodiment, a SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Inference and/or training logic 115 are used to perform inferencing and/or training operations associated with one or more embodiments. In at least one embodiment, inference and/or training logic 115 may be used in system FIG. 9 for inferencing or predicting operations based, at least in part, on weight parameters calculated using neural network training operations, neural network functions and/or architectures, or neural network use cases described herein.
Embodiments presented herein can allow for a hardware-based rekeying process that does not require significant downtime or software modification.

Figure 10:
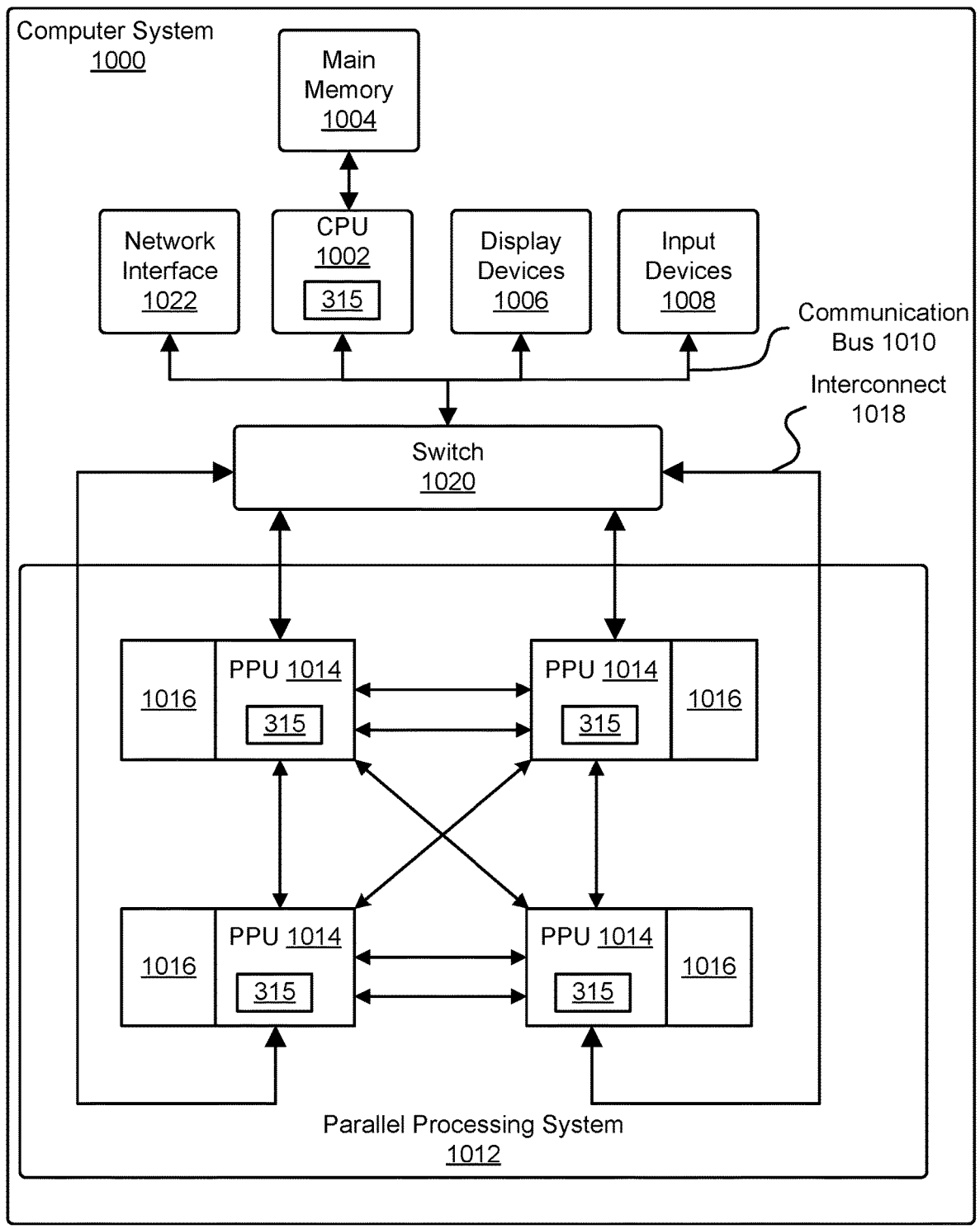
FIG. 10 illustrates a computer system, according to at least one embodiment.

FIG. 10 illustrates a computer system 1000, according to at least one embodiment. In at least one embodiment, computer system 1000 is configured to implement various processes and methods described throughout this disclosure.

In at least one embodiment, computer system 1000 comprises, without limitation, at least one central processing unit ("CPU") 1002 that is connected to a communication bus 1010 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1000 includes, without limitation, a main memory 1004 and control logic (e.g., implemented as hardware, software, or a combination thereof) and data are stored in main memory 1004, which may take form of random access memory ("RAM"). In at least one embodiment, a network interface subsystem ("network interface") 1022 provides an interface to other computing devices and networks for receiving data from and transmitting data to other systems with computer system 1000.

In at least one embodiment, computer system 1000, in at least one embodiment, includes, without limitation, input devices 1008, a parallel processing system 1012, and display devices 1006 that can be implemented using a conventional cathode ray tube ("CRT"), a liquid crystal display ("LCD"), a light emitting diode ("LED") display, a plasma display, or other suitable display technologies. In at least one embodiment, user input is received from input devices 1008 such as keyboard, mouse, touchpad, microphone, etc. In at least one embodiment, each module described herein can be situated on a single semiconductor platform to form a processing system.

Inference and/or training logic 115 are used to perform inferencing and/or training operations associated with one or more embodiments. In at least one embodiment, inference and/or training logic 115 may be used in system FIG. 10 for inferencing or predicting operations based, at least in part, on weight parameters calculated using neural network training operations, neural network functions and/or architectures, or neural network use cases described herein.
Embodiments presented herein can allow for a hardware-based rekeying process that does not require significant downtime or software modification.

Figure 11:
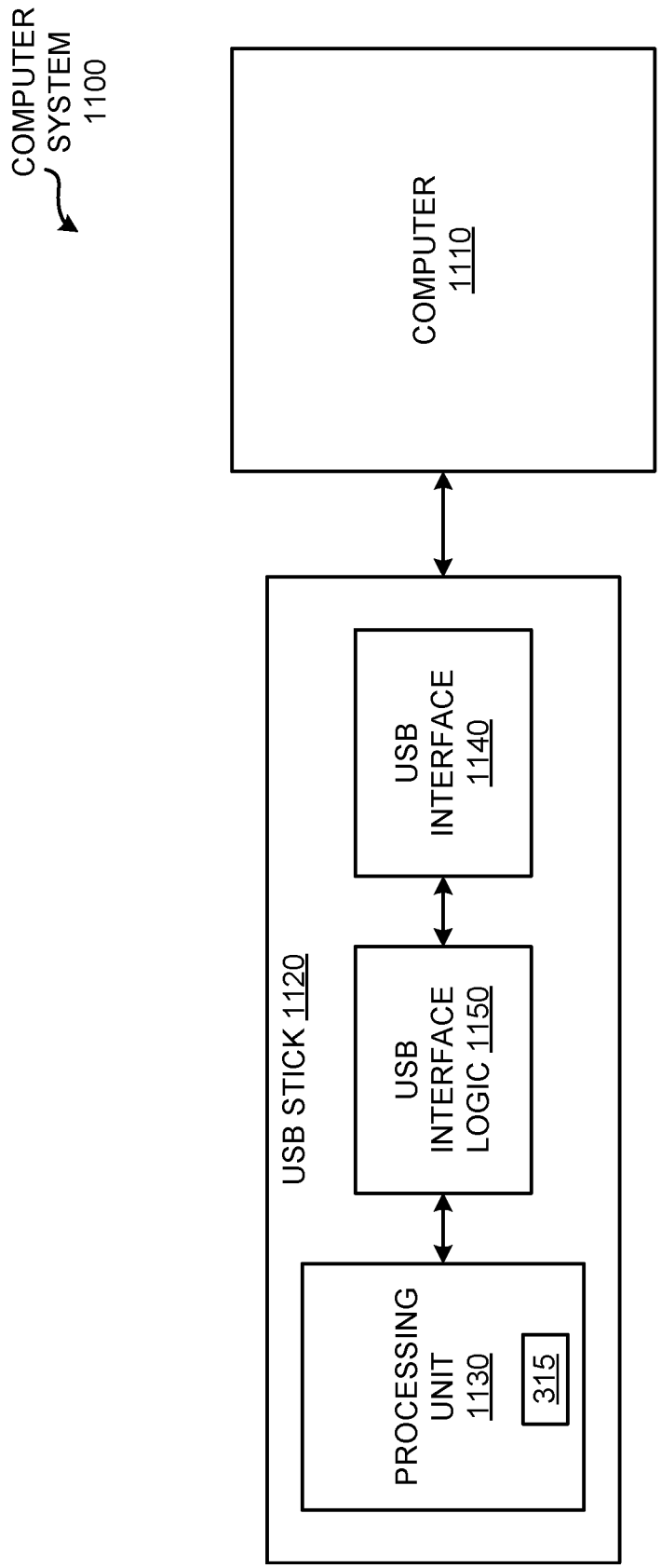
FIG. 11 illustrates a computer system, according to at least one embodiment.

FIG. 11 illustrates a computer system 1100, according to at least one embodiment. In at least one embodiment, computer system 1100 includes, without limitation, a computer 1110 and a USB stick 1120. In at least one embodiment, computer 1110 may include, without limitation, any number and type of processor(s) (not shown) and a memory (not shown). In at least one embodiment, computer 1110 includes, without limitation, a server, a cloud instance, a laptop, and a desktop computer.

In at least one embodiment, USB stick 1120 includes, without limitation, a processing unit 1130, a USB interface 1140, and USB interface logic 1150. In at least one embodiment, processing unit 1130 may be any instruction execution system, apparatus, or device capable of executing instructions. In at least one embodiment, processing unit 1130 may include, without limitation, any number and type of processing cores (not shown). In at least one embodiment, processing unit 1130 comprises an application specific integrated circuit ("ASIC") that is optimized to perform any amount and type of operations associated with machine learning. For instance, in at least one embodiment, processing unit 1130 is a tensor processing unit ("TPC") that is optimized to perform machine learning inference operations. In at least one embodiment, processing unit 1130 is a vision processing unit ("VPU") that is optimized to perform machine vision and machine learning inference operations.

In at least one embodiment, USB interface 1140 may be any type of USB connector or USB socket. For instance, in at least one embodiment, USB interface 1140 is a USB 3.0 Type-C socket for data and power. In at least one embodiment, USB interface 1140 is a USB 3.0 Type-A connector. In at least one embodiment, USB interface logic 1150 may include any amount and type of logic that enables processing unit 1130 to interface with devices (e.g., computer 1110) via USB connector 1140.

Inference and/or training logic 115 are used to perform inferencing and/or training operations associated with one or more embodiments. In at least one embodiment, inference and/or training logic 115 may be used in system FIG. 11 for inferencing or predicting operations based, at least in part, on weight parameters calculated using neural network training operations, neural network functions and/or architectures, or neural network use cases described herein.
Embodiments presented herein can allow for a hardware-based rekeying process that does not require significant downtime or software modification.

Figure 12A:
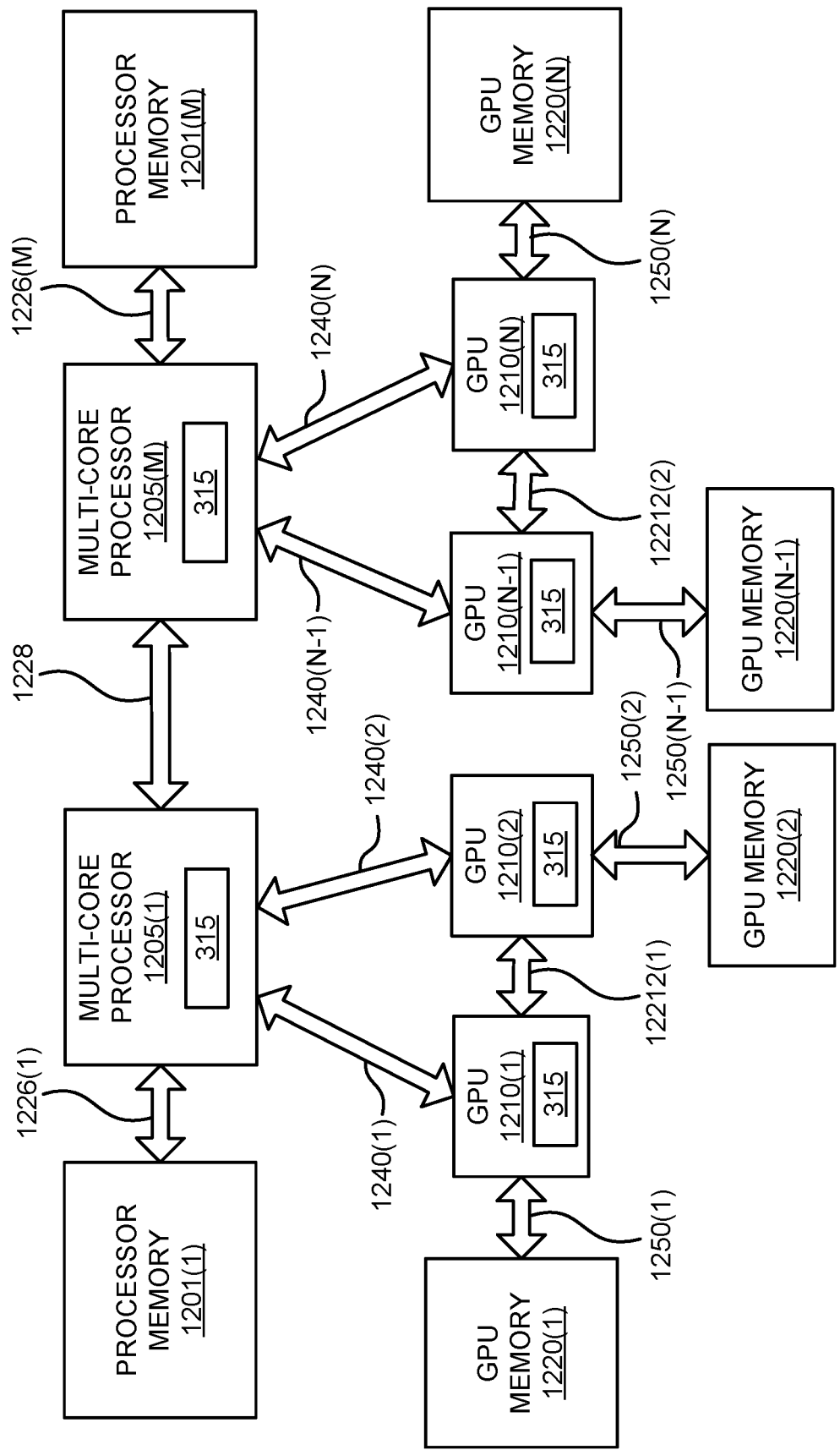
FIG. 12A illustrates a computer system, according to at least one embodiment.

FIG. 12A illustrates an exemplary architecture in which a plurality of GPUs 1210(1)-1210(N) is communicatively coupled to a plurality of multi-core processors 1205(1)-1205(M) over high-speed links 1240(1)-1240(N) (e.g., buses, point-to-point interconnects, etc.). In at least one embodiment, high-speed links 1240(1)-1240(N) support a communication throughput of 4 GB/s, 30 GB/s, 80 GB/s or higher. In at least one embodiment, various interconnect protocols may be used including, but not limited to, PCIe 4.0 or 5.0 and NVLink 2.0. In various figures, "N" and "M" represent positive integers, values of which may be different from figure to figure. In at least one embodiment, one or more GPUs in a plurality of GPUs 1210(1)-1210(N) includes one or more graphics cores (also referred to simply as "cores") 1500 as disclosed in FIGS. 15A and 15B. In at least one embodiment, one or more graphics cores 1500 may be referred to as streaming multiprocessors ("SMs"), stream processors ("SPs"), stream processing units ("SPUs"), compute units ("CUs"), execution units ("EUs"), and/or slices, where a slice in this context can refer to a portion of processing resources in a processing unit (e.g., 16 cores, a ray tracing unit, a thread director or scheduler).

In addition, and in at least one embodiment, two or more of GPUs 1210 are interconnected over high-speed links 1229(1)-1229(2), which may be implemented using similar or different protocols/links than those used for high-speed links 1240(1)-1240(N). Similarly, two or more of multi-core processors 1205 may be connected over a high-speed link 1228 which may be symmetric multi-processor (SMP) buses operating at 20 GB/s, 30 GB/s, 120 GB/s or higher. Alternatively, all communication between various system components shown in FIG. 12A may be accomplished using similar protocols/links (e.g., over a common interconnection fabric).

In at least one embodiment, each multi-core processor 1205 is communicatively coupled to a processor memory 1201(1)-1201(M), via memory interconnects 1226(1)-1226(M), respectively, and each GPU 1210(1)-1210(N) is communicatively coupled to GPU memory 1220(1)-1220(N) over GPU memory interconnects 1250(1)-1250(N), respectively. In at least one embodiment, memory interconnects 1226 and 1250 may utilize similar or different memory access technologies. By way of example, and not limitation, processor memories 1201(1)-1201(M) and GPU memories 1220 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D)(Point or Nano-Ram. In at least one embodiment, some portion of processor memories 1201 may be volatile memory and another portion may be non-volatile memory (e.g., using a two-level memory (2LM) hierarchy).

As described herein, although various multi-core processors 1205 and GPUs 1210 may be physically coupled to a particular memory 1201, 1220, respectively, and/or a unified memory architecture may be implemented in which a virtual system address space (also referred to as "effective address" space) is distributed among various physical memories. For example, processor memories 1201(1)-1201(M) may each comprise 64 GB of system memory address space and GPU memories 1220(1)-1220(N) may each comprise 32 GB of system memory address space resulting in a total of 256 GB addressable memory when M=2 and N=4. Other values for N and M are possible.

Figure 12B:
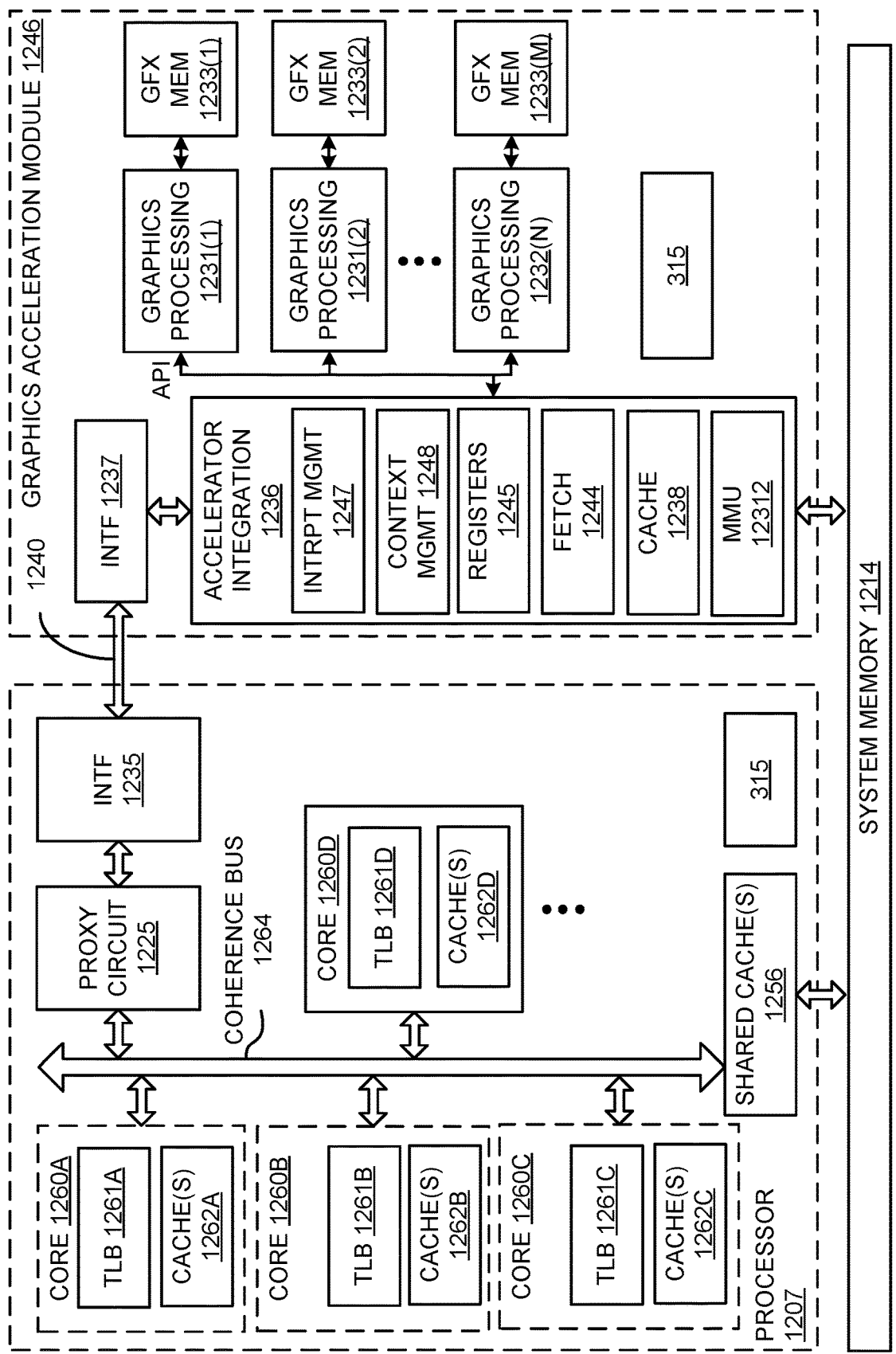
FIG. 12B illustrates a computer system, according to at least one embodiment.

FIG. 12B illustrates additional details for an interconnection between a multi-core processor 1207 and a graphics acceleration module 1246 in accordance with one exemplary embodiment. In at least one embodiment, graphics acceleration module 1246 may include one or more GPU chips integrated on a line card which is coupled to processor 1207 via high-speed link 1240 (e.g., a PCIe bus, NVLink, etc.). In at least one embodiment, graphics acceleration module 1246 may alternatively be integrated on a package or chip with processor 1207.

In at least one embodiment, processor 1207 includes a plurality of cores 1260A-1260D (which may be referred to as "execution units"), each with a translation lookaside buffer ("TLB") 1261A-1261D and one or more caches 1262A-1262D. In at least one embodiment, cores 1260A-1260D may include various other components for executing instructions and processing data that are not illustrated. In at least one embodiment, caches 1262A-1262D may comprise Level 1 (L1) and Level 2 (L2) caches. In addition, one or more shared caches 1256 may be included in caches 1262A-1262D and shared by sets of cores 1260A-1260D. For example, one embodiment of processor 1207 includes 24 cores, each with its own L1 cache, twelve shared L2 caches, and twelve shared L3 caches. In this embodiment, one or more L2 and L3 caches are shared by two adjacent cores. In at least one embodiment, processor 1207 and graphics acceleration module 1246 connect with system memory 1214, which may include processor memories 1201(1)-1201(M) of FIG. 12A.

In at least one embodiment, coherency is maintained for data and instructions stored in various caches 1262A-1262D, 1256 and system memory 1214 via inter-core communication over a coherence bus 1264. In at least one embodiment, for example, each cache may have cache coherency logic/circuitry associated therewith to communicate to over coherence bus 1264 in response to detected reads or writes to particular cache lines. In at least one embodiment, a cache snooping protocol is implemented over coherence bus 1264 to snoop cache accesses.

In at least one embodiment, a proxy circuit 1225 communicatively couples graphics acceleration module 1246 to coherence bus 1264, allowing graphics acceleration module 1246 to participate in a cache coherence protocol as a peer of cores 1260A-1260D. In particular, in at least one embodiment, an interface 1235 provides connectivity to proxy circuit 1225 over high-speed link 1240 and an interface 1237 connects graphics acceleration module 1246 to high-speed link 1240.

In at least one embodiment, an accelerator integration circuit 1236 provides cache management, memory access, context management, and interrupt management services on behalf of a plurality of graphics processing engines 1231(1)-1231(N) of graphics acceleration module 1246. In at least one embodiment, graphics processing engines 1231(1)-1231(N) may each comprise a separate graphics processing unit (GPU). In at least one embodiment, plurality of graphics processing engines 1231(1)-1231(N) of graphics acceleration module 1246 include one or more graphics cores 1500 as discussed in connection with FIGS. 15A and 15B. In at least one embodiment, graphics processing engines 1231(1)-1231(N) alternatively may comprise different types of graphics processing engines within a GPU, such as graphics execution units, media processing engines (e.g., video encoders/decoders), samplers, and blit engines. In at least one embodiment, graphics acceleration module 1246 may be a GPU with a plurality of graphics processing engines 1231(1)-1231(N) or graphics processing engines 1231(1)-1231(N) may be individual GPUs integrated on a common package, line card, or chip.

In at least one embodiment, accelerator integration circuit 1236 includes a memory management unit (MMU) 1239 for performing various memory management functions such as virtual-to-physical memory translations (also referred to as effective-to-real memory translations) and memory access protocols for accessing system memory 1214. In at least one embodiment, MMU 1239 may also include a translation lookaside buffer (TLB) (not shown) for caching virtual/effective to physical/real address translations. In at least one embodiment, a cache 1238 can store commands and data for efficient access by graphics processing engines 1231(1)-1231(N). In at least one embodiment, data stored in cache 1238 and graphics memories 1233(1)-1233(M) is kept coherent with core caches 1262A-1262D, 1256 and system memory 1214, possibly using a fetch unit 1244. As mentioned, this may be accomplished via proxy circuit 1225 on behalf of cache 1238 and memories 1233(1)-1233(M) (e.g., sending updates to cache 1238 related to modifications/accesses of cache lines on processor caches 1262A-1262D, 1256 and receiving updates from cache 1238).

In at least one embodiment, a set of registers 1245 store context data for threads executed by graphics processing engines 1231(1)-1231(N) and a context management circuit 1248 manages thread contexts. For example, context management circuit 1248 may perform save and restore operations to save and restore contexts of various threads during contexts switches (e.g., where a first thread is saved and a second thread is stored so that a second thread can be execute by a graphics processing engine). For example, on a context switch, context management circuit 1248 may store current register values to a designated region in memory (e.g., identified by a context pointer). It may then restore register values when returning to a context. In at least one embodiment, an interrupt management circuit 1247 receives and processes interrupts received from system devices.

In at least one embodiment, virtual/effective addresses from a graphics processing engine 1231 are translated to real/physical addresses in system memory 1214 by MMU 1239. In at least one embodiment, accelerator integration circuit 1236 supports multiple (e.g., 4, 8, 16) graphics accelerator modules 1246 and/or other accelerator devices. In at least one embodiment, graphics accelerator module 1246 may be dedicated to a single application executed on processor 1207 or may be shared between multiple applications. In at least one embodiment, a virtualized graphics execution environment is presented in which resources of graphics processing engines 1231(1)-1231(N) are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 1236 performs as a bridge to a system for graphics acceleration module 1246 and provides address translation and system memory cache services. In addition, in at least one embodiment, accelerator integration circuit 1236 may provide virtualization facilities for a host processor to manage virtualization of graphics processing engines 1231(1)-1231(N), interrupts, and memory management.

In at least one embodiment, because hardware resources of graphics processing engines 1231(1)-1231(N) are mapped explicitly to a real address space seen by host processor 1207, any host processor can address these resources directly using an effective address value. In at least one embodiment, one function of accelerator integration circuit 1236 is physical separation of graphics processing engines 1231(1)-1231(N) so that they appear to a system as independent units.

In at least one embodiment, one or more graphics memories 1233(1)-1233(M) are coupled to each of graphics processing engines 1231(1)-1231(N), respectively and N=M. In at least one embodiment, graphics memories 1233(1)-1233(M) store instructions and data being processed by each of graphics processing engines 1231(1)-1231(N). In at least one embodiment, graphics memories 1233(1)-1233(M) may be volatile memories such as DRAMs (including stacked DRAMs), GDDR memory (e.g., GDDR5, GDDR6), or HBM, and/or may be non-volatile memories such as 3D) (Point or Nano-Ram.

In at least one embodiment, to reduce data traffic over high-speed link 1240, biasing techniques can be used to ensure that data stored in graphics memories 1233(1)-1233(M) is data that will be used most frequently by graphics processing engines 1231(1)-1231(N) and preferably not used by cores 1260A-1260D (at least not frequently). Similarly, in at least one embodiment, a biasing mechanism attempts to keep data needed by cores (and preferably not graphics processing engines 1231(1)-1231(N)) within caches 1262A-1262D, 1256 and system memory 1214.

Figure 12C:
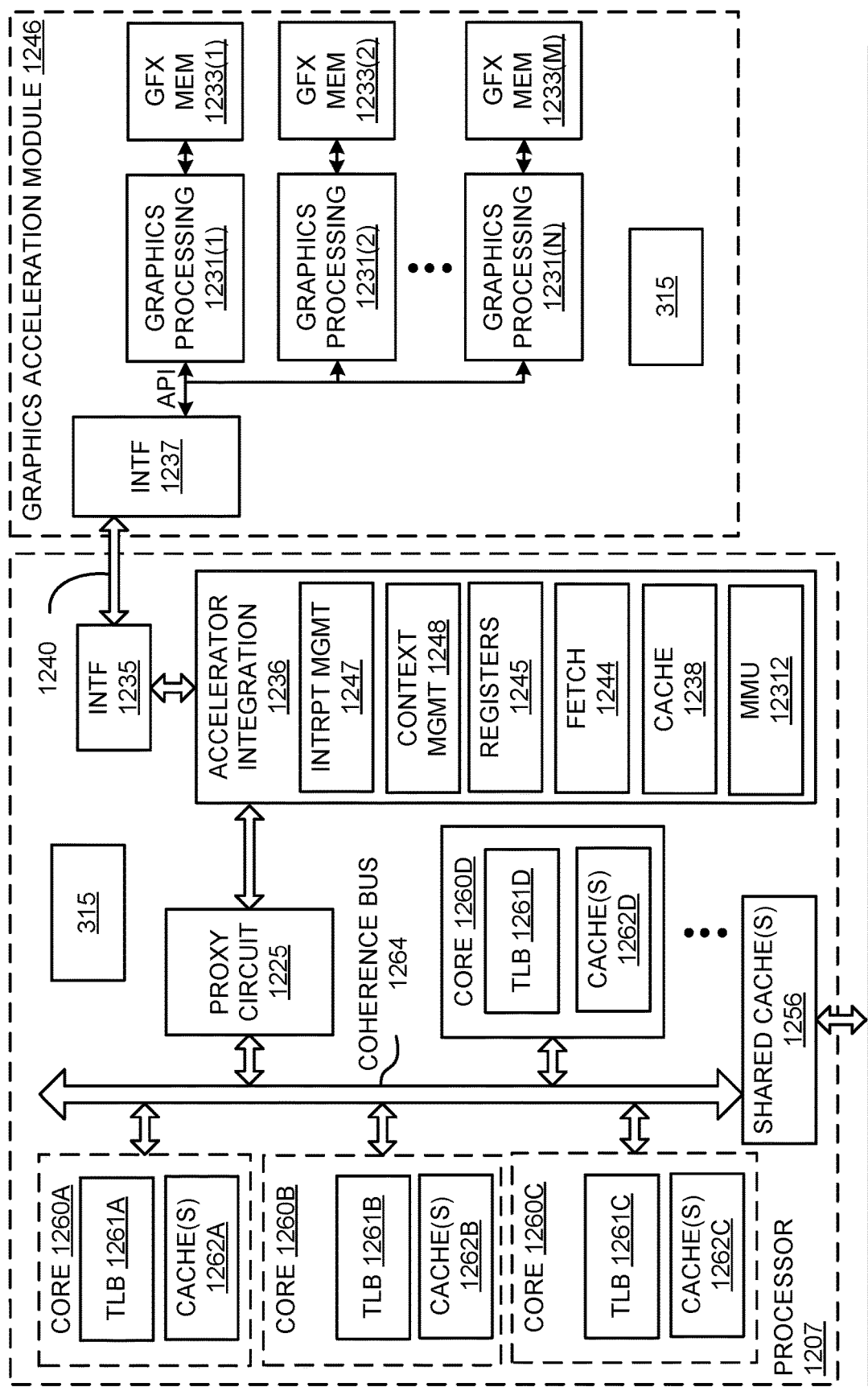
FIG. 12C illustrates a computer system, according to at least one embodiment.

FIG. 12C illustrates another exemplary embodiment in which accelerator integration circuit 1236 is integrated within processor 1207. In this embodiment, graphics processing engines 1231(1)-1231(N) communicate directly over high-speed link 1240 to accelerator integration circuit 1236 via interface 1237 and interface 1235 (which, again, may be any form of bus or interface protocol). In at least one embodiment, accelerator integration circuit 1236 may perform similar operations as those described with respect to FIG. 12B, but potentially at a higher throughput given its close proximity to coherence bus 1264 and caches 1262A-1262D, 1256. In at least one embodiment, an accelerator integration circuit supports different programming models including a dedicated-process programming model (no graphics acceleration module virtualization) and shared programming models (with virtualization), which may include programming models which are controlled by accelerator integration circuit 1236 and programming models which are controlled by graphics acceleration module 1246.

In at least one embodiment, graphics processing engines 1231(1)-1231(N) are dedicated to a single application or process under a single operating system. In at least one embodiment, a single application can funnel other application requests to graphics processing engines 1231(1)-1231(N), providing virtualization within a VM/partition.

In at least one embodiment, graphics processing engines 1231(1)-1231(N), may be shared by multiple VM/application partitions. In at least one embodiment, shared models may use a system hypervisor to virtualize graphics processing engines 1231(1)-1231(N) to allow access by each operating system. In at least one embodiment, for single-partition systems without a hypervisor, graphics processing engines 1231(1)-1231(N) are owned by an operating system. In at least one embodiment, an operating system can virtualize graphics processing engines 1231(1)-1231(N) to provide access to each process or application.

In at least one embodiment, graphics acceleration module 1246 or an individual graphics processing engine 1231(1)-1231(N) selects a process element using a process handle. In at least one embodiment, process elements are stored in system memory 1214 and are addressable using an effective address to real address translation technique described herein. In at least one embodiment, a process handle may be an implementation-specific value provided to a host process when registering its context with graphics processing engine 1231(1)-1231(N) (that is, calling system software to add a process element to a process element linked list). In at least one embodiment, a lower 16-bits of a process handle may be an offset of a process element within a process element linked list.

Figure 13:
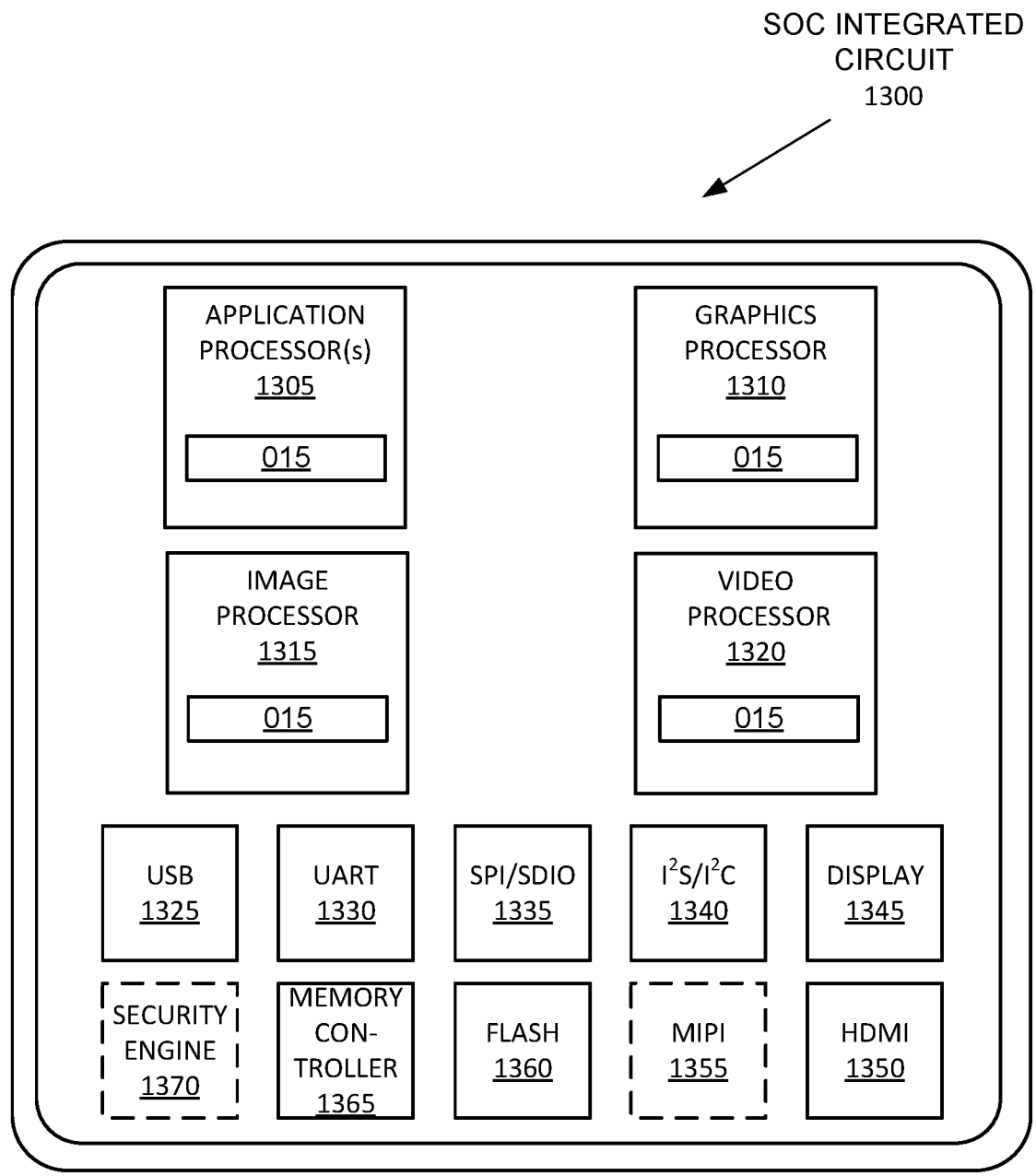
FIG. 13 illustrates exemplary integrated circuits and associated graphics processors, according to at least one embodiment.

FIG. 13 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 13 is a block diagram illustrating an exemplary system on a chip integrated circuit 1300 that may be fabricated using one or more IP cores, according to at least one embodiment. In at least one embodiment, integrated circuit 1300 includes one or more application processor(s) 1305 (e.g., CPUs), at least one graphics processor 1310, and may additionally include an image processor 1315 and/or a video processor 1320, any of which may be a modular IP core. In at least one embodiment, integrated circuit 1300 includes peripheral or bus logic including a USB controller 1325, a UART controller 1330, an SPI/SDIO controller 1335, and an $I^2S/I^2C$ controller 1340. In at least one embodiment, integrated circuit 1300 can include a display device 1345 coupled to one or more of a high-definition multimedia interface (HDMI) controller 1350 and a mobile industry processor interface (MIPI) display interface 1355. In at least one embodiment, storage may be provided by a flash memory subsystem 1360 including flash memory and a flash memory controller. In at least one embodiment, a memory interface may be provided via a memory controller 1365 for access to SDRAM or SRAM memory devices. In at least one embodiment, some integrated circuits additionally include an embedded security engine 1370.

Inference and/or training logic 115 are used to perform inferencing and/or training operations associated with one or more embodiments. In at least one embodiment, inference and/or training logic 115 may be used in integrated circuit 1300 for inferencing or predicting operations based, at least in part, on weight parameters calculated using neural network training operations, neural network functions and/or architectures, or neural network use cases described herein. Embodiments presented herein can allow for a hardware-based rekeying process that does not require significant downtime or software modification.

Figure 14A:
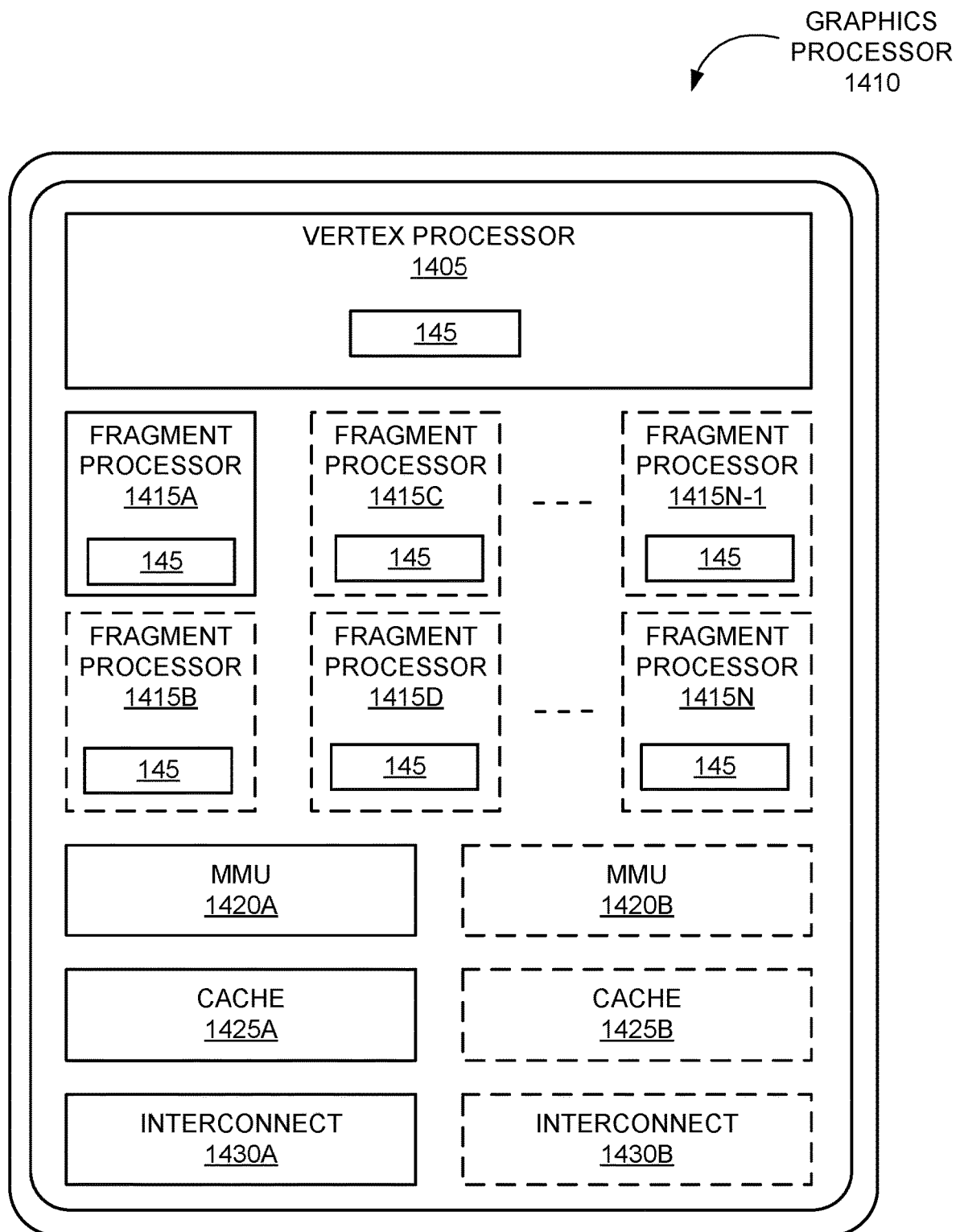
FIGS. 14A-14B illustrate exemplary integrated circuits and associated graphics processors, according to at least one embodiment.
Figure 14B:
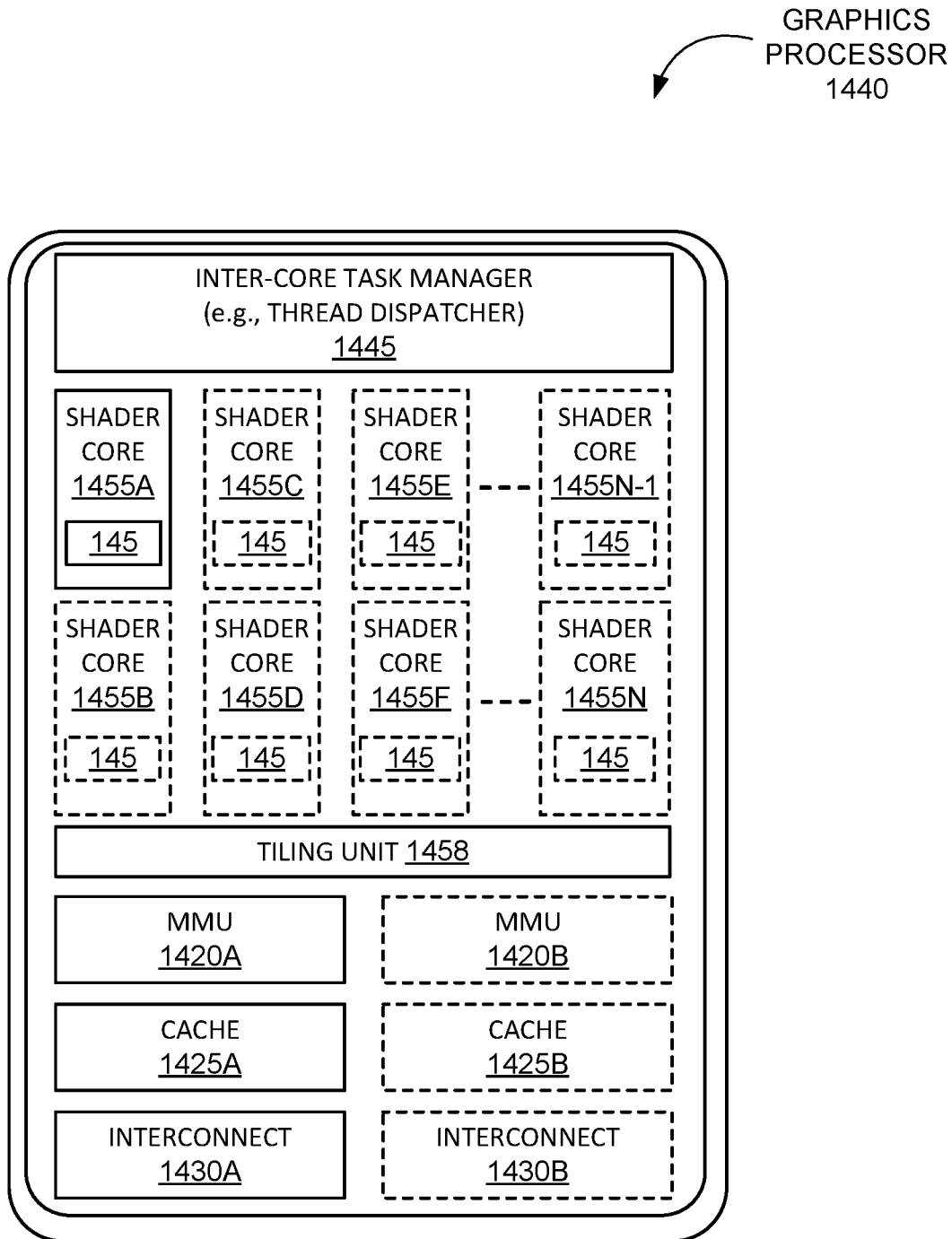

FIGS. 14A-14B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 14A-14B are block diagrams illustrating exemplary graphics processors for use within an SoC, according to embodiments described herein. FIG. 14A illustrates an exemplary graphics processor 1410 of a system on a chip integrated circuit that may be fabricated using one or more IP cores, according to at least one embodiment. FIG. 14B illustrates an additional exemplary graphics processor 1440 of a system on a chip integrated circuit that may be fabricated using one or more IP cores, according to at least one embodiment. In at least one embodiment, graphics processor 1410 of FIG. 14A is a low power graphics processor core. In at least one embodiment, graphics processor 1440 of FIG. 14B is a higher performance graphics processor core. In at least one embodiment, each of graphics processors 1410, 1440 can be variants of graphics processor 1310 of FIG. 13.

In at least one embodiment, graphics processor 1410 includes a vertex processor 1405 and one or more fragment processor(s) 1415A-1415N (e.g., 1415A, 1415B, 1415C, 1415D, through 1415N-1, and 1415N). In at least one embodiment, graphics processor 1410 can execute different shader programs via separate logic, such that vertex processor 1405 is optimized to execute operations for vertex shader programs, while one or more fragment processor(s) 1415A-1415N execute fragment (e.g., pixel) shading operations for fragment or pixel shader programs. In at least one embodiment, vertex processor 1405 performs a vertex processing stage of a 3D graphics pipeline and generates primitives and vertex data. In at least one embodiment, fragment processor(s) 1415A-1415N use primitive and vertex data generated by vertex processor 1405 to produce a framebuffer that is displayed on a display device. In at least one embodiment, fragment processor(s) 1415A-1415N are optimized to execute fragment shader programs as provided for in an OpenGL API, which may be used to perform similar operations as a pixel shader program as provided for in a Direct 3D API.

In at least one embodiment, graphics processor 1410 additionally includes one or more memory management units (MMUs) 1420A-1420B, cache(s) 1425A-1425B, and circuit interconnect(s) 1430A-1430B. In at least one embodiment, one or more MMU(s) 1420A-1420B provide for virtual to physical address mapping for graphics processor 1410, including for vertex processor 1405 and/or fragment processor(s) 1415A-1415N, which may reference vertex or image/texture data stored in memory, in addition to vertex or image/texture data stored in one or more cache(s) 1425A-1425B. In at least one embodiment, one or more MMU(s) 1420A-1420B may be synchronized with other MMUs within a system, including one or more MMUs associated with one or more application processor(s) 1305, image processors 1315, and/or video processors 1320 of FIG. 13, such that each processor 1305-1320 can participate in a shared or unified virtual memory system. In at least one embodiment, one or more circuit interconnect(s) 1430A-1430B enable graphics processor 1410 to interface with other IP cores within SoC, either via an internal bus of SoC or via a direct connection.

In at least one embodiment, graphics processor 1440 includes one or more shader core(s) 1455A-1455N (e.g., 1455A, 1455B, 1455C, 1455D, 1455E, 1455F, through 1455N-1, and 1455N) as shown in FIG. 14B, which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1440 includes an inter-core task manager 1445, which acts as a thread dispatcher to dispatch execution threads to one or more shader cores 1455A-1455N and a tiling unit 1458 to accelerate tiling operations for tile-based rendering, in which rendering operations for a scene are subdivided in image space, for example to exploit local spatial coherence within a scene or to optimize use of internal caches.

Inference and/or training logic 115 are used to perform inferencing and/or training operations associated with one or more embodiments. In at least one embodiment, inference and/or training logic 115 may be used in integrated circuit 14A and/or 14B for inferencing or predicting operations based, at least in part, on weight parameters calculated using neural network training operations, neural network functions and/or architectures, or neural network use cases described herein.

Embodiments presented herein can allow for a hardware-based rekeying process that does not require significant downtime or software modification.

Figure 15A:
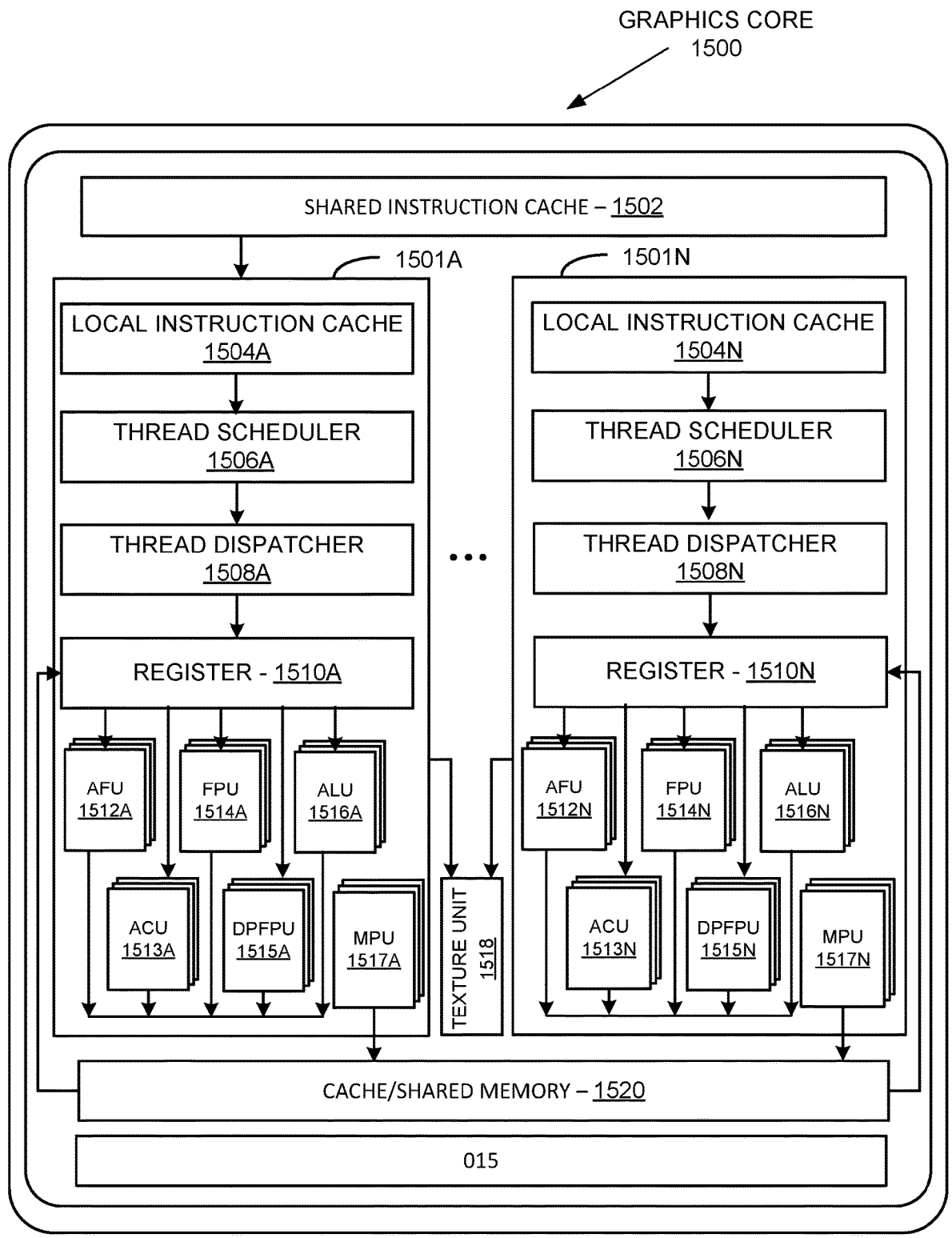
FIGS. 15A-15B illustrate additional exemplary graphics processor logic according to at least one embodiment.
Figure 15B:
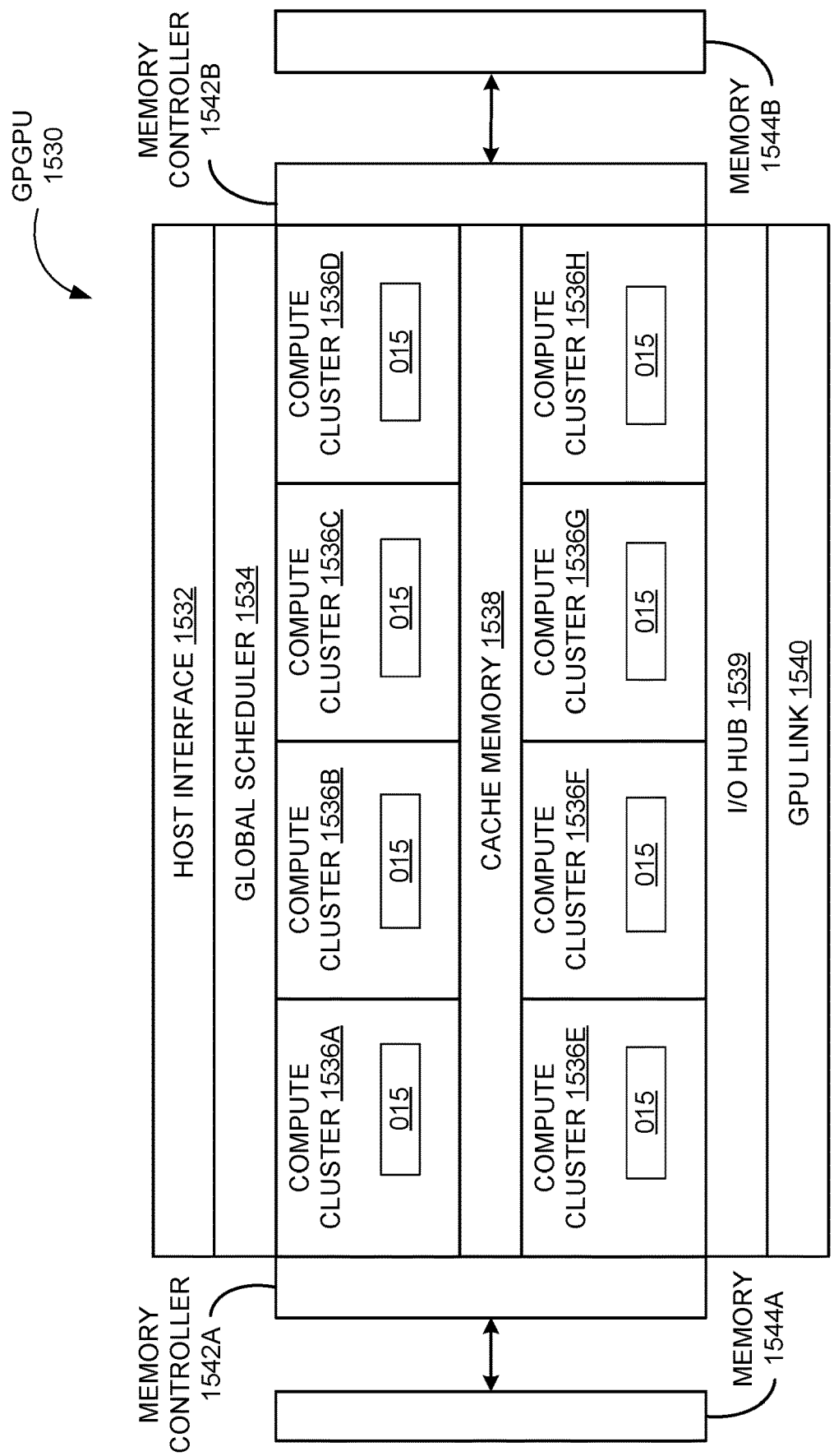

FIGS. 15A-15B illustrate additional exemplary graphics processor logic according to embodiments described herein. FIG. 15A illustrates a graphics core 1500 that may be included within graphics processor 1310 of FIG. 13, in at least one embodiment, and may be a unified shader core 1455A-1455N as in FIG. 14B in at least one embodiment. FIG. 15B illustrates a highly-parallel general-purpose graphics processing unit ("GPGPU") 1530 suitable for deployment on a multi-chip module in at least one embodiment.

In at least one embodiment, graphics core 1500 includes a shared instruction cache 1502, a texture unit 1518, and a cache/shared memory 1520 (e.g., including L1, L2, L3, last level cache, or other caches) that are common to execution resources within graphics core 1500. In at least one embodiment, graphics core 1500 can include multiple slices 1501A-1501N or a partition for each core, and a graphics processor can include multiple instances of graphics core 1500. In at least one embodiment, each slice 1501A-1501N refers to graphics core 1500. In at least one embodiment, slices 1501A-1501N have sub-slices, which are part of a slice 1501A-1501N. In at least one embodiment, slices 1501A-1501N are independent of other slices or dependent on other slices. In at least one embodiment, slices 1501A-1501N can include support logic including a local instruction cache 1504A-1504N, a thread scheduler (sequencer) 1506A-1506N, a thread dispatcher 1508A-1508N, and a set of registers 1510A-1510N. In at least one embodiment, slices 1501A-1501N can include a set of additional function units (AFUs 1512A-1512N), floating-point units (FPUs 1514A-1514N), integer arithmetic logic units (ALUs 1516A-1516N), address computational units (ACUs 1513A-1513N), double-precision floating-point units (DPFPUs 1515A-1515N), and matrix processing units (MPUs 1517A-1517N).

In at least one embodiment, each slice 1501A-1501N includes one or more engines for floating point and integer vector operations and one or more engines to accelerate convolution and matrix operations in AI, machine learning, or large dataset workloads. In at least one embodiment, one or more slices 1501A-1501N include one or more vector engines to compute a vector (e.g., compute mathematical operations for vectors). In at least one embodiment, a vector engine can compute a vector operation in 16-bit floating point (also referred to as "FP16"), 32-bit floating point (also referred to as "FP32"), or 64-bit floating point (also referred to as "FP64"). In at least one embodiment, one or more slices 1501A-1501N includes 16 vector engines that are paired with 16 matrix math units to compute matrix/tensor operations, where vector engines and math units are exposed via matrix extensions. In at least one embodiment, a slice a specified portion of processing resources of a processing unit, e.g., 16 cores and a ray tracing unit or 8 cores, a thread scheduler, a thread dispatcher, and additional functional units for a processor. In at least one embodiment, graphics core 1500 includes one or more matrix engines to compute matrix operations, e.g., when computing tensor operations.

In at least one embodiment, one or more slices 1501A-1501N includes one or more ray tracing units to compute ray tracing operations (e.g., 16 ray tracing units per slice slices 1501A-1501N). In at least one embodiment, a ray tracing unit computes ray traversal, triangle intersection, bounding box intersect, or other ray tracing operations.

In at least one embodiment, one or more slices 1501A-1501N includes a media slice that encodes, decodes, and/or transcodes data; scales and/or format converts data; and/or performs video quality operations on video data.

In at least one embodiment, one or more slices 1501A-1501N are linked to L2 cache and memory fabric, link connectors, high-bandwidth memory (HBM) (e.g., HBM2e, HDM3) stacks, and a media engine. In at least one embodiment, one or more slices 1501A-1501N include multiple cores (e.g., 16 cores) and multiple ray tracing units (e.g., 16) paired to each core. In at least one embodiment, one or more slices 1501A-1501N has one or more L1 caches. In at least one embodiment, one or more slices 1501A-1501N include one or more vector engines; one or more instruction caches to store instructions; one or more L1 caches to cache data; one or more shared local memories (SLMs) to store data, e.g., corresponding to instructions; one or more samplers to sample data; one or more ray tracing units to perform ray tracing operations; one or more geometries to perform operations in geometry pipelines and/or apply geometric transformations to vertices or polygons; one or more rasterizers to describe an image in vector graphics format (e.g., shape) and convert it into a raster image (e.g., a series of pixels, dots, or lines, which when displayed together, create an image that is represented by shapes); one or more a Hierarchical Depth Buffer (Hiz) to buffer data; and/or one or more pixel backends. In at least one embodiment, a slice 1501A-1501N includes a memory fabric, e.g., an L2 cache.

In at least one embodiment, FPUs 1514A-1514N can perform single-precision (32-bit) and half-precision (16-bit) floating point operations, while DPFPUs 1515A-1515N perform double precision (64-bit) floating point operations. In at least one embodiment, ALUs 1516A-1516N can perform variable precision integer operations at 8-bit, 16-bit, and 32-bit precision, and can be configured for mixed precision operations. In at least one embodiment, MPUs 1517A-1517N can also be configured for mixed precision matrix operations, including half-precision floating point and 8-bit integer operations. In at least one embodiment, MPUs 1517-1517N can perform a variety of matrix operations to accelerate machine learning application frameworks, including enabling support for accelerated general matrix to matrix multiplication (GEMM). In at least one embodiment, AFUs 1512A-1512N can perform additional logic operations not supported by floating-point or integer units, including trigonometric operations (e.g., sine, cosInference and/or training logic 115 are used to perform inferencing and/or training operations associated with one or more embodiments. In at least one embodiment, inference and/or training logic 115 may be used in graphics core 1500 for inferencing or predicting operations based, at least in part, on weight parameters calculated using neural network training operations, neural network functions and/or architectures, or neural network use cases described herein.

In at least one embodiment, graphics core 1500 includes an interconnect and a link fabric sublayer that is attached to a switch and a GPU-GPU bridge that enables multiple graphics processors 1500 (e.g., 8) to be interlinked without glue to each other with load/store units (LSUs), data transfer units, and sync semantics across multiple graphics processors 1500. In at least one embodiment, interconnects include standardized interconnects (e.g., PCIe) or some combination thereof.

In at least one embodiment, graphics core 1500 includes multiple tiles. In at least one embodiment, a tile is an individual die or one or more dies, where individual dies can be connected with an interconnect (e.g., embedded multi-die interconnect bridge (EMIB)). In at least one embodiment, graphics core 1500 includes a compute tile, a memory tile (e.g., where a memory tile can be exclusively accessed by different tiles or different chipsets such as a Rambo tile), substrate tile, a base tile, a HMB tile, a link tile, and EMIB tile, where all tiles are packaged together in graphics core 1500 as part of a GPU. In at least one embodiment, graphics core 1500 can include multiple tiles in a single package (also referred to as a "multi tile package"). In at least one embodiment, a compute tile can have 8 graphics cores 1500, an L1 cache; and a base tile can have a host interface with PCIe 5.0, HBM2e, MDFI, and EMIB, a link tile with 8 links, 8 ports with an embedded switch. In at least one embodiment, tiles are connected with face-to-face (F2F) chip-on-chip bonding through fine-pitched, 36-micron, microbumps (e.g., copper pillars). In at least one embodiment, graphics core 1500 includes memory fabric, which includes memory, and is tile that is accessible by multiple tiles. In at least one embodiment, graphics core 1500 stores, accesses, or loads its own hardware contexts in memory, where a hardware context is a set of data loaded from registers before a process resumes, and where a hardware context can indicate a state of hardware (e.g., state of a GPU).

In at least one embodiment, graphics core 1500 includes serializer/deserializer (SERDES) circuitry that converts a serial data stream to a parallel data stream, or converts a parallel data stream to a serial data stream.

In at least one embodiment, graphics core 1500 includes a high speed coherent unified fabric (GPU to GPU), load/store units, bulk data transfer and sync semantics, and connected GPUs through an embedded switch, where a GPU-GPU bridge is controlled by a controller.

In at least one embodiment, graphics core 1500 performs an API, where said API abstracts hardware of graphics core 1500 and access libraries with instructions to perform math operations (e.g., math kernel library), deep neural network operations (e.g., deep neural network library), vector operations, collective communications, thread building blocks, video processing, data analytics library, and/or ray tracing operations.

Embodiments presented herein can allow for a hardware-based rekeying process that does not require significant downtime or software modification.

FIG. 15B illustrates a general-purpose processing unit (GPGPU) 1530 that can be configured to enable highly-parallel compute operations to be performed by an array of graphics processing units, in at least one embodiment. In at least one embodiment, GPGPU 1530 can be linked directly to other instances of GPGPU 1530 to create a multi-GPU cluster to improve training speed for deep neural networks. In at least one embodiment, GPGPU 1530 includes a host interface 1532 to enable a connection with a host processor. In at least one embodiment, host interface 1532 is a PCI Express interface. In at least one embodiment, host interface 1532 can be a vendor-specific communications interface or communications fabric. In at least one embodiment, GPGPU 1530 receives commands from a host processor and uses a global scheduler 1534 (which may be referred to as a thread sequencer and/or asynchronous compute engine) to distribute execution threads associated with those commands to a set of compute clusters 1536A-1536H. In at least one embodiment, compute clusters 1536A-1536H share a cache memory 1538. In at least one embodiment, cache memory 1538 can serve as a higher-level cache for cache memories within compute clusters 1536A-1536H.

In at least one embodiment, GPGPU 1530 includes memory 1544A-1544B coupled with compute clusters 1536A-1536H via a set of memory controllers 1542A-1542B (e.g., one or more controllers for HBM2e). In at least one embodiment, memory 1544A-1544B can include various types of memory devices including dynamic random access memory (DRAM) or graphics random access memory, such as synchronous graphics random access memory (SGRAM), including graphics double data rate (GDDR) memory.

In at least one embodiment, compute clusters 1536A-1536H each include a set of graphics cores, such as graphics core 1500 of FIG. 15A, which can include multiple types of integer and floating point logic units that can perform computational operations at a range of precisions including suited for machine learning computations. For example, in at least one embodiment, at least a subset of floating point units in each of compute clusters 1536A-1536H can be configured to perform 16-bit or 32-bit floating point operations, while a different subset of floating point units can be configured to perform 64-bit floating point operations.

In at least one embodiment, multiple instances of GPGPU 1530 can be configured to operate as a compute cluster. In at least one embodiment, communication used by compute clusters 1536A-1536H for synchronization and data exchange varies across embodiments. In at least one embodiment, multiple instances of GPGPU 1530 communicate over host interface 1532. In at least one embodiment, GPGPU 1530 includes an I/O hub 1539 that couples GPGPU 1530 with a GPU link 1540 that enables a direct connection to other instances of GPGPU 1530. In at least one embodiment, GPU link 1540 is coupled to a dedicated GPU-to-GPU bridge that enables communication and synchronization between multiple instances of GPGPU 1530. In at least one embodiment, GPU link 1540 couples with a high-speed interconnect to transmit and receive data to other GPGPUs or parallel processors. In at least one embodiment, multiple instances of GPGPU 1530 are located in separate data processing systems and communicate via a network device that is accessible via host interface 1532. In at least one embodiment GPU link 1540 can be configured to enable a connection to a host processor in addition to or as an alternative to host interface 1532.

In at least one embodiment, GPGPU 1530 can be configured to train neural networks. In at least one embodiment, GPGPU 1530 can be used within an inferencing platform. In at least one embodiment, in which GPGPU 1530 is used for inferencing, GPGPU 1530 may include fewer compute clusters 1536A-1536H relative to when GPGPU 1530 is used for training a neural network. In at least one embodiment, memory technology associated with memory 1544A-1544B may differ between inferencing and training configurations, with higher bandwidth memory technologies devoted to training configurations. In at least one embodiment, an inferencing configuration of GPGPU 1530 can support inferencing specific instructions. For example, in at least one embodiment, an inferencing configuration can provide support for one or more 8-bit integer dot product instructions, which may be used during inferencing operations for deployed neural networks.

Inference and/or training logic 115 are used to perform inferencing and/or training operations associated with one or more embodiments. In at least one embodiment, inference and/or training logic 115 may be used in GPGPU 1530 for inferencing or predicting operations based, at least in part, on weight parameters calculated using neural network training operations, neural network functions and/or architectures, or neural network use cases described herein.

Embodiments presented herein can allow for a hardware-based rekeying process that does not require significant downtime or software modification.

Figure 16:
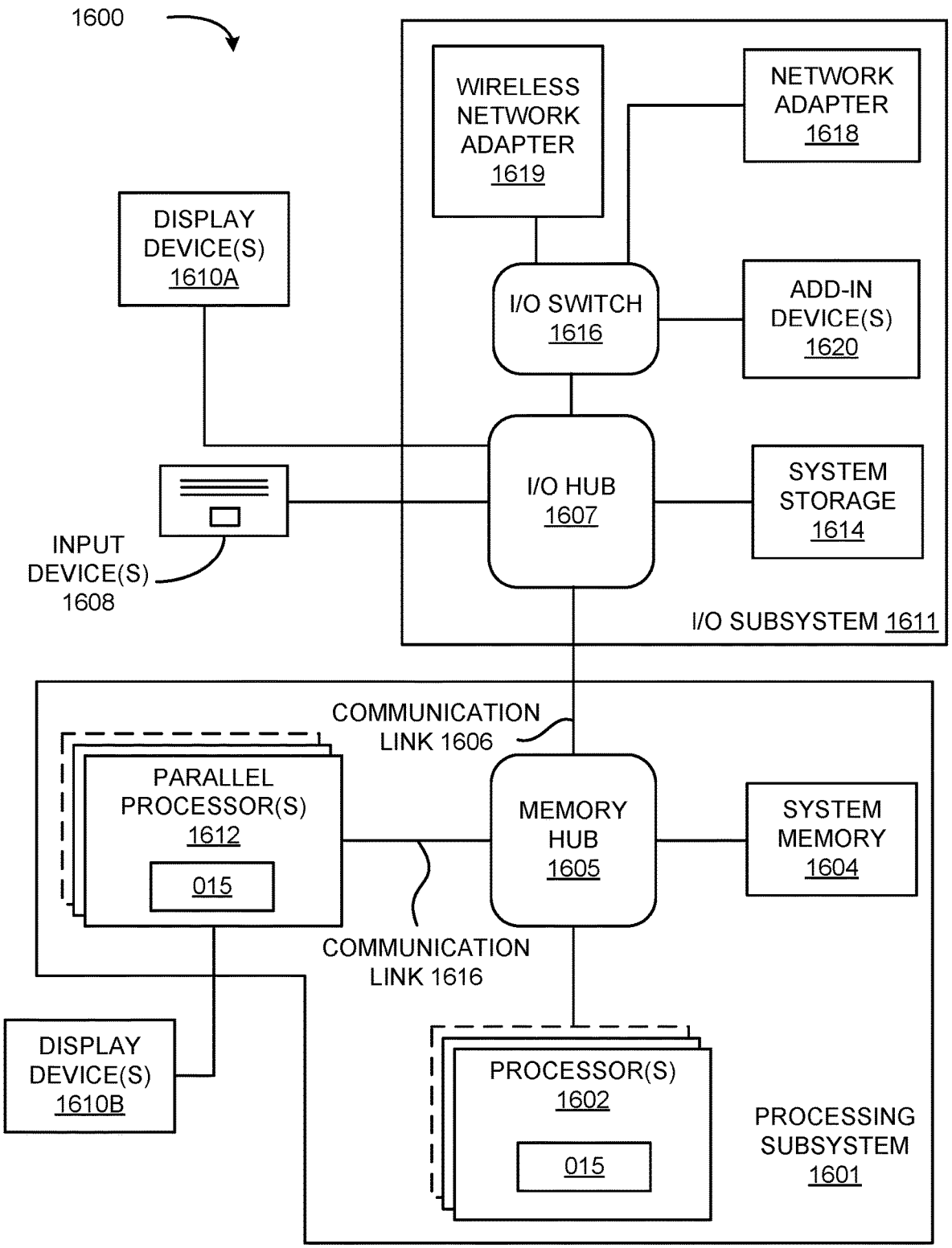
FIG. 16 illustrates a computer system, according to at least one embodiment.

FIG. 16 is a block diagram illustrating a computing system 1600 according to at least one embodiment. In at least one embodiment, computing system 1600 includes a processing subsystem 1601 having one or more processor(s) 1602 and a system memory 1604 communicating via an interconnection path that may include a memory hub 1605. In at least one embodiment, memory hub 1605 may be a separate component within a chipset component or may be integrated within one or more processor(s) 1602. In at least one embodiment, memory hub 1605 couples with an I/O subsystem 1611 via a communication link 1606. In at least one embodiment, I/O subsystem 1611 includes an I/O hub 1607 that can enable computing system 1600 to receive input from one or more input device(s) 1608. In at least one embodiment, I/O hub 1607 can enable a display controller, which may be included in one or more processor(s) 1602, to provide outputs to one or more display device(s) 1610A. In at least one embodiment, one or more display device(s) 1610A coupled with I/O hub 1607 can include a local, internal, or embedded display device.

In at least one embodiment, processing subsystem 1601 includes one or more parallel processor(s) 1612 coupled to memory hub 1605 via a bus or other communication link 1613. In at least one embodiment, communication link 1613 may use one of any number of standards based communication link technologies or protocols, such as, but not limited to PCI Express, or may be a vendor-specific communications interface or communications fabric. In at least one embodiment, one or more parallel processor(s) 1612 form a computationally focused parallel or vector processing system that can include a large number of processing cores and/or processing clusters, such as a many-integrated core (MIC) processor. In at least one embodiment, some or all of parallel processor(s) 1612 form a graphics processing subsystem that can output pixels to one of one or more display device(s) 1610A coupled via I/O Hub 1607. In at least one embodiment, parallel processor(s) 1612 can also include a display controller and display interface (not shown) to enable a direct connection to one or more display device(s) 1610B. In at least one embodiment, parallel processor(s) 1612 include one or more cores, such as graphics cores 1500 discussed herein.

In at least one embodiment, a system storage unit 1614 can connect to I/O hub 1607 to provide a storage mechanism for computing system 1600. In at least one embodiment, an I/O switch 1616 can be used to provide an interface mechanism to enable connections between I/O hub 1607 and other components, such as a network adapter 1618 and/or a wireless network adapter 1619 that may be integrated into platform, and various other devices that can be added via one or more add-in device(s) 1620. In at least one embodiment, network adapter 1618 can be an Ethernet adapter or another wired network adapter. In at least one embodiment, wireless network adapter 1619 can include one or more of a Wi-Fi, Bluetooth, near field communication (NFC), or other network device that includes one or more wireless radios.

In at least one embodiment, computing system 1600 can include other components not explicitly shown, including USB or other port connections, optical storage drives, video capture devices, and like, may also be connected to I/O hub 1607. In at least one embodiment, communication paths interconnecting various components in FIG. 16 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, parallel processor(s) 1612 incorporate circuitry optimized for graphics and video processing, including, for example, video output circuitry, and constitutes a graphics processing unit (GPU), e.g., parallel processor(s) 1612 includes graphics core 1500. In at least one embodiment, parallel processor(s) 1612 incorporate circuitry optimized for general purpose processing. In at least embodiment, components of computing system 1600 may be integrated with one or more other system elements on a single integrated circuit. For example, in at least one embodiment, parallel processor(s) 1612, memory hub 1605, processor(s) 1602, and I/O hub 1607 can be integrated into a system on chip (SoC) integrated circuit. In at least one embodiment, components of computing system 1600 can be integrated into a single package to form a system in package (SIP) configuration. In at least one embodiment, at least a portion of components of computing system 1600 can be integrated into a multi-chip module (MCM), which can be interconnected with other multi-chip modules into a modular computing system.

Inference and/or training logic 115 are used to perform inferencing and/or training operations associated with one or more embodiments. In at least one embodiment, inference and/or training logic 115 may be used in system FIG. 16 for inferencing or predicting operations based, at least in part, on weight parameters calculated using neural network training operations, neural network functions and/or architectures, or neural network use cases described herein.

Embodiments presented herein can allow for a hardware-based rekeying process that does not require significant downtime or software modification.

Processors

Figure 17A:
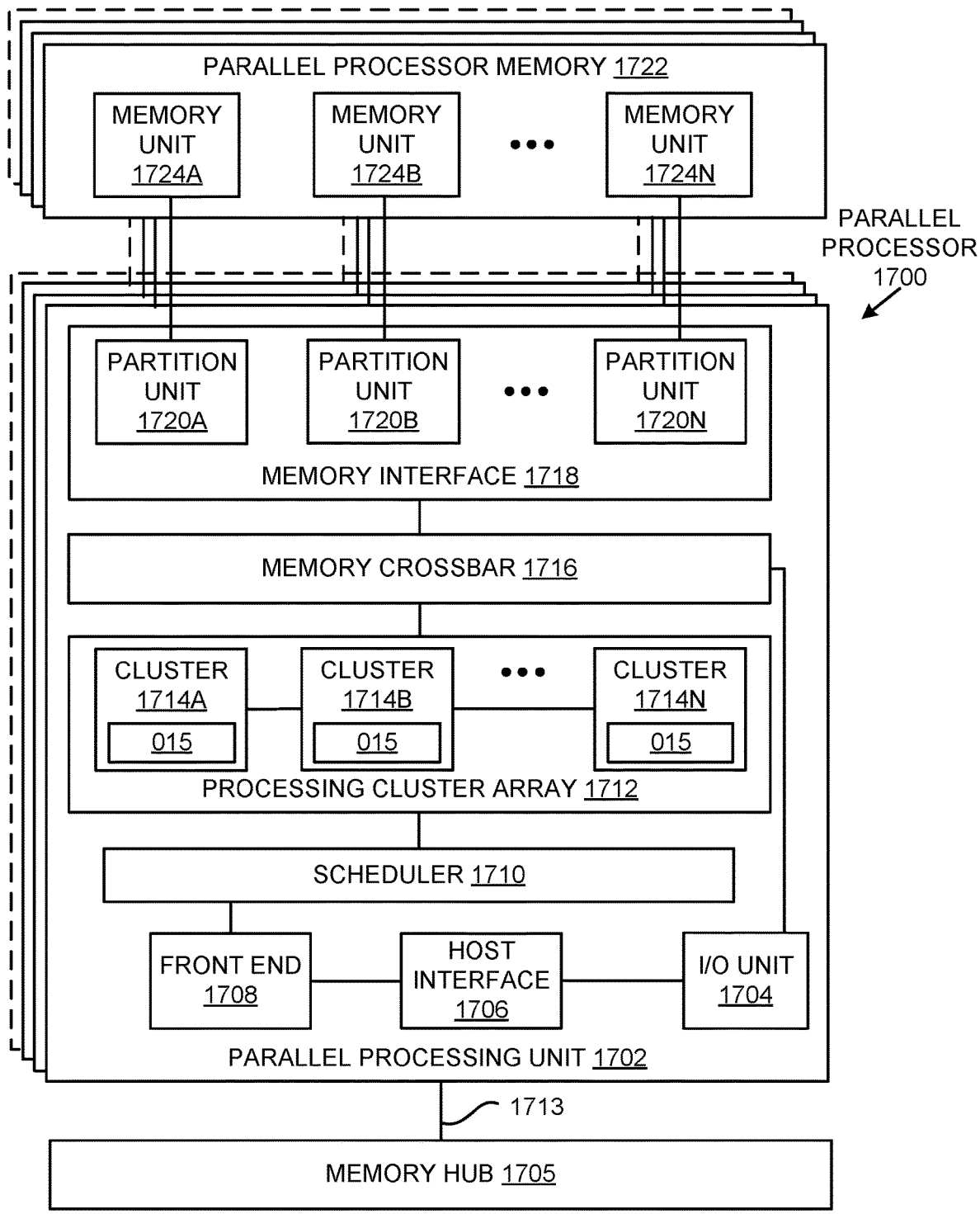
FIG. 17A illustrates a parallel processor, according to at least one embodiment.

FIG. 17A illustrates a parallel processor 1700 according to at least one embodiment. In at least one embodiment, various components of parallel processor 1700 may be implemented using one or more integrated circuit devices, such as programmable processors, application specific integrated circuits (ASICs), or field programmable gate arrays (FPGA). In at least one embodiment, illustrated parallel processor 1700 is a variant of one or more parallel processor(s) 1612 shown in FIG. 16 according to an exemplary embodiment. In at least one embodiment, a parallel processor 1700 includes one or more graphics cores 1500.

In at least one embodiment, parallel processor 1700 includes a parallel processing unit 1702. In at least one embodiment, parallel processing unit 1702 includes an I/O unit 1704 that enables communication with other devices, including other instances of parallel processing unit 1702. In at least one embodiment, I/O unit 1704 may be directly connected to other devices. In at least one embodiment, I/O unit 1704 connects with other devices via use of a hub or switch interface, such as a memory hub 1705. In at least one embodiment, connections between memory hub 1705 and I/O unit 1704 form a communication link 1713. In at least one embodiment, I/O unit 1704 connects with a host interface 1706 and a memory crossbar 1716, where host interface 1706 receives commands directed to performing processing operations and memory crossbar 1716 receives commands directed to performing memory operations.

In at least one embodiment, when host interface 1706 receives a command buffer via I/O unit 1704, host interface 1706 can direct work operations to perform those commands to a front end 1708. In at least one embodiment, front end 1708 couples with a scheduler 1710 (which may be referred to as a sequencer), which is configured to distribute commands or other work items to a processing cluster array 1712. In at least one embodiment, scheduler 1710 ensures that processing cluster array 1712 is properly configured and in a valid state before tasks are distributed to a cluster of processing cluster array 1712. In at least one embodiment, scheduler 1710 is implemented via firmware logic executing on a microcontroller. In at least one embodiment, microcontroller implemented scheduler 1710 is configurable to perform complex scheduling and work distribution operations at coarse and fine granularity, enabling rapid preemption and context switching of threads executing on processing array 1712. In at least one embodiment, host software can prove workloads for scheduling on processing cluster array 1712 via one of multiple graphics processing paths. In at least one embodiment, workloads can then be automatically distributed across processing array cluster 1712 by scheduler 1710 logic within a microcontroller including scheduler 1710.

In at least one embodiment, processing cluster array 1712 can include up to "N" processing clusters (e.g., cluster 1714A, cluster 1714B, through cluster 1714N), where "N" represents a positive integer (which may be a different integer "N" than used in other figures). In at least one embodiment, each cluster 1714A-1714N of processing cluster array 1712 can execute a large number of concurrent threads. In at least one embodiment, scheduler 1710 can allocate work to clusters 1714A-1714N of processing cluster array 1712 using various scheduling and/or work distribution algorithms, which may vary depending on workload arising for each type of program or computation. In at least one embodiment, scheduling can be handled dynamically by scheduler 1710, or can be assisted in part by compiler logic during compilation of program logic configured for execution by processing cluster array 1712. In at least one embodiment, different clusters 1714A-1714N of processing cluster array 1712 can be allocated for processing different types of programs or for performing different types of computations.

In at least one embodiment, processing cluster array 1712 can be configured to perform various types of parallel processing operations. In at least one embodiment, processing cluster array 1712 is configured to perform general-purpose parallel compute operations. For example, in at least one embodiment, processing cluster array 1712 can include logic to execute processing tasks including filtering of video and/or audio data, performing modeling operations, including physics operations, and performing data transformations.

In at least one embodiment, processing cluster array 1712 is configured to perform parallel graphics processing operations. In at least one embodiment, processing cluster array 1712 can include additional logic to support execution of such graphics processing operations, including but not limited to, texture sampling logic to perform texture operations, as well as tessellation logic and other vertex processing logic. In at least one embodiment, processing cluster array 1712 can be configured to execute graphics processing related shader programs such as, but not limited to, vertex shaders, tessellation shaders, geometry shaders, and pixel shaders. In at least one embodiment, parallel processing unit 1702 can transfer data from system memory via I/O unit 1704 for processing. In at least one embodiment, during processing, transferred data can be stored to on-chip memory (e.g., parallel processor memory 1722) during processing, then written back to system memory.

In at least one embodiment, when parallel processing unit 1702 is used to perform graphics processing, scheduler 1710 can be configured to divide a processing workload into approximately equal sized tasks, to better enable distribution of graphics processing operations to multiple clusters 1714A-1714N of processing cluster array 1712. In at least one embodiment, portions of processing cluster array 1712 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 1714A-1714N may be stored in buffers to allow intermediate data to be transmitted between clusters 1714A-1714N for further processing.

In at least one embodiment, processing cluster array 1712 can receive processing tasks to be executed via scheduler 1710, which receives commands defining processing tasks from front end 1708. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 1710 may be configured to fetch indices corresponding to tasks or may receive indices from front end 1708. In at least one embodiment, front end 1708 can be configured to ensure processing cluster array 1712 is configured to a valid state before a workload specified by incoming command buffers (e.g., batch-buffers, push buffers, etc.) is initiated.

In at least one embodiment, each of one or more instances of parallel processing unit 1702 can couple with a parallel processor memory 1722. In at least one embodiment, parallel processor memory 1722 can be accessed via memory crossbar 1716, which can receive memory requests from processing cluster array 1712 as well as I/O unit 1704. In at least one embodiment, memory crossbar 1716 can access parallel processor memory 1722 via a memory interface 1718. In at least one embodiment, memory interface 1718 can include multiple partition units (e.g., partition unit 1720A, partition unit 1720B, through partition unit 1720N) that can each couple to a portion (e.g., memory unit) of parallel processor memory 1722. In at least one embodiment, a number of partition units 1720A-1720N is configured to be equal to a number of memory units, such that a first partition unit 1720A has a corresponding first memory unit 1724A, a second partition unit 1720B has a corresponding memory unit 1724B, and an N-th partition unit 1720N has a corresponding N-th memory unit 1724N. In at least one embodiment, a number of partition units 1720A-1720N may not be equal to a number of memory units.

In at least one embodiment, memory units 1724A-1724N can include various types of memory devices, including dynamic random access memory (DRAM) or graphics random access memory, such as synchronous graphics random access memory (SGRAM), including graphics double data rate (GDDR) memory. In at least one embodiment, memory units 1724A-1724N may also include 3D stacked memory, including but not limited to high bandwidth memory (HBM), HBM2e, or HDM3. In at least one embodiment, render targets, such as frame buffers or texture maps may be stored across memory units 1724A-1724N, allowing partition units 1720A-1720N to write portions of each render target in parallel to efficiently use available bandwidth of parallel processor memory 1722. In at least one embodiment, a local instance of parallel processor memory 1722 may be excluded in favor of a unified memory design that utilizes system memory in conjunction with local cache memory.

In at least one embodiment, any one of clusters 1714A-1714N of processing cluster array 1712 can process data that will be written to any of memory units 1724A-1724N within parallel processor memory 1722. In at least one embodiment, memory crossbar 1716 can be configured to transfer an output of each cluster 1714A-1714N to any partition unit 1720A-1720N or to another cluster 1714A-1714N, which can perform additional processing operations on an output. In at least one embodiment, each cluster 1714A-1714N can communicate with memory interface 1718 through memory crossbar 1716 to read from or write to various external memory devices. In at least one embodiment, memory crossbar 1716 has a connection to memory interface 1718 to communicate with I/O unit 1704, as well as a connection to a local instance of parallel processor memory 1722, enabling processing units within different processing clusters 1714A-1714N to communicate with system memory or other memory that is not local to parallel processing unit 1702. In at least one embodiment, memory crossbar 1716 can use virtual channels to separate traffic streams between clusters 1714A-1714N and partition units 1720A-1720N.

In at least one embodiment, multiple instances of parallel processing unit 1702 can be provided on a single add-in card, or multiple add-in cards can be interconnected. In at least one embodiment, different instances of parallel processing unit 1702 can be configured to interoperate even if different instances have different numbers of processing cores, different amounts of local parallel processor memory, and/or other configuration differences. For example, in at least one embodiment, some instances of parallel processing unit 1702 can include higher precision floating point units relative to other instances. In at least one embodiment, systems incorporating one or more instances of parallel processing unit 1702 or parallel processor 1700 can be implemented in a variety of configurations and form factors, including but not limited to desktop, laptop, or handheld personal computers, servers, workstations, game consoles, and/or embedded systems.

Figure 17B:
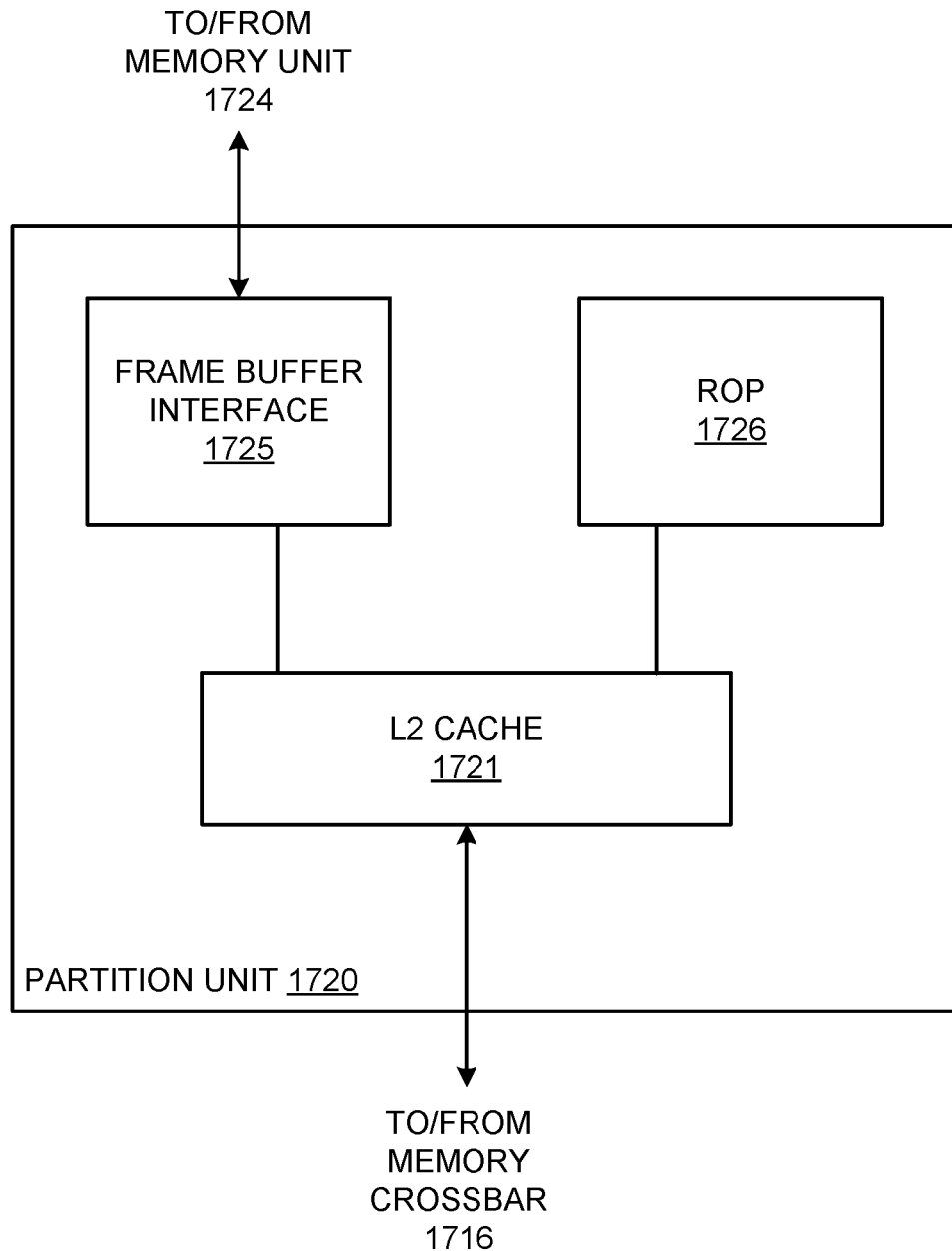
FIG. 17B illustrates a partition unit, according to at least one embodiment.

FIG. 17B is a block diagram of a partition unit 1720 according to at least one embodiment. In at least one embodiment, partition unit 1720 is an instance of one of partition units 1720A-1720N of FIG. 17A. In at least one embodiment, partition unit 1720 includes an L2 cache 1721, a frame buffer interface 1725, and a ROP 1726 (raster operations unit). In at least one embodiment, L2 cache 1721 is a read/write cache that is configured to perform load and store operations received from memory crossbar 1716 and ROP 1726. In at least one embodiment, read misses and urgent write-back requests are output by L2 cache 1721 to frame buffer interface 1725 for processing. In at least one embodiment, updates can also be sent to a frame buffer via frame buffer interface 1725 for processing. In at least one embodiment, frame buffer interface 1725 interfaces with one of memory units in parallel processor memory, such as memory units 1724A-1724N of FIG. 17A (e.g., within parallel processor memory 1722).

In at least one embodiment, ROP 1726 is a processing unit that performs raster operations such as stencil, z test, blending, etc. In at least one embodiment, ROP 1726 then outputs processed graphics data that is stored in graphics memory. In at least one embodiment, ROP 1726 includes compression logic to compress depth or color data that is written to memory and decompress depth or color data that is read from memory. In at least one embodiment, compression logic can be lossless compression logic that makes use of one or more of multiple compression algorithms. In at least one embodiment, a type of compression that is performed by ROP 1726 can vary based on statistical characteristics of data to be compressed. For example, in at least one embodiment, delta color compression is performed on depth and color data on a per-tile basis.

In at least one embodiment, ROP 1726 is included within each processing cluster (e.g., cluster 1714A-1714N of FIG. 17A) instead of within partition unit 1720. In at least one embodiment, read and write requests for pixel data are transmitted over memory crossbar 1716 instead of pixel fragment data. In at least one embodiment, processed graphics data may be displayed on a display device, such as one of one or more display device(s) 1610 of FIG. 16, routed for further processing by processor(s) 1602, or routed for further processing by one of processing entities within parallel processor 1700 of FIG. 17A.

Figure 17C:
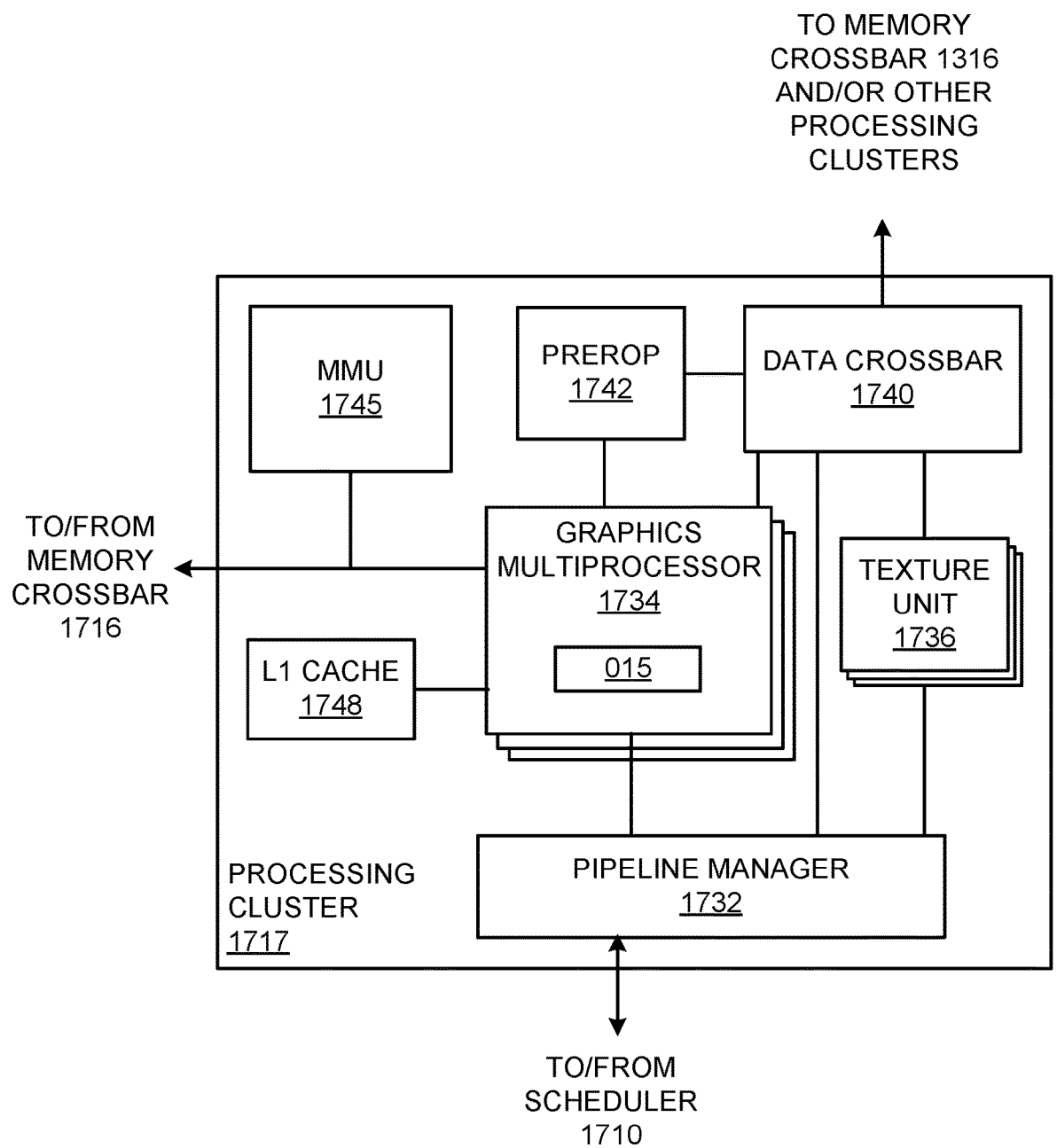
FIG. 17C illustrates a processing cluster, according to at least one embodiment.

FIG. 17C is a block diagram of a processing cluster 1714 within a parallel processing unit according to at least one embodiment. In at least one embodiment, a processing cluster is an instance of one of processing clusters 1714A-1714N of FIG. 17A. In at least one embodiment, processing cluster 1714 can be configured to execute many threads in parallel, where "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 1714 can be controlled via a pipeline manager 1732 that distributes processing tasks to SIMT parallel processors. In at least one embodiment, pipeline manager 1732 receives instructions from scheduler 1710 of FIG. 17A and manages execution of those instructions via a graphics multiprocessor 1734 and/or a texture unit 1736. In at least one embodiment, graphics multiprocessor 1734 is an exemplary instance of a SIMT parallel processor. However, in at least one embodiment, various types of SIMT parallel processors of differing architectures may be included within processing cluster 1714. In at least one embodiment, one or more instances of graphics multiprocessor 1734 can be included within a processing cluster 1714. In at least one embodiment, graphics multiprocessor 1734 can process data and a data crossbar 1740 can be used to distribute processed data to one of multiple possible destinations, including other shader units. In at least one embodiment, pipeline manager 1732 can facilitate distribution of processed data by specifying destinations for processed data to be distributed via data crossbar 1740.

In at least one embodiment, each graphics multiprocessor 1734 within processing cluster 1714 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 1714 constitute a thread. In at least one embodiment, a set of threads executing across a set of parallel processing engines is a thread group. In at least one embodiment, a thread group executes a common program on different input data. In at least one embodiment, each thread within a thread group can be assigned to a different processing engine within a graphics multiprocessor 1734. In at least one embodiment, a thread group may include fewer threads than a number of processing engines within graphics multiprocessor 1734. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 1734. In at least one embodiment, when a thread group includes more threads than number of processing engines within graphics multiprocessor 1734, processing can be performed over consecutive clock cycles. In at least one embodiment, multiple thread groups can be executed concurrently on a graphics multiprocessor 1734.

In at least one embodiment, graphics multiprocessor 1734 includes an internal cache memory to perform load and store operations. In at least one embodiment, graphics multiprocessor 1734 can forego an internal cache and use a cache memory (e.g., L1 cache 1748) within processing cluster 1714. In at least one embodiment, each graphics multiprocessor 1734 also has access to L2 caches within partition units (e.g., partition units 1720A-1720N of FIG. 17A) that are shared among all processing clusters 1714 and may be used to transfer data between threads. In at least one embodiment, graphics multiprocessor 1734 may also access off-chip global memory, which can include one or more of local parallel processor memory and/or system memory. In at least one embodiment, any memory external to parallel processing unit 1702 may be used as global memory. In at least one embodiment, processing cluster 1714 includes multiple instances of graphics multiprocessor 1734 and can share common instructions and data, which may be stored in L1 cache 1748.

In at least one embodiment, each processing cluster 1714 may include an MMU 1745 (memory management unit) that is configured to map virtual addresses into physical addresses. In at least one embodiment, one or more instances of MMU 1745 may reside within memory interface 1718 of FIG. 17A. In at least one embodiment, MMU 1745 includes a set of page table entries (PTEs) used to map a virtual address to a physical address of a tile and optionally a cache line index. In at least one embodiment, MMU 1745 may include address translation lookaside buffers (TLB) or caches that may reside within graphics multiprocessor 1734 or L1 1748 cache or processing cluster 1714. In at least one embodiment, a physical address is processed to distribute surface data access locally to allow for efficient request interleaving among partition units. In at least one embodiment, a cache line index may be used to determine whether a request for a cache line is a hit or miss.

In at least one embodiment, a processing cluster 1714 may be configured such that each graphics multiprocessor 1734 is coupled to a texture unit 1736 for performing texture mapping operations, e.g., determining texture sample positions, reading texture data, and filtering texture data. In at least one embodiment, texture data is read from an internal texture L1 cache (not shown) or from an L1 cache within graphics multiprocessor 1734 and is fetched from an L2 cache, local parallel processor memory, or system memory, as needed. In at least one embodiment, each graphics multiprocessor 1734 outputs processed tasks to data crossbar 1740 to provide processed task to another processing cluster 1714 for further processing or to store processed task in an L2 cache, local parallel processor memory, or system memory via memory crossbar 1716. In at least one embodiment, a preROP 1742 (pre-raster operations unit) is configured to receive data from graphics multiprocessor 1734, and direct data to ROP units, which may be located with partition units as described herein (e.g., partition units 1720A-1720N of FIG. 17A). In at least one embodiment, preROP 1742 unit can perform optimizations for color blending, organizing pixel color data, and performing address translations.

Inference and/or training logic 115 are used to perform inferencing and/or training operations associated with one or more embodiments. In at least one embodiment, inference and/or training logic 115 may be used in graphics processing cluster 1714 for inferencing or predicting operations based, at least in part, on weight parameters calculated using neural network training operations, neural network functions and/or architectures, or neural network use cases described herein.

Embodiments presented herein can allow for a hardware-based rekeying process that does not require significant downtime or software modification.

Figure 17D:
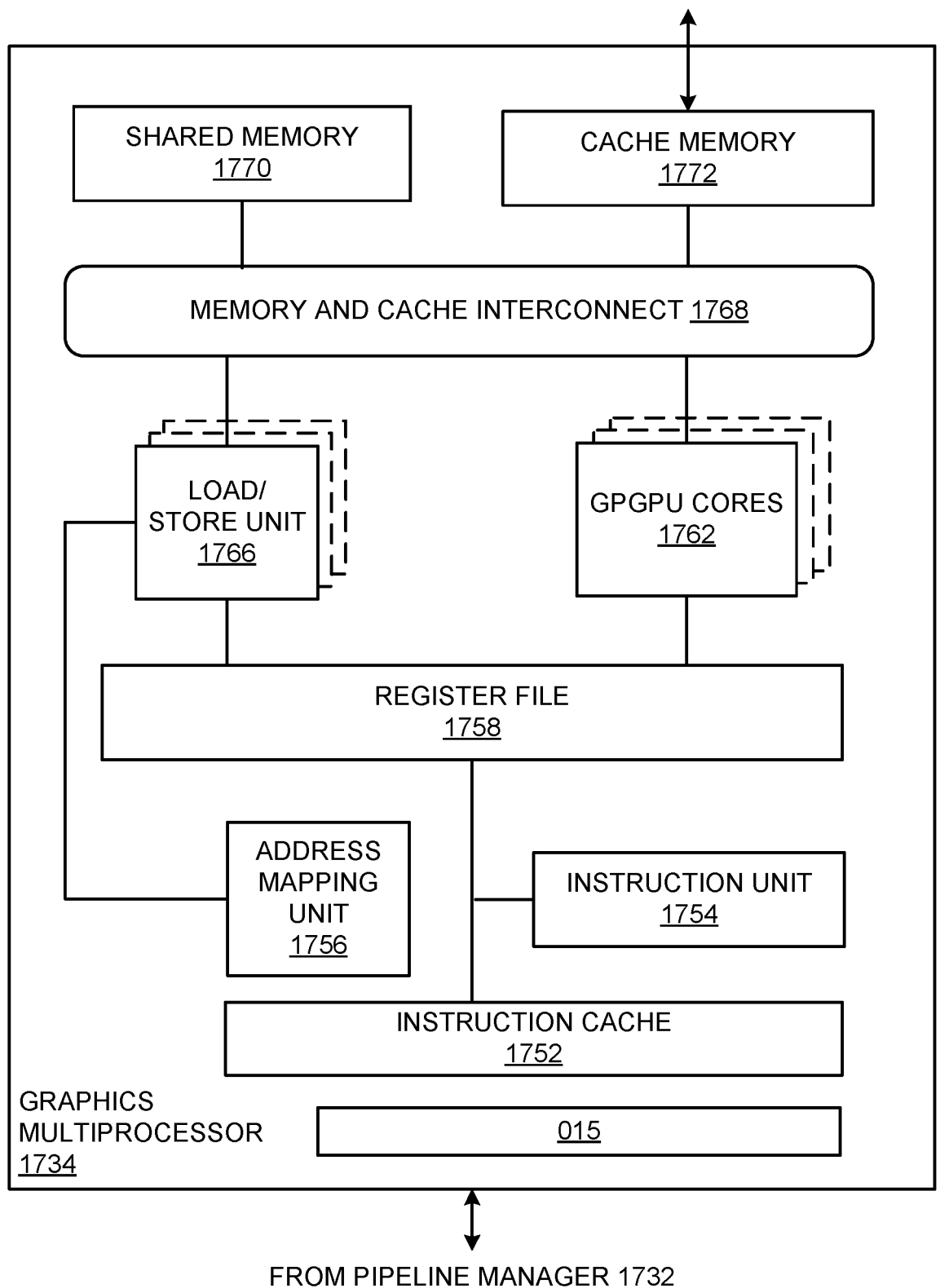
FIG. 17D illustrates a graphics multiprocessor, according to at least one embodiment.

FIG. 17D shows a graphics multiprocessor 1734 according to at least one embodiment. In at least one embodiment, graphics multiprocessor 1734 couples with pipeline manager 1732 of processing cluster 1714. In at least one embodiment, graphics multiprocessor 1734 has an execution pipeline including but not limited to an instruction cache 1752, an instruction unit 1754, an address mapping unit 1756, a register file 1758, one or more general purpose graphics processing unit (GPGPU) cores 1762, and one or more load/store units 1766, where one or more load/store units 1766 can perform load/store operations to load/store instructions corresponding to performing an operation. In at least one embodiment, GPGPU cores 1762 and load/store units 1766 are coupled with cache memory 1772 and shared memory 1770 via a memory and cache interconnect 1768.

In at least one embodiment, instruction cache 1752 receives a stream of instructions to execute from pipeline manager 1732. In at least one embodiment, instructions are cached in instruction cache 1752 and dispatched for execution by an instruction unit 1754. In at least one embodiment, instruction unit 1754 can dispatch instructions as thread groups (e.g., warps, wavefronts, waves), with each thread of thread group assigned to a different execution unit within GPGPU cores 1762. In at least one embodiment, an instruction can access any of a local, shared, or global address space by specifying an address within a unified address space. In at least one embodiment, address mapping unit 1756 can be used to translate addresses in a unified address space into a distinct memory address that can be accessed by load/store units 1766.

In at least one embodiment, register file 1758 provides a set of registers for functional units of graphics multiprocessor 1734. In at least one embodiment, register file 1758 provides temporary storage for operands connected to data paths of functional units (e.g., GPGPU cores 1762, load/store units 1766) of graphics multiprocessor 1734. In at least one embodiment, register file 1758 is divided between each of functional units such that each functional unit is allocated a dedicated portion of register file 1758. In at least one embodiment, register file 1758 is divided between different warps (which may be referred to as wavefronts and/or waves) being executed by graphics multiprocessor 1734.

In at least one embodiment, GPGPU cores 1762 can each include floating point units (FPUs) and/or integer arithmetic logic units (ALUs) that are used to execute instructions of graphics multiprocessor 1734. In at least one embodiment, GPGPU cores 1762 can be similar in architecture or can differ in architecture. In at least one embodiment, a first portion of GPGPU cores 1762 include a single precision FPU and an integer ALU while a second portion of GPGPU cores include a double precision FPU. In at least one embodiment, FPUs can implement IEEE 754-2008 standard floating point arithmetic or enable variable precision floating point arithmetic. In at least one embodiment, graphics multiprocessor 1734 can additionally include one or more fixed function or special function units to perform specific functions such as copy rectangle or pixel blending operations. In at least one embodiment, one or more of GPGPU cores 1762 can also include fixed or special function logic.

In at least one embodiment, GPGPU cores 1762 include SIMD logic capable of performing a single instruction on multiple sets of data. In at least one embodiment, GPGPU cores 1762 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 1768 is an interconnect network that connects each functional unit of graphics multiprocessor 1734 to register file 1758 and to shared memory 1770. In at least one embodiment, memory and cache interconnect 1768 is a crossbar interconnect that allows load/store unit 1766 to implement load and store operations between shared memory 1770 and register file 1758. In at least one embodiment, register file 1758 can operate at a same frequency as GPGPU cores 1762, thus data transfer between GPGPU cores 1762 and register file 1758 can have very low latency. In at least one embodiment, shared memory 1770 can be used to enable communication between threads that execute on functional units within graphics multiprocessor 1734. In at least one embodiment, cache memory 1772 can be used as a data cache for example, to cache texture data communicated between functional units and texture unit 1736. In at least one embodiment, shared memory 1770 can also be used as a program managed cache. In at least one embodiment, threads executing on GPGPU cores 1762 can programmatically store data within shared memory in addition to automatically cached data that is stored within cache memory 1772.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high-speed interconnect such as PCIe or NVLink). In at least one embodiment, a GPU may be integrated on a package or chip as cores and communicatively coupled to cores over an internal processor bus/interconnect internal to a package or chip. In at least one embodiment, regardless a manner in which a GPU is connected, processor cores may allocate work to such GPU in a form of sequences of commands/instructions contained in a work descriptor. In at least one embodiment, that GPU then uses dedicated circuitry/logic for efficiently processing these commands/instructions.

Inference and/or training logic 115 are used to perform inferencing and/or training operations associated with one or more embodiments. In at least one embodiment, inference and/or training logic 115 may be used in graphics multiprocessor 1734 for inferencing or predicting operations based, at least in part, on weight parameters calculated using neural network training operations, neural network functions and/or architectures, or neural network use cases described herein.

Embodiments presented herein can allow for a hardware-based rekeying process that does not require significant downtime or software modification.

Figure 18:
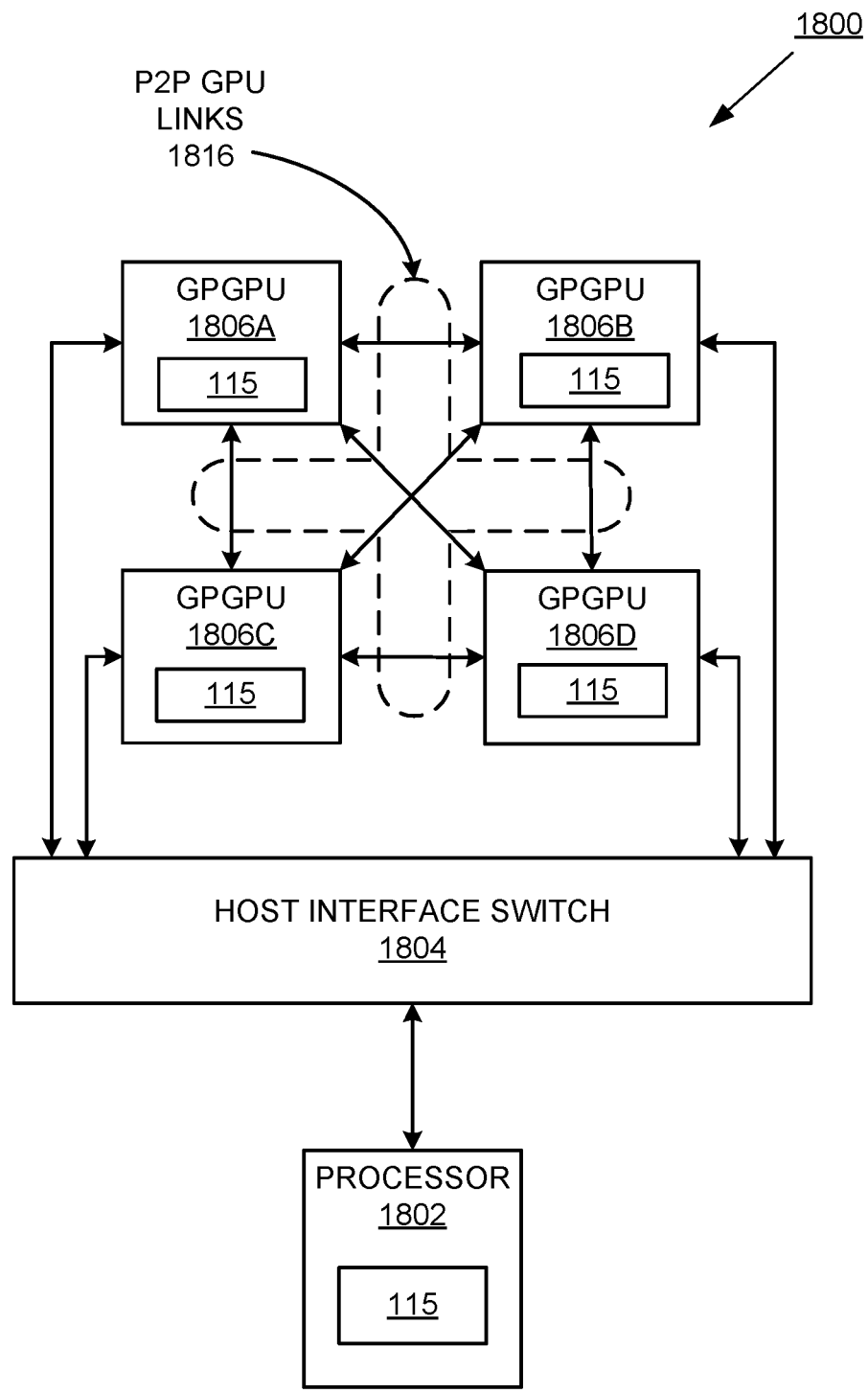
FIG. 18 illustrates a multi-graphics processing unit (GPU) system, according to at least one embodiment.

FIG. 18 illustrates a multi-GPU computing system 1800, according to at least one embodiment. In at least one embodiment, multi-GPU computing system 1800 can include a processor 1802 coupled to multiple general purpose graphics processing units (GPGPUs) 1806A-D via a host interface switch 1804. In at least one embodiment, host interface switch 1804 is a PCI express switch device that couples processor 1802 to a PCI express bus over which processor 1802 can communicate with GPGPUs 1806A-D. In at least one embodiment, GPGPUs 1806A-D can interconnect via a set of high-speed point-to-point GPU-to-GPU links 1816. In at least one embodiment, GPU-to-GPU links 1816 connect to each of GPGPUs 1806A-D via a dedicated GPU link. In at least one embodiment, P2P GPU links 1816 enable direct communication between each of GPGPUs 1806A-D without requiring communication over host interface bus 1804 to which processor 1802 is connected. In at least one embodiment, with GPU-to-GPU traffic directed to P2P GPU links 1816, host interface bus 1804 remains available for system memory access or to communicate with other instances of multi-GPU computing system 1800, for example, via one or more network devices. While in at least one embodiment GPGPUs 1806A-D connect to processor 1802 via host interface switch 1804, in at least one embodiment processor 1802 includes direct support for P2P GPU links 1816 and can connect directly to GPGPUs 1806A-D.

Inference and/or training logic 115 are used to perform inferencing and/or training operations associated with one or more embodiments. In at least one embodiment, inference and/or training logic 115 may be used in multi-GPU computing system 1800 for inferencing or predicting operations based, at least in part, on weight parameters calculated using neural network training operations, neural network functions and/or architectures, or neural network use cases described herein. In at least one embodiment, multi-GPU computing system 1800 includes one or more graphics cores 1500.

Embodiments presented herein can allow for a hardware-based rekeying process that does not require significant downtime or software modification.

Figure 19:
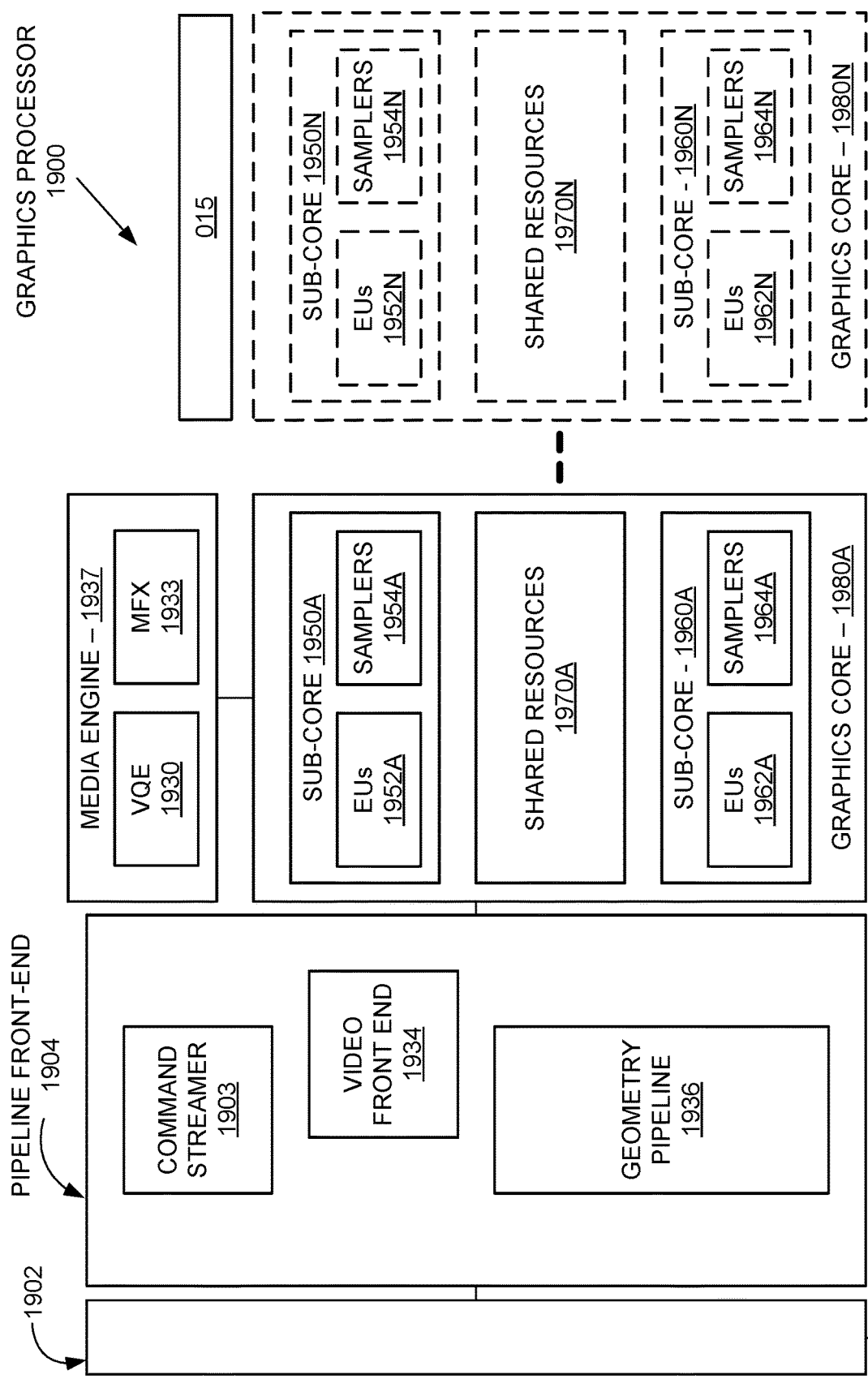
FIG. 19 illustrates a graphics processor, according to at least one embodiment.

FIG. 19 is a block diagram of a graphics processor 1900, according to at least one embodiment. In at least one embodiment, graphics processor 1900 includes a ring interconnect 1902, a pipeline front-end 1904, a media engine 1937, and graphics cores 1980A-1980N. In at least one embodiment, ring interconnect 1902 couples graphics processor 1900 to other processing units, including other graphics processors or one or more general-purpose processor cores. In at least one embodiment, graphics processor 1900 is one of many processors integrated within a multi-core processing system. In at least one embodiment, graphics processor 1900 includes graphics core 1500.

In at least one embodiment, graphics processor 1900 receives batches of commands via ring interconnect 1902. In at least one embodiment, incoming commands are interpreted by a command streamer 1903 in pipeline front-end 1904. In at least one embodiment, graphics processor 1900 includes scalable execution logic to perform 3D geometry processing and media processing via graphics core(s) 1980A-1980N. In at least one embodiment, for 3D geometry processing commands, command streamer 1903 supplies commands to geometry pipeline 1936. In at least one embodiment, for at least some media processing commands, command streamer 1903 supplies commands to a video front end 1934, which couples with media engine 1937. In at least one embodiment, media engine 1937 includes a Video Quality Engine (VQE) 1930 for video and image post-processing and a multi-format encode/decode (MFX) 1933 engine to provide hardware-accelerated media data encoding and decoding. In at least one embodiment, geometry pipeline 1936 and media engine 1937 each generate execution threads for thread execution resources provided by at least one graphics core 1980.

In at least one embodiment, graphics processor 1900 includes scalable thread execution resources featuring graphics cores 1980A-1980N (which can be modular and are sometimes referred to as core slices), each having multiple sub-cores 1950A-50N, 1960A-1960N (sometimes referred to as core sub-slices). In at least one embodiment, graphics processor 1900 can have any number of graphics cores 1980A. In at least one embodiment, graphics processor 1900 includes a graphics core 1980A having at least a first sub-core 1950A and a second sub-core 1960A. In at least one embodiment, graphics processor 1900 is a low power processor with a single sub-core (e.g., 1950A). In at least one embodiment, graphics processor 1900 includes multiple graphics cores 1980A-1980N, each including a set of first sub-cores 1950A-1950N and a set of second sub-cores 1960A-1960N. In at least one embodiment, each sub-core in first sub-cores 1950A-1950N includes at least a first set of execution units 1952A-1952N and media/texture samplers 1954A-1954N. In at least one embodiment, each sub-core in second sub-cores 1960A-1960N includes at least a second set of execution units 1962A-1962N and samplers 1964A-1964N. In at least one embodiment, each sub-core 1950A-1950N, 1960A-1960N shares a set of shared resources 1970A-1970N. In at least one embodiment, shared resources include shared cache memory and pixel operation logic. In at least one embodiment, graphics processor 1900 includes load/store units in pipeline front-end 1904.

Inference and/or training logic 115 are used to perform inferencing and/or training operations associated with one or more embodiments. In at least one embodiment, inference and/or training logic 115 may be used in graphics processor 1900 for inferencing or predicting operations based, at least in part, on weight parameters calculated using neural network training operations, neural network functions and/or architectures, or neural network use cases described herein. Embodiments presented herein can allow for a hardware-based rekeying process that does not require significant downtime or software modification.

Figure 20:
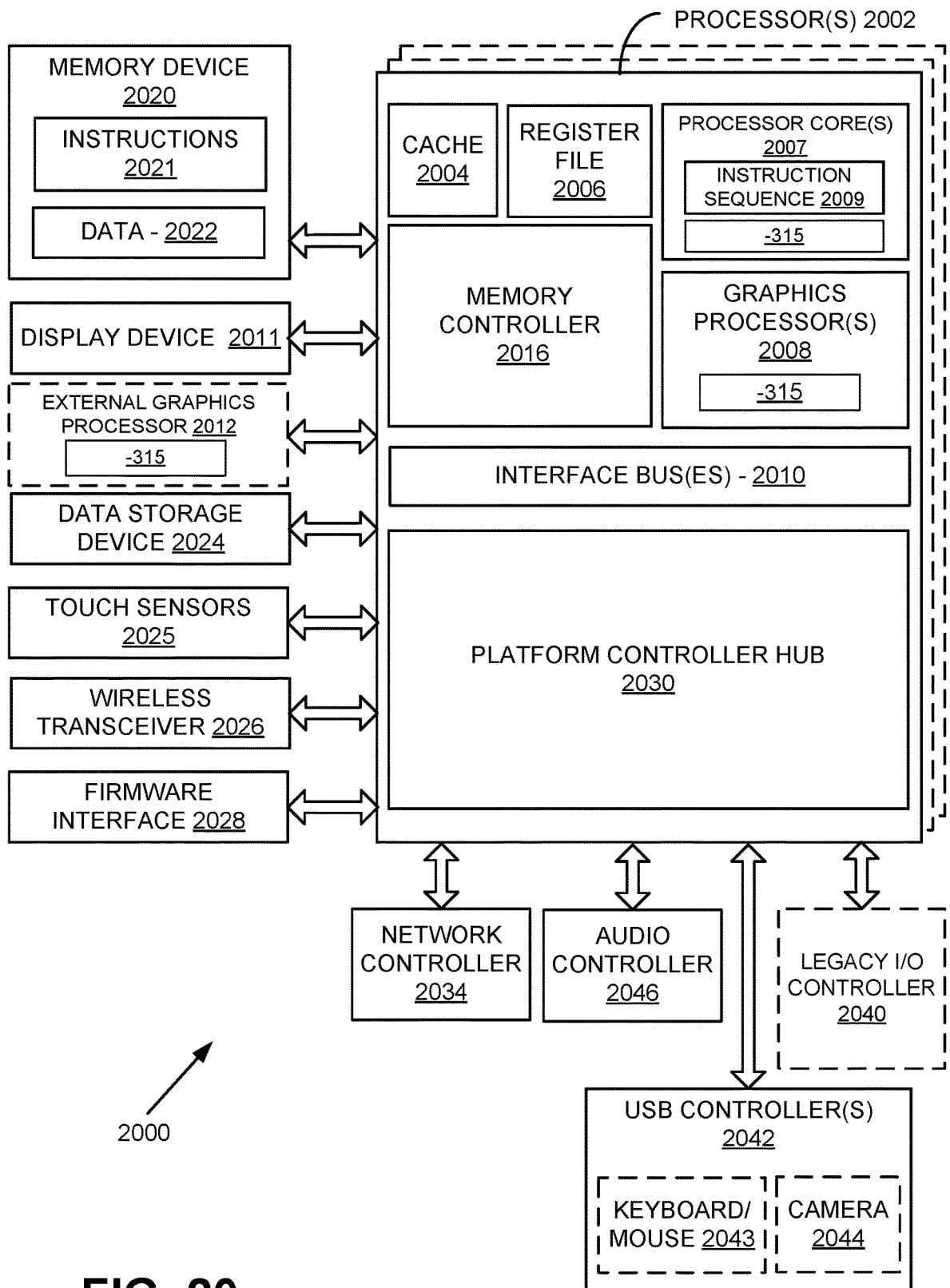
FIG. 20 illustrates at least portions of a graphics processor, according to one or more embodiments.

FIG. 20 is a block diagram of a processing system, according to at least one embodiment. In at least one embodiment, system 2000 includes one or more processors 2002 and one or more graphics processors 2008, and may be a single processor desktop system, a multiprocessor workstation system, or a server system having a large number of processors 2002 or processor cores 2007. In at least one embodiment, system 2000 is a processing platform incorporated within a system-on-a-chip (SoC) integrated circuit for use in mobile, handheld, or embedded devices. In at least one embodiment, one or more graphics processors 2008 include one or more graphics cores 1500.

In at least one embodiment, system 2000 can include, or be incorporated within a server-based gaming platform, a game console, including a game and media console, a mobile gaming console, a handheld game console, or an online game console. In at least one embodiment, system 2000 is a mobile phone, a smart phone, a tablet computing device or a mobile Internet device. In at least one embodiment, processing system 2000 can also include, couple with, or be integrated within a wearable device, such as a smart watch wearable device, a smart eyewear device, an augmented reality device, or a virtual reality device. In at least one embodiment, processing system 2000 is a television or set top box device having one or more processors 2002 and a graphical interface generated by one or more graphics processors 2008.

In at least one embodiment, one or more processors 2002 each include one or more processor cores 2007 to process instructions which, when executed, perform operations for system and user software. In at least one embodiment, each of one or more processor cores 2007 is configured to process a specific instruction sequence 2009. In at least one embodiment, instruction sequence 2009 may facilitate Complex Instruction Set Computing (CISC), Reduced Instruction Set Computing (RISC), or computing via a Very Long Instruction Word (VLIW). In at least one embodiment, processor cores 2007 may each process a different instruction sequence 2009, which may include instructions to facilitate emulation of other instruction sequences. In at least one embodiment, processor core 2007 may also include other processing devices, such a Digital Signal Processor (DSP).

In at least one embodiment, processor 2002 includes a cache memory 2004. In at least one embodiment, processor 2002 can have a single internal cache or multiple levels of internal cache. In at least one embodiment, cache memory is shared among various components of processor 2002. In at least one embodiment, processor 2002 also uses an external cache (e.g., a Level-3 (L3) cache or Last Level Cache (LLC)) (not shown), which may be shared among processor cores 2007 using known cache coherency techniques. In at least one embodiment, a register file 2006 is additionally included in processor 2002, which may include different types of registers for storing different types of data (e.g., integer registers, floating point registers, status registers, and an instruction pointer register). In at least one embodiment, register file 2006 may include general-purpose registers or other registers.

In at least one embodiment, one or more processor(s) 2002 are coupled with one or more interface bus(es) 2010 to transmit communication signals such as address, data, or control signals between processor 2002 and other components in system 2000. In at least one embodiment, interface bus 2010 can be a processor bus, such as a version of a Direct Media Interface (DMI) bus. In at least one embodiment, interface bus 2010 is not limited to a DMI bus, and may include one or more Peripheral Component Interconnect buses (e.g., PCI, PCI Express), memory busses, or other types of interface busses. In at least one embodiment processor(s) 2002 include an integrated memory controller 2016 and a platform controller hub 2030. In at least one embodiment, memory controller 2016 facilitates communication between a memory device and other components of system 2000, while platform controller hub (PCH) 2030 provides connections to I/O devices via a local I/O bus.

In at least one embodiment, a memory device 2020 can be a dynamic random access memory (DRAM) device, a static random access memory (SRAM) device, flash memory device, phase-change memory device, or some other memory device having suitable performance to serve as process memory. In at least one embodiment, memory device 2020 can operate as system memory for system 2000, to store data 2022 and instructions 2021 for use when one or more processors 2002 executes an application or process. In at least one embodiment, memory controller 2016 also couples with an optional external graphics processor 2012, which may communicate with one or more graphics processors 2008 in processors 2002 to perform graphics and media operations. In at least one embodiment, a display device 2011 can connect to processor(s) 2002. In at least one embodiment, display device 2011 can include one or more of an internal display device, as in a mobile electronic device or a laptop device, or an external display device attached via a display interface (e.g., DisplayPort, etc.). In at least one embodiment, display device 2011 can include a head mounted display (HMD) such as a stereoscopic display device for use in virtual reality (VR) applications or augmented reality (AR) applications.

In at least one embodiment, platform controller hub 2030 enables peripherals to connect to memory device 2020 and processor 2002 via a high-speed I/O bus. In at least one embodiment, I/O peripherals include, but are not limited to, an audio controller 2046, a network controller 2034, a firmware interface 2028, a wireless transceiver 2026, touch sensors 2025, a data storage device 2024 (e.g., hard disk drive, flash memory, etc.). In at least one embodiment, data storage device 2024 can connect via a storage interface (e.g., SATA) or via a peripheral bus, such as a Peripheral Component Interconnect bus (e.g., PCI, PCI Express). In at least one embodiment, touch sensors 2025 can include touch screen sensors, pressure sensors, or fingerprint sensors. In at least one embodiment, wireless transceiver 2026 can be a Wi-Fi transceiver, a Bluetooth transceiver, or a mobile network transceiver such as a 3G, 4G, or Long Term Evolution (LTE) transceiver. In at least one embodiment, firmware interface 2028 enables communication with system firmware, and can be, for example, a unified extensible firmware interface (UEFI). In at least one embodiment, network controller 2034 can enable a network connection to a wired network. In at least one embodiment, a high-performance network controller (not shown) couples with interface bus 2010. In at least one embodiment, audio controller 2046 is a multi-channel high definition audio controller. In at least one embodiment, system 2000 includes an optional legacy I/O controller 2040 for coupling legacy (e.g., Personal System 2 (PS/2)) devices to system 2000. In at least one embodiment, platform controller hub 2030 can also connect to one or more Universal Serial Bus (USB) controllers 2042 connect input devices, such as keyboard and mouse 2043 combinations, a camera 2044, or other USB input devices.

In at least one embodiment, an instance of memory controller 2016 and platform controller hub 2030 may be integrated into a discreet external graphics processor, such as external graphics processor 2012. In at least one embodiment, platform controller hub 2030 and/or memory controller 2016 may be external to one or more processor(s) 2002. For example, in at least one embodiment, system 2000 can include an external memory controller 2016 and platform controller hub 2030, which may be configured as a memory controller hub and peripheral controller hub within a system chipset that is in communication with processor(s) 2002.

Inference and/or training logic 115 are used to perform inferencing and/or training operations associated with one or more embodiments. In at least one embodiment portions or all of inference and/or training logic 115 may be incorporated into graphics processor 2008. For example, in at least one embodiment, training and/or inferencing techniques described herein may use one or more of ALUs embodied in a 3D pipeline. In at least one embodiment, weight parameters may be stored in on-chip or off-chip memory and/or registers (shown or not shown) that configure ALUs of graphics processor 2008 to perform one or more machine learning algorithms, neural network architectures, use cases, or training techniques described herein.

Embodiments presented herein can allow for a hardware-based rekeying process that does not require significant downtime or software modification.

Figure 21:
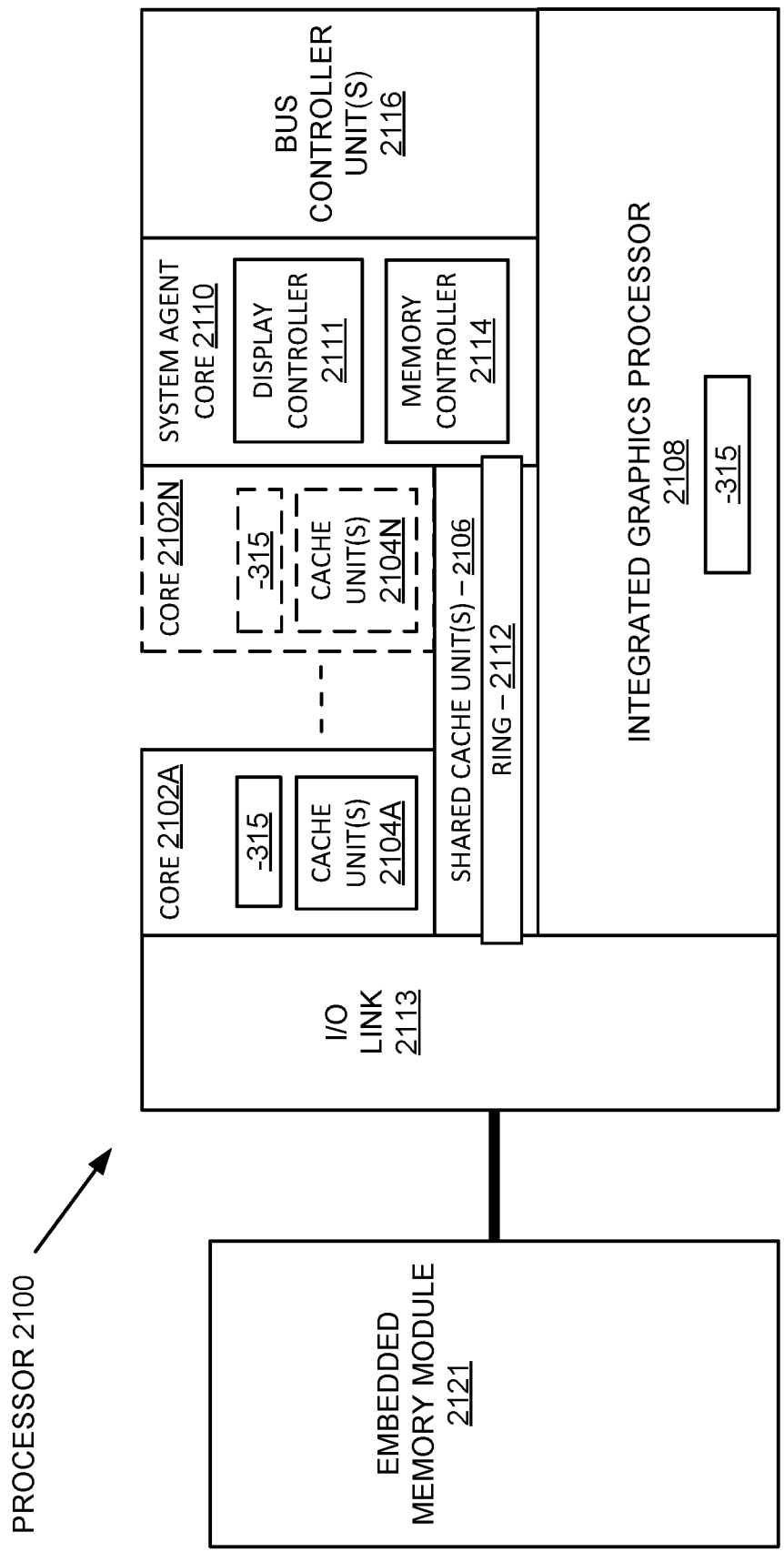
FIG. 21 illustrates at least portions of a graphics processor, according to one or more embodiments.

FIG. 21 is a block diagram of a processor 2100 having one or more processor cores 2102A-2102N, an integrated memory controller 2114, and an integrated graphics processor 2108, according to at least one embodiment. In at least one embodiment, processor 2100 can include additional cores up to and including additional core 2102N represented by dashed lined boxes. In at least one embodiment, each of processor cores 2102A-2102N includes one or more internal cache units 2104A-2104N. In at least one embodiment, each processor core also has access to one or more shared cached units 2106. In at least one embodiment, graphics processor 2108 includes one or more graphics cores 1500.

In at least one embodiment, internal cache units 2104A-2104N and shared cache units 2106 represent a cache memory hierarchy within processor 2100. In at least one embodiment, cache memory units 2104A-2104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 2106 and 2104A-2104N.

In at least one embodiment, processor 2100 may also include a set of one or more bus controller units 2116 and a system agent core 2110. In at least one embodiment, bus controller units 2116 manage a set of peripheral buses, such as one or more PCI or PCI express busses. In at least one embodiment, system agent core 2110 provides management functionality for various processor components. In at least one embodiment, system agent core 2110 includes one or more integrated memory controllers 2114 to manage access to various external memory devices (not shown).

In at least one embodiment, one or more of processor cores 2102A-2102N include support for simultaneous multi-threading. In at least one embodiment, system agent core 2110 includes components for coordinating and operating cores 2102A-2102N during multi-threaded processing. In at least one embodiment, system agent core 2110 may additionally include a power control unit (PCU), which includes logic and components to regulate one or more power states of processor cores 2102A-2102N and graphics processor 2108.

In at least one embodiment, processor 2100 additionally includes graphics processor 2108 to execute graphics processing operations. In at least one embodiment, graphics processor 2108 couples with shared cache units 2106, and system agent core 2110, including one or more integrated memory controllers 2114. In at least one embodiment, system agent core 2110 also includes a display controller 2111 to drive graphics processor output to one or more coupled displays. In at least one embodiment, display controller 2111 may also be a separate module coupled with graphics processor 2108 via at least one interconnect, or may be integrated within graphics processor 2108.

In at least one embodiment, a ring-based interconnect unit 2112 is used to couple internal components of processor 2100. In at least one embodiment, an alternative interconnect unit may be used, such as a point-to-point interconnect, a switched interconnect, or other techniques. In at least one embodiment, graphics processor 2108 couples with ring interconnect 2112 via an I/O link 2113.

In at least one embodiment, I/O link 2113 represents at least one of multiple varieties of I/O interconnects, including an on package I/O interconnect which facilitates communication between various processor components and a high-performance embedded memory module 2118, such as an eDRAM module. In at least one embodiment, each of processor cores 2102A-2102N and graphics processor 2108 use embedded memory module 2118 as a shared Last Level Cache.

In at least one embodiment, processor cores 2102A-2102N are homogeneous cores executing a common instruction set architecture. In at least one embodiment, processor cores 2102A-2102N are heterogeneous in terms of instruction set architecture (ISA), where one or more of processor cores 2102A-2102N execute a common instruction set, while one or more other cores of processor cores 2102A-2102N executes a subset of a common instruction set or a different instruction set. In at least one embodiment, processor cores 2102A-2102N are heterogeneous in terms of microarchitecture, where one or more cores having a relatively higher power consumption couple with one or more power cores having a lower power consumption. In at least one embodiment, processor 2100 can be implemented on one or more chips or as an SoC integrated circuit.

Inference and/or training logic 115 are used to perform inferencing and/or training operations associated with one or more embodiments. In at least one embodiment portions or all of inference and/or training logic 115 may be incorporated into graphics processor 2108. For example, in at least one embodiment, training and/or inferencing techniques described herein may use one or more of ALUs embodied in a 3D pipeline, graphics core(s) 2102, shared function logic, or other logic in FIG. 21. In at least one embodiment, weight parameters may be stored in on-chip or off-chip memory and/or registers (shown or not shown) that configure ALUs of processor 2100 to perform one or more machine learning algorithms, neural network architectures, use cases, or training techniques described herein.

At least one embodiment of the disclosure can be described in view of the following clauses:

1. A computer-implemented method, comprising:
   receiving a request to query an established remote direct memory access (RDMA) session group;
   providing, responsive to the query, a session identifier (ID) for the established RDMA session group;
   receiving a message to add a new queue pair (QP) to the established RDMA session group;
   determining, based, at least, on the session ID, that a remote of the new QP is the same as a remote for the session group;
   configuring one or more parameters of the new QP based, at least, on operating parameters of the RDMA session group; and
   establishing a connection through the established RDMA session group.

2. The computer-implemented method of clause 1, further comprising:
   receiving a packet for the new QP; and
   routing transmission of the packet along an established RDMA session of the established RDMA session group.

3. The computer-implemented method of clause 1, wherein the new QP has at least one of a different performance level or a different level of service than one or more other QPs associated with the established RDMA session group.

4. The computer-implemented method of clause 1, wherein the message includes a second request to add a second new QP to the established RDMA session group.

5. The computer-implemented method of clause 4, wherein the second request is provided responsive to a determination that existing QPs of the RDMA session group are below one or more performance thresholds.

6. The computer-implemented method of clause 1, further comprising:
   receiving a second message to add a second new QP to the established RDMA session group;
   determining, based, at least, on the session ID, that a remote of the second new QP is different from as a second remote for the session group; and
   establishing a new RDMA session group for the second new QP.

7. The computer-implemented method of clause 1, wherein the one or more parameters include encryption and encapsulation parameters.

8. A system, comprising:
   one or more processing units to:
   determine one or more performance parameters of a queue pair (QP) associated with an established remote direct memory access (RDMA) session are below a threshold;
   transmit a query to an RDMA session group, associated with the QP and the RDMA session, requesting a session ID;
   transmit, in response to receiving the requested session identifier (ID), a request to add a new QP to the RDMA session group, the request including at least the session ID; and
   cause one or more operating parameters, received for the new QP upon approval of the request, to be applied.

9. The system of clause 8, wherein the one or more processing units are further to:
configure the new QP according to operating parameters; and
transmit one or more packets associated with the new QP using the RDMA session.

10. The system of clause 8, wherein the one or more processing units are further to:
determine one or more existing operating parameters for the established RDMA session; and cause at least some of the existing operating parameters to be applied to the new QP.

11. The system of clause 8, wherein a number of QPs for the RDMA session group is greater than a number of RDMA sessions for the RDMA session group.

12. The system of clause 8, wherein the new QP has a common remote with the QP of the established RDMA session.

13. The system of clause 8, wherein the one or more processing units are further to:
close the new QP while the RDMA session is maintained for one or more additional QPs of the RDMA session group.

14. The system of clause 8, wherein the RDMA session group is associated with a session based RDMA connection.

15. A system, comprising:
one or more processors to add a new queue pair (QP) to an established remote direct memory access (RDMA) session group when the new QP has the same remote as an established QP associated with the RDMA session group, and to configure the new QP with one or more connection parameters of the established QP.

16. The system of clause 15, wherein the one or more processors are further to:
determine a performance parameter for the established QP is below a performance threshold.

17. The system of clause 15, wherein the new QP has at least one of a different performance level or a different level of service than the established QP.

18. The system of clause 15, wherein the one or more processors are further to:
establish a second RDMA session group for an additional QP having a second remote different from the new QP and the established QP.

19. The system of clause 15, wherein the new QP shares one or more encryption parameters with the established QP.

20. The system of clause 15, wherein the system is comprised in at least one of:
a system for performing simulation operations;
a system for performing simulation operations to test or validate autonomous machine applications;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a collaborative content creation platform for 3D assets; or
a system implemented at least partially using cloud computing resources.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, referring back to FIG. 10, computer programs in form of machine-readable executable code or computer control logic algorithms are stored in main memory 1004 and/or secondary storage. Computer programs, if executed by one or more processors, enable system 1000 to perform various functions in accordance with at least one embodiment. In at least one embodiment, memory 1004, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 1002, parallel processing system 1012, an integrated circuit capable of at least a portion of capabilities of both CPU 1002, parallel processing system 1012, a chipset (e.g., a group of integrated circuits designed to work and sold as a unit for performing related functions, etc.), and/or any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 1000 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 1012 includes, without limitation, a plurality of parallel processing units ("PPUs") 1014 and associated memories 1016. In at least one embodiment, PPUs 1014 are connected to a host processor or other peripheral devices via an interconnect 1018 and a switch 1020 or multiplexer. In at least one embodiment, parallel processing system 1012 distributes computational tasks across PPUs 1014 which can be parallelizable—for example, as part of distribution of computational tasks across multiple graphics processing unit ("GPU") thread blocks. In at least one embodiment, memory is shared and accessible (e.g., for read and/or write access)

across some or all of PPUs 1014, although such shared memory may incur performance penalties relative to use of local memory and registers resident to a PPU 1014. In at least one embodiment, operation of PPUs 1014 is synchronized through use of a command such as syncthreads( ) wherein all threads in a block (e.g., executed across multiple PPUs 1014) to reach a certain point of execution of code before proceeding.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, oneVPL implements various functions for media pipelines on CPUs, GPUs, and other accelerators. In at least one embodiment, oneVPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

In at least one embodiment, any application programming interface (API) described herein is compiled into one or more instructions, operations, or any other signal by a compiler, interpreter, or other software tool. In at least one embodiment, compilation comprises generating one or more machine-executable instructions, operations, or other signals from source code. In at least one embodiment, an API compiled into one or more instructions, operations, or other signals, when performed, causes one or more processors such as graphics processors @22@00, graphics cores 1500, parallel processor 1700, processor @17@00, processor core @17@00, or any other logic circuit further described herein to perform one or more computing operations.

It should be noted that, while example embodiments described herein may relate to a CUDA programming model, techniques described herein can be utilized with any suitable programming model, such HIP, oneAPI, and/or variations thereof.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
receiving a request to query an established remote direct memory access (RDMA) session group;
providing, responsive to the query, a session identifier (ID) for the established RDMA session group;
receiving a message to add a new queue pair (QP) to the established RDMA session group;
determining, based, at least, on the session ID, that a remote of the new QP is the same as a remote for the session group, the remote including at least one of a destination internet protocol (IP) or a destination user datagram protocol (UDP) port;

configuring one or more parameters of the new QP based, at least, on operating parameters of the RDMA session group; and establishing a connection for the new QP using the one or more parameters through the established RDMA session group.

2. The computer-implemented method of claim 1, further comprising:

receiving a packet for the new QP; and routing transmission of the packet along an established RDMA session of the established RDMA session group.

3. The computer-implemented method of claim 1, wherein the new QP has at least one of a different performance level or a different level of service than one or more other QPs associated with the established RDMA session group.

4. The computer-implemented method of claim 1, wherein the message includes a second request to add a second new QP to the established RDMA session group.

5. The computer-implemented method of claim 4, wherein the second request is provided responsive to a determination that existing QPs of the RDMA session group are below one or more performance thresholds.

6. The computer-implemented method of claim 1, further comprising:

receiving a second message to add a second new QP to the established RDMA session group;

determining, based, at least, on the session ID, that a remote of the second new QP is different from as a second remote for the session group; and establishing a new RDMA session group for the second new QP.

7. The computer-implemented method of claim 1, wherein the one or more parameters include encryption and encapsulation parameters.

8. A system, comprising:

one or more processors to add a new queue pair (QP) to an established remote direct memory access (RDMA) session group when the new QP is determined to have, based at least on a session identifier (ID) for the established RDMA session group, a new QP remote that is the same as an established QP remote associated with an established QP connected to the established RDMA session group, to configure the new QP with one or more connection parameters of the established QP, and to establish a connection for the new QP using the one or more connection parameters through the established RDMA session group, wherein the session ID is provided based on a request to query the established RDMA session group, and wherein the new QP remote is at least one of a destination internet protocol (IP) or a destination user datagram protocol (UDP) port.

9. The system of claim 8, wherein the one or more processors are further to:

determine a performance parameter for the established QP is below a performance threshold.

10. The system of claim 8, wherein the new QP has at least one of a different performance level or a different level of service than the established QP.

11. The system of claim 8, wherein the one or more processors are further to:

establish a second RDMA session group for an additional QP having a second remote different from the new QP and the established QP.

12. The system of claim 8, wherein the new QP shares one or more encryption parameters with the established QP.

13. The system of claim 8, wherein the system is comprised in at least one of:

a system for performing simulation operations;

a system for performing simulation operations to test or validate autonomous machine applications;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system implemented at least partially in a data center;

a system for performing hardware testing using simulation;

a system for synthetic data generation;

a collaborative content creation platform for 3D assets; or a system implemented at least partially using cloud computing resources.

* * * * *